United States Patent
Hattori et al.

(10) Patent No.: US 10,728,567 B2
(45) Date of Patent: Jul. 28, 2020

(54) DECODING DEVICE AND DECODING METHOD, ENCODING DEVICE, AND ENCODING METHOD

(71) Applicant: Sony Corporation, Tokyo (JP)

(72) Inventors: Shinobu Hattori, Tokyo (JP); Hiroaki Eto, Kanagawa (JP); Takumi Tsuru, Chiba (JP); Kenichi Kanai, Tokyo (JP); Toshiya Hamada, Saitama (JP)

(73) Assignee: SONY CORPORATION, Tokyo (JP)

( * ) Notice: Subject to any disclaimer, the term of this patent is extended or adjusted under 35 U.S.C. 154(b) by 323 days.

(21) Appl. No.: 15/421,844

(22) Filed: Feb. 1, 2017

(65) Prior Publication Data

US 2017/0150161 A1    May 25, 2017

Related U.S. Application Data

(63) Continuation of application No. 14/984,509, filed on Dec. 30, 2015, now Pat. No. 10,015,505, which is a
(Continued)

(30) Foreign Application Priority Data

Sep. 3, 2013   (JP) .................................. 2013-182578
Dec. 27, 2013  (JP) .................................. 2013-272944

(51) Int. Cl.
*H04N 19/46*   (2014.01)
*H04N 9/73*    (2006.01)
(Continued)

(52) U.S. Cl.
CPC ............. *H04N 19/46* (2014.11); *G06T 5/007* (2013.01); *G06T 7/90* (2017.01); *G06T 11/60* (2013.01);
(Continued)

(58) Field of Classification Search
CPC ...... H04N 19/44; H04N 19/136; H04N 19/46; G06T 5/007; G06T 11/60; G06T 2200/24
(Continued)

(56) References Cited

U.S. PATENT DOCUMENTS 6,829,301 B1  12/2004 Tinker
8,248,486 B1   8/2012 Ward et al.
(Continued)

FOREIGN PATENT DOCUMENTS

CN    101248678      8/2008
CN    101248678 A    8/2008
(Continued)

OTHER PUBLICATIONS

Extended European Search Report dated Dec. 12, 2016 in Patent Application No. 14838854.9.
(Continued)

*Primary Examiner* — Michael J Hess
(74) *Attorney, Agent, or Firm* — Xsensus LLP

(57) ABSTRACT

The present disclosure relates to a decoding device, a decoding method, an encoding device, and an encoding method, which are capable of enabling a decoding side to accurately recognize a color gamut of an encoding target image. The decoding device includes circuitry configured to receive an encoded stream including encoded data of an image and color primary information indicating a coordinate of at least one color primary of the image. The circuitry extracts the encoded data and the color primary information from the received encoded stream. The circuitry decodes the encoded data to generate the image. Further, the circuitry adjusts a color space of the generated image based on the extracted color primary information. The present disclosure can be applied to, for example, a decoding device of a high efficiency video coding (HEVC) scheme.

38 Claims, 42 Drawing Sheets

Related U.S. Application Data continuation of application No. 14/490,444, filed on Sep. 18, 2014, now Pat. No. 9,264,683, which is a continuation of application No. PCT/JP2014/072104, filed on Aug. 25, 2014.

(51) Int. Cl.
| | |
|---|---|
| *G09G 5/02* | (2006.01) |
| *H04N 19/70* | (2014.01) |
| *H04N 19/30* | (2014.01) |
| *H04N 19/85* | (2014.01) |
| *H04N 19/136* | (2014.01) |
| *H04N 19/44* | (2014.01) |
| *G06T 7/90* | (2017.01) |
| *G06T 5/00* | (2006.01) |
| *G06T 11/60* | (2006.01) |
| *G11B 27/031* | (2006.01) |
| *H04N 1/64* | (2006.01) |

(52) U.S. Cl.
CPC ............. *G09G 5/02* (2013.01); *G11B 27/031* (2013.01); *H04N 9/73* (2013.01); *H04N 19/136* (2014.11); *H04N 19/30* (2014.11); *H04N 19/44* (2014.11); *H04N 19/70* (2014.11); *H04N 19/85* (2014.11); *G06T 2200/24* (2013.01); *G09G 2340/02* (2013.01); *H04N 1/648* (2013.01)

(58) Field of Classification Search
USPC ........................................ 375/240.25–240.29
See application file for complete search history.

(56) References Cited

U.S. PATENT DOCUMENTS

| | | | |
|---|---|---|---|
| 8,891,934 B2 | 11/2014 | Messmer | |
| 2003/0103057 A1* | 6/2003 | Graves | G06T 5/009 345/589 |
| 2009/0116819 A1 | 5/2009 | Kondo et al. | |
| 2009/0262148 A1* | 10/2009 | Kimura | G09G 3/2003 345/690 |
| 2011/0128438 A1 | 6/2011 | Yamashita et al. | |
| 2013/0176498 A1* | 7/2013 | Noutoshi | H04N 9/68 348/712 |
| 2014/0043371 A1* | 2/2014 | Langendijk | G09G 3/3426 345/690 |
| 2014/0071187 A1* | 3/2014 | Matsui | G09G 3/20 345/690 |
| 2014/0267470 A1* | 9/2014 | Kang | G09G 3/2003 345/694 |
| 2015/0208102 A1* | 7/2015 | Takahashi | H04N 21/4854 348/441 |
| 2015/0235615 A1* | 8/2015 | Yoshida | G09G 5/028 345/600 |
| 2016/0366444 A1* | 12/2016 | Sullivan | H04N 19/70 |
| 2017/0150162 A1* | 5/2017 | Hattori | H04N 9/73 |

FOREIGN PATENT DOCUMENTS

| | | |
|---|---|---|
| EP | 1 933 571 A1 | 6/2008 |
| WO | WO 2005/104035 A1 | 11/2005 |
| WO | WO 2007/023698 | 3/2007 |
| WO | WO 2010/023884 | 3/2010 |
| WO | WO 2010/105036 A1 | 9/2010 |
| WO | WO 2013/103522 A1 | 7/2013 |

OTHER PUBLICATIONS

Sally Hattori et al., "AVC: Signalling of Luminance Dynamic Range in Tone Mapping Information SEI", International Organisation for Standardisation, Coding of Moving Pictures and Audio, ISO/IEC JTC1/SC29/WG11, MPEG 2012/M26686, XP030055019, Oct. 2012, 6 pages.

Andrew Segall et al., "Tone mapping SEI Message", Joint Video Team of ISO/IEC MPEG & ITU-T VCEG, (ISO/IEC JTC1/SC29/WG11 and ITU-T SG.16 Q.6), No. JVT-S087, XP030006466, Apr. 1, 2006, 12 pages.

Office Action dated Jun. 22, 2018 in Chinese application 201480002494.5.

"Signalling of Luminance Dynamic Range in Tone mapping information SEI", Sally Hattori, Joint Collaborative Team on Video Coding (JCT-VC) of ITU-T SG16 WP3 and ISOIIEC JTC 1/SC 29/WG 11, pp. 1-7.

Office Action dated Jul. 26, 2018 in Chinese application 2015-507842.

"Proposed Standardization of XYZ Image", ITU-Telecommunications Standardization Sector, H. Basse, Study Group 16 Question 6, Video Coding Experts Group (VCEG); 48th Meeting; Jul. 25-Aug. 2, Vienna, AT.

Written Opinion of the International Searching Authority dated Nov. 18, 2014, in PCT/JP2014/072104 (with English-language translation).

Hattori et al., "Signalling of Luminance Dynamic Range in Tone Mapping Information SEI," Joint Collaborative Team on video Coding (JCT-VC) of ITU-T SG 16 WP 3 and ISO/IEC JTC 1/SC 29/WG 11, 10th Meeting: Stockholm, SE, Document JCTVC-J0149, Jul. 11-20, 2012, 7 pp.

Bross, et al., "Editors' proposed corrections to HEVC version I," Joint Collaborative Team on Video Coding, JCTVC-M0432_v3, Apr. 18-26, 2013, 310 pps.

Japanese Office Action dated Jan. 29, 2019, issued in corresponding JP Application No. 2015-507842, 5 pages.

Alexis Michael Tourapis et al., "Revision of the H.264/MPEG-4 AVC Reference Software Manual", Joint Video Team (JVT) of ISO/IEC MPEG & ITU-T VCEG (ISO/IEC JTC1/SC29/WG11 and ITU-T SG16 Q.6) 23rd Meeting, San Jose, CA, Apr. 21-27, 2007, 5 pages.

Combined Chinese Office Action and Search Report dated Jun. 22, 2018 in corresponding Patent Application No. 201480002494.5 (with English Translation), 23 pages.

Office Action dated Jul. 26, 2018 in corresponding Japanese Patent Application No. 2015-507842, 3 pages.

H. Hasse, "Proposed Standardization of XYZ Image", VCEG-AV11 ( rev. 1), ITU—Telecommunications Standardization Sector, Study Group 16 Question 6, Video Coding Experts Group (VCEG), 48th Meeting, Jul. 31, 2013, 3 pages.

\* cited by examiner

FIG. 2

| | Descriptor |
|---|---|
| colour_primaries_info(payloadSize) { | |
|   colour_primaries_info_id | ue(v) |
|   colour_primaries_type | u(6) |
|   colour_primaries_info_present_flag | u(1) |
|   white_point_info_present_flag | u(1) |
|   if(colour_description_present_flag) //in VUI | |
|     limited_colour_gamut_boundaries_flag | u(1) |
|     if(limited_colour_gamut_bondaries_flag) | |
|       limited_colour_gamut_range_in_percent | u(7) |
|   if(colour_primaries_info_present_flag) { | |
|     colour_primaries_order_type | u(8) |
|     num_colour_primaries_minus3 // shall be at least 3 | ue(v) |
|     for (i=0; i<=num_colour_primaries_minus3+3; i++) { | |
|       colour_primaries_info_sei_element(ColourPrimaryXSign[i],ColourPrimaryXExp[i], | |
|         ColourPrimaryXMantissa[i],ColourPrimaryXManLen[i]) | |
|       colour_primaries_info_sei_element(ColourPrimaryYSign[i],ColourPrimaryYExp[i], | |
|         ColourPrimaryYMantissa[i],ColourPrimaryYManLen[i]) | |
|     } | |
|   } | |
|   if(white_point_info_present_flag) { | |
|     colour_primaries_info_sei_element(WhitePointXSign,WhitePointXExp,WhitePointXMantissa,WhitePointXManLen) | |
|     colour_primaries_info_sei_element(WhitePointYSign,WhitePointYExp,WhitePointYMantissa,WhitePointYManLen) | |
|   } | |
| } | |

FIG. 3 colour_primaries_info_id contains an identifying number that may be used to identify the purpose of the colour primaries. The value of colour_primaries_info_id shall be in the range of 0 to $2^{32} - 2$, inclusive.

colour_primaries_type specifies the colour space domain as specified in Tablexx.

| colour_parimaries_type | Interpretation |
|---|---|
| 0 | Unspecified. Image characteristics are unknown or are determined by the application |
| 1 | The chromaticity coordinates of the source primaries are in RGB domain. |
| 2 | The chromaticity coordinates of the source primaries are in XYZ domain. |
| Other values | Reserved for future use | colour_primaries_info_present_flag equal to 0 specifies that the syntax elements specifying the colour primaries value are not present in the syntax structure. colour_primaries_info_present_flag equal 1 specifies that the syntax elements specifying the colour primaries value are present in the syntax structure.

white_point_info_present_flag equal to 0 specifies that the syntax elements specifying the white point value are not present in the syntax structure. white_point_info_present_flag equal 1 specifies that the syntax elements specifying the white point value are present in the syntax structure.

FIG. 4 limited_colour_gamut_boundaries_flag equal to 0 specifies that the colour gamut boundaries are limited within colour primaries signalled with colour_primaries in vui_parameters(). limited_colour_gamut_boundaries equal 1 specifies that the colour gamut boundaries may or may not be limited within colour primaries signalled with colour_primaries in vui_parameters().

limited_colour_gamut_range_in_percent specifies the cover ratio of colour gamut in relation to the gamut signaled as colour_primaries in vui_parameters() in percent. The value of limited_colour_gamut_range_in_percent shall be in range of 0 to 100.

colour_primaries_order_type specifies the order in which the colour primaries are signalled as defined in Table XX.

num_colour_primaries_minus3 +3 specifies the number of colour primaries which the subsequent syntax element apply.

| colour_primaries_order_type | Interpretation |
|---|---|
| 0 | Unspecified. The order chromaticity coordinates of the source primaries are determined by the application |
| 1 | The chromaticity coordinates of the source primaries are signaled in order of Red, Green, Blue and additional primaries in order or longer wavelength of colour. e.g. Red, Green, Blue, Yellow, Cyan |
| 2 | The chromaticity coordinates of the source primaries are in signalled in order of longer wavelength of colour. (e.g. Red, Yellow, Green, Cyan, Blue) |
| 3 | The chromaticity coordinates of the source primaries are in signalled in order of X, Y and Z. |
| Other values | Reserved for future use |

FIG. 5

| | Descriptor |
|---|---|
| colour_primaries_info_sei_element(OutSign, OutExp, OutMantissa, OutManLen) { | |
|    colour_primaries_info_sign | u(1) |
|    colour_primaries_info_exponent | u(7) |
|    colour_primaries_info_mantissa_len_minus1 | u(5) |
|    colour_primaries_info_mantissa | u(v) |
| } | |

FIG. 6 colour_primaries_info_sign equal to 0 indicates that the sign of the floating-point value is positive. colour_primaries_info_sign equal to 1 indicates that the sign is negative. The variable OutSign is set equal to colour_parimaries_info_sign.

colour_primaries_info_exponent specifies the exponent of the floating-point value. The value of colour_parimaries_info_exponent shall be in the range of 0 to $2^7-2$, inclusive. The value $2^7-1$ is reserved for future use by ITU-T | ISO/IEC. Decoders shall treat the value $2^7-1$ as indicating an unspecified value. The variable OutExp is set equal to colour_primaries_info_exponent.

colour_parimaries_info_mantissa_len_minus1+1 specifies the number of bits in the colour_primaries_info_mantissa syntax element. The value of colour_primaries_info_mantissa_len_minus1 shall be in the range of 0 to 31, inclusive. The variable OutManLen is set equal to colour_primaries_info_mantissa_len_minus+1 colour_parimaries_info_mantissa specifies the mantissa of the floating-point value. The variable OutMantissa is set equal to colour_primaries_info_mantissa

FIG. 7

The variables x in Table A are derived as follows from the respective variables s, e, n, and v indicated in Table A.
— If $0 < e < 127$, $x=(-1)^s * 2^{e-31} * (1 + n \div 2^v)$.
— Otherwise (e is equal to 0), $x=(-1)^s * 2^{-(30-v)} * n$.
NOTE—The above specification is similar to that found in IEC 60559:1989, Binary floating-point arithmetic for microprocessor systems.

The variables x in Table A are specified as follows:
- ColourPrimariesX[cpId]:The x coordinate of colour primaries for i equal to cpId.
- ColourPrimariesY[cpId]:The y coordinate of colour primaries for i equal to cpId.
- WhitePointX:The x coordinate of white point.
- WhitePointY:The y coordinate of white point.

Table A—Association between depth parameter variables and syntax elements.

| x | s | e | n | v |
|---|---|---|---|---|
| ColourPrimariesX[cpId] | ColourPrimariesXSign[cpId] | ColourPrimariesXExp[cpId] | ColourPrimariesXMantissa[cpId] | ColourPrimariesXLen[cpId] |
| ColourPrimariesY[cpId] | ColourPrimariesYSign[cpId] | ColourPrimariesYExp[cpId] | ColourPrimariesYMantissa[cpId] | ColourPrimariesYManLen[cpId] |
| WhitePointX | WhitePointXSign | WhitePointXExp | WhitePointXMantissa | WhitePointXManLen |
| WhitePointY | WhitePointYSign | WhitePointYExp | WhitePointYMantissa | WhitePointYManLen |

FIG. 8

| ref_display_luminance_info(payloadSize) { | Descriptor |
|---|---|
| ref_display_luminance_info_id | ue(v) |
| ref_display_luminance_white_present_flag | u(1) |
| ref_display_luminance_black_present_flag | u(1) |
| ref_display_luminance_gray_present_flag | u(1) |
| if(screen_luminance_white_present_flag) | |
| ref_display_luminance_white | u(32) |
| if(screen_luminance_black_present_flag) | |
| ref_display_luminance_black | u(32) |
| if(screen_luminance_gray_present_flag) | |
| ref_display_luminance_gray | u(32) |
| } | |

FIG. 9 ref_display_luminance_info_id contains an identifying number that may be used to identify the purpose of the luminance info for reference display. The value of ref_display_luminance_info_id shall be in the range of 0 to $2^{32}-2$, inclusive.

ref_display_luminance_white_present_flag equal to 0 specifies that the syntax elements specifying the white level luminance for reference display value is not present in the syntax structure. ref_display_luminance_white_present_flag equal 1 specifies that the syntax elements specifying the white level luminance for reference display value is present in the syntax structure.

ref_display_luminance_black_present_flag equal to 0 specifies that the syntax elements specifying the blacklevel luminance for reference display value is not present in the syntax structure. ref_display_luminance_white_present_flag equal 1 specifies that the syntax elements specifying the blacklevel level luminance for reference display value is present in the syntax structure.

ref_display_luminance_gray_present_flag equal to 0 specifies that the syntax elements specifying the gray level luminance for reference display value is not present in the syntax structure. ref_display_luminance_white_present_flag equal 1 specifies that the syntax elements specifying the gray level luminance for reference display value is present in the syntax structure.

ref_display_luminance_white indicates the reference display brightness setting for the white level used for image production process in units of candela per square metre.

ref_display_luminance_black indicates the reference display brightness setting for the black level used for image production process in units of candela per square metre.

ref_display_lumnance_gray indicates the reference display brightness setting for the 18% gray level used for image production process in units of candela per square metre.

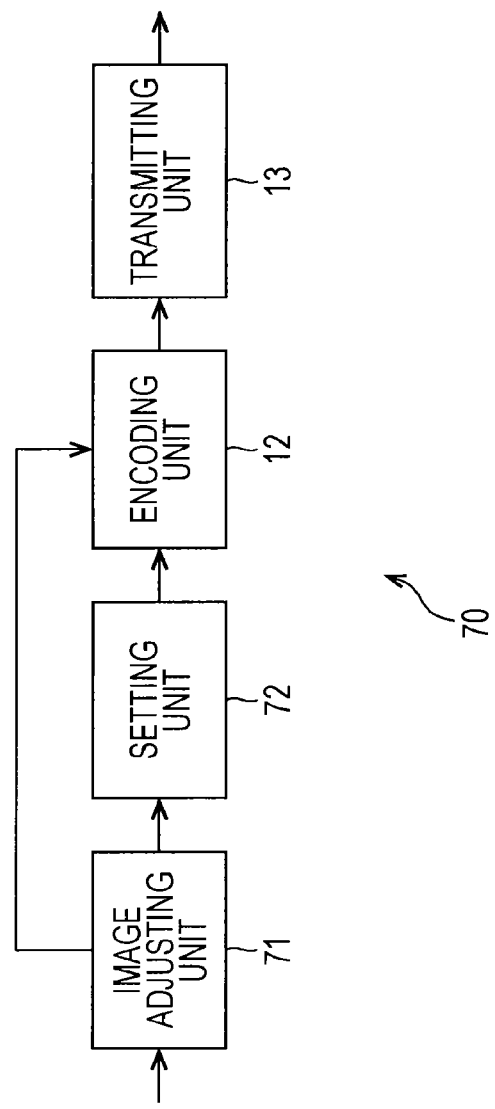

FIG. 14

| | Descriptor |
|---|---|
| colour_primaries_info(payloadSize) { | |
|   colour_primaries_info_id | ue(v) |
|   colour_primaries_cancel_flag | u(1) |
|   if(! colour_primaries_cancel_flag) { | |
|     colour_primaries_persistence_flag | u(1) |
|     white_level_display_luminance_present_flag | u(1) |
|     black_level_display_luminance_present_flag | u(1) |
|     colour_gamut_coverage_present_flag | u(1) |
|     colour_primary_Red_x | u(16) |
|     colour_primary_Red_y | u(16) |
|     colour_primary_Green_x | u(16) |
|     colour_primary_Green_y | u(16) |
|     colour_primary_Blue_x | u(16) |
|     colour_primary_Blue_y | u(16) |
|     white_point_x | u(16) |
|     white_point_y | u(16) |
|     if (white_level_display_luminance_present_flag) | |
|       white_level_display_luminance | u(32) |
|     if (black_level_display_luminance_present_flag) | |
|       black_level_display_luminance | u(32) |
|     if (colour_gamut_coverage_present_flag) | |
|       colour_gamut_coverage | u(8) |
|   } | |
| } | |

FIG. 15 colour_primaries_info_id contains an identifying number that may be used to identify the purpose of the colour primaries. The value of colour_primaries_info_id shall be in the range of 0 to $2^{32} - 2$, inclusive.

Values of colour_primaries_info_id from 0 to 255 and from 512 to $2^{31} - 1$ may be used as determined by the application. Values of colour_primaries_info_id from 256 to 511, inclusive, and from $2^{31}$ to $2^{32} - 2$, inclusive are reserved for future use by ITU-T | ISO/IEC. Decoders shall ignore all colour primaries information SEI messages containing a value of colour_primaries_info_id in the range of 256 to 511, inclusive, or in the range of $2^{31}$ to $2^{32} - 2$, inclusive, and bitstreams shall not contain such values.

colour_primaries_cancel_flag equal to 1 indicates that the colour primaries information SEI message cancels the persistence of any previous colour primaries information SEI message in output order. colour_primaries_cancel_flag equal to 0 indicates that colour primaries information follows.

colour_primaries_persistence_flag specifies the persistence of the colour primaries information SEI message. colour_primaries_persistence_flag equal to 0 specifies that the colour primaries information applies to the current decoded picture only.
colour_parimaries_persistence_flag equal to 1 specifies that the colour primaries information persists in output order until any of the following conditions are true:
- A new CVS begins.
- A picture in an access unit containing a colour primaries information SEI message with the same value of colour_primaries_info_id is output having PicOrderCntVal greater than PicOrderCnt( CurrPic ).

FIG. 16 white_level_disp_luminance_present_flag equal to 0 specifies that the syntax element specifying the display luminance value of the white level is not present in the syntax structure. white_level_disp_luminance_present_flag equal 1 specifies that the syntax element specifying the display luminance value of the white level is present in the syntax structure.

black_level_disp_luminance_present_flag equal to 0 specifies that the syntax element specifying the display luminance value of the black level is not present in the syntax structure. black_level_disp_luminance_present_flag equal 1 specifies that the syntax element specifying the display luminance value of the black level is present in the syntax structure.

colour_gamut_coverage_present_flag equal to 0 specifies that the syntax element specifying the colour gamut coverage is not present in the syntax structure. colour_gamut_coverage_present_flag equal to 1 specifies that the syntax element specifying the coverage gamut coverage value is present in the syntax structure.

FIG. 17 colour_primary_Red_x specifies the CIE-x chromaticity values for red. colour_primary_Red_x is specified in 16 bits unsigned fixed-point fraction.

colour_primary_Red_y specifies the CIE-y chromaticity values for red. colour_primary_Red_y is specified in 16 bits unsigned fixed-point fraction.

Each number shall be represented by a binary fraction, which is 16 bits in length. In this fraction a vale of 1 for the bit immediately right of the decimal point (bit 15) represents 2 raised to the −1 power. A value of 1 in the right most bit (bit 0) represents a value of 2 raised to the −16 power.

For example, the value 1.0 can be expressed as value 65536 (2^16) in decimal such that in case coordinate of Red colour primary is (0.64, 0.33), the values for colour_primary_Red_x and colour_primary_Red_y are derived as following:
  65536*0.64=41943.04 ≒ 41943, colour_primary_Red_x is set to "1010001111010111"$_b$"
  65536*0.33=21626.88 ≒ 21627, colour_primary_Red_y is set to "0101010001111011"$_b$"

FIG. 18 colour_primary_Green_x specifies the CIE-x chromaticity values for green. colour_primary_Green_x is specified in 16 bits unsigned fixed-point fraction.
colour_primary_Green_y specifies the CIE-y chromaticity values for green. colour_primary_Green_y is specified in 16 bits unsigned fixed-point fraction.

colour_primary_Blue_x specifies the CIE-x chromaticity values for blue. colour_primary_Blue_x is specified in 16 bits unsigned fixed-point fraction.
colour_primary_Blue_y specifies the CIE-y chromaticity values for blue. colour_primary_Blue_y is specified in 16 bits unsigned fixed-point fraction.

white_point_x specifies the CIE-x chromaticity values for white. white_point_x is specified in 16 bits unsigned fixed-point fraction.
white_point_y specifies the CIE-y chromaticity values for white. white_point_y is specified in 16 bits unsigned fixed-point fraction.

FIG. 19 white_level_display_luminance specifies the display luminance brightness of the white level in units of candela per square metre. white_level_display_luminance is specified in 32 bits unsigned integer.

black_level_display_luminance specifies the display luminance brightness of the black level in units of candela per square metre. black_level_display_luminance is specified in 32 bits unsigned fixed-point fraction with 16 bit integer part (bit 31 to bit 16) and 16 bit fractional part (bit 15 to bit 0).

colour_gamut_coverage specifies the colour gamut coverage relative to the colour gamut signaled by colour_primaries in vui_parameters() in units of percentage.

FIG. 23

```
Colour Primaries Information Box('tinf')
Box Type 'tinf'
Container Sample Table Box('stbl')or
          Track Fragment Box('traf')
Mandatory No
Quantity  Zero,or one in every track/track fragment aligned(8)class ToneMappingInformationBox
        extends FullBox('tinf',version=0,flags=0)
 {
        unsigned int(32) number_of_tone_mapping_info
        for (i=0; i<number_of_tone_mapping_info; i++)
        {
                ColourPrimariesInfo;
        }
 }
```

DECODING DEVICE AND DECODING METHOD, ENCODING DEVICE, AND ENCODING METHOD

CROSS-REFERENCE TO RELATED APPLICATIONS

This application is a continuation of U.S. patent application Ser. No. 14/984,509, filed Dec. 30, 2015, which is a continuation of U.S. patent application Ser. No. 14/490,444, filed Sep. 18, 2014, which is a continuation of PCT/JP2014/072104 filed on Aug. 25, 2014 and claims priority to Japanese Patent Application Nos. 2013-182578 filed Sep. 3, 2013 and 2013-272944 filed Dec. 27, 2013, the entire contents of each of which are incorporated herein by reference.

TECHNICAL FIELD

The present disclosure relates to a decoding device, a decoding method, an encoding device, and an encoding method, and more particularly, a decoding device, a decoding method, an encoding device, and an encoding method, which are capable of enabling a decoding side to accurately recognize a color gamut of an encoding target image.

BACKGROUND ART

In recent years, devices complying with a scheme such as a Moving Picture Experts Group phase (MPEG) in which compression is performed by orthogonal transform such as discrete cosine transform (DCT) and motion compensation using specific redundancy of image information have been spread for both information delivery of broadcasting stations or the like and information reception in general households.

Particularly, an MPEG 2 (ISO/IEC 13818-2) scheme is defined as a general-purpose image coding scheme, and now being widely used for a wide range of applications of professional use and consumer use as a standard converting an interlaced scanned image, a progressive scanned image, a standard resolution image, and a high-definition image. Using the MPEG 2 scheme, for example, a high compression rate and an excellent image quality can be implemented by allocating a bit rate of 4 to 8 Mbps in the case of an interlaced scanned image of a standard resolution having 720×480 pixels and a bit rate of 18 to 22 MBps in the case of an interlaced scanned image of a high resolution having 1920×1088 pixels.

The MPEG 2 mainly aims for high-quality encoding suitable for broadcasting, but does not support a coding scheme of a bit rate lower than that of MPEG 1, that is, a coding scheme of a high compression rate. As mobile terminals are spread, a need for such a coding scheme has been considered to increase in the near future, and accordingly an MPEG 4 coding scheme has been standardized. ISO/IEC 14496-2 has been approved as an international standard for the MPEG4 image coding scheme in December, 1998.

Further, in recent years, standardization of a standard such as H.26L (ITU-T Q6/16 VCEG) designed for image coding for video conferencing at first is being conducted. Although H.26L is known to require a more computation amount for encoding and decoding than in a coding scheme such as MPEG 2 or MPEG 4, H.26L is also known to be able to implement high coding efficiency.

Further, in recent years, as one of MPEG 4 activities, standardization of incorporating a function that is not supported by H.26L based on H.26L and implementing high coding efficiency has been conducted as Joint Model of Enhanced-Compression Video Coding. This standardization has been approved in the name of H.264 or MPEG-4 Part 10 (Advanced Video Coding (AVC)) in March, 2003.

Furthermore, as an extension thereof, Fidelity Range Extension (FRExt) including an encoding tool necessary for professional use such as RGB or YUV422 or YUV444 or 8×8 DCT and a quantization matrix which are specified in MPEG-2 has been standardized in February, 2005. As a result, the AVC scheme has become a coding scheme capable of also expressing a film noise included in a movie well and is being used in a wide range of applications such as a BD (Blu-ray (a registered trademark) Disc).

However, in recent years, there is an increasing need for high compression rate coding capable of compressing an image of about 4000×2000 pixels which are 4 times as high as a high-definition image or delivering a high-definition image in a limited transmission capacity environment such as the Internet. To this end, an improvement in coding efficiency has been under continuous review by Video Coding Expert Group (VCEG) under ITU-T.

Currently, in order to further improve coding efficiency to be higher than in the AVC, standardization of a coding scheme called High Efficiency Video Coding (HEVC) has been being conducted by Joint Collaboration Team-Video Coding (JCTVC) which is a joint standardization organization of ITU-T and ISO/IEC. Non Patent Document 1 has been issued as a draft as of August, 2013.

Meanwhile, in the AVC scheme and the HEVC scheme, a color gamut of an encoding target image is defined by colour_primaries of video usability information (VUI).

CITATION LIST

Non Patent Document

Non Patent Document 1: Benjamin Bross, Gary J. Sullivan, Ye-Kui Wang, "Editors' proposed corrections to HEVC version 1," JCTVC-M0432_v3, 2013 Apr. 18-Apr. 26

SUMMARY OF THE INVENTION

Problems to be Solved by the Invention

However, a color gamut of an encoding target image is defined by an index identifying any one of color gamuts defined in another standard. Thus, it is difficult to define a color gamut other than a fixed color gamut as a color gamut of an encoding target image, and it is difficult to accurately recognize a color gamut of an encoding target image at a decoding side.

The present disclosure was made in light of the foregoing, and it is desirable to enable a decoding side to accurately recognize a color gamut of an encoding target image.

Solutions to Problems

A decoding device according to a first aspect of the present disclosure includes: a receiving unit that receives an encoded stream including encoded data of an image and color gamut information indicating a color gamut of the image from an encoding device that transmits the encoded stream; an extracting unit that extracts the encoded data and the color gamut information from the encoded stream received by the receiving unit; and a decoding unit that decodes the encoded data extracted by the extracting unit, and generates the image.

A decoding method according to the first aspect of the present disclosure corresponds to the decoding device according to the first aspect of the present disclosure.

In the first aspect of the present disclosure, an encoded stream including encoded data of an image and color gamut information indicating a color gamut of the image is received from an encoding device that transmits the encoded stream, the encoded data and the color gamut information are extracted from the encoded stream, and the encoded data is decoded to generate the image.

An encoding device according to a second aspect of the present disclosure includes: an encoding unit that encodes an image, and generates encoded data; a setting unit that sets color gamut information indicating a color gamut of the image; and a transmitting unit that transmits an encoded stream including the encoded data generated by the encoding unit and the color gamut information generated by the setting unit.

An encoding method according to the second aspect of the present disclosure corresponds to the encoding device according to the second aspect of the present disclosure.

In the second aspect of the present disclosure, an image is encoded to generate encoded data, color gamut information indicating a color gamut of the image is set, and an encoded stream including the encoded data and the color gamut information is transmitted.

A decoding device according to a third aspect of the present disclosure includes: a receiving unit that receives an encoded stream including encoded data of an image, identification information identifying a certain color gamut, and a cover ratio of a color gamut of the image to the certain color gamut from an encoding device that transmits the encoded stream; an extracting unit that extracts the encoded data, the identification information, and the cover ratio from the encoded stream received by the receiving unit; and a decoding unit that decodes the encoded data extracted by the extracting unit, and generates the image.

A decoding method according to the third aspect of the present disclosure corresponds to the decoding device according to the third aspect of the present disclosure.

In the third aspect of the present disclosure, an encoded stream including encoded data of an image, identification information identifying a certain color gamut, and a cover ratio of a color gamut of the image to the certain color gamut is received from an encoding device that transmits the encoded stream, the encoded data, the identification information, and the cover ratio are extracted from the encoded stream, and the encoded data is decoded to generate the image.

An encoding device according to a fourth aspect of the present disclosure includes: an encoding unit that encodes an image and generates encoded data; a setting unit that sets identification information identifying a certain color gamut and a cover ratio of a color gamut of the image to the certain color gamut; and a transmitting unit that transmits an encoded stream including the encoded data generated in the encoding unit and the identification information and the cover ratio generated in the setting unit.

An encoding method according to the fourth aspect of the present disclosure corresponds to the encoding device according to the fourth aspect of the present disclosure.

In the fourth aspect of the present disclosure, an image is encoded to generate encoded data, identification information identifying a certain color gamut and a cover ratio of a color gamut of the image to the certain color gamut are set, and an encoded stream including the encoded data, the identification information, and the cover ratio is transmitted.

The decoding devices according to the first and third aspects and the encoding devices according to the second and fourth aspects may be implemented by causing a computer to execute a program.

The program executed by the computer to implement the decoding devices according to the first and third aspects and the encoding devices according to the second and fourth aspects may be provided such that the program is transmitted via a transmission medium or recorded in a recording medium.

A decoding device according to a fifth aspect of the present disclosure includes: circuitry configured to receive an encoded stream including encoded data of an image and color primary information indicating a coordinate of at least one color primary of the image; extract the encoded data and the color primary information from the received encoded stream; decode the extracted encoded data to generate the image based on the decoded data; and adjust a color space of the generated image based on the extracted color primary information.

A decoding method according to the fifth aspect of the present disclosure corresponds to the decoding device according to the fifth aspect of the present disclosure.

In the fifth aspect of the present disclosure, an encoded stream including encoded data of an image and color primary information indicating a coordinate of at least one color primary of the image is received, the encoded data and the color primary information are extracted by circuitry of the decoding device from the received encoded stream, the encoded data is decoded to generate the image, and a color space of the image is adjusted by the circuitry based on the extracted color primary information.

A non-transitory computer-readable medium according to a sixth aspect of the present disclosure has stored thereon: an encoded stream including encoded data of an image and color primary information indicating a coordinate of at least one color primary of the image, wherein a decoding device decodes the encoded data to generate the image, and adjusts a color space of the generated image based on the color primary information.

An encoding device according to a seventh aspect of the present disclosure includes: circuitry configured to encode an image; generate encoded data; set color primary information indicating a coordinate of at least one color primary of the image; and transmit an encoded stream including the generated encoded data and the generated color primary information.

The decoding device according to the first, third, or fifth aspect and the encoding device according to the second, fourth, or seventh aspect may be an independent device or may be an internal block configuring a single device.

Effects of the Invention

According to the first and third aspects of the present disclosure, it is possible to decode encoded data of an image. Further, according to the first and third aspects of the present disclosure, it is possible to accurately recognize a color gamut of an encoding target image.

Further, according to the second and fourth aspects of the present disclosure, it is possible to encode an image. Further, according to the second and fourth aspects of the present disclosure, it is possible to enable a decoding side to accurately recognize a color gamut of an encoding target image.

The effects described above are not necessarily limited, and may include any effect described in the present disclosure.

BRIEF DESCRIPTION OF DRAWINGS

FIG. 2 is a diagram illustrating an exemplary syntax of a colour_primaries_info SEI.

FIG. 3 is a diagram for describing content of information of the colour_primaries_info SEI.

FIG. 4 is a diagram for describing content of information of the colour_primaries_info SEI.

FIG. 5 is a diagram illustrating an exemplary syntax of colour_primaries_info_sei_element.

FIG. 6 is a diagram for describing content of information of colour_primaries_info_sei_element.

FIG. 7 is a diagram for describing content of information of colour_primaries_info_sei_element.

FIG. 8 is a diagram illustrating an exemplary syntax of a ref_display_luminance_info SEI.

FIG. 9 is a diagram for describing content of information of the ref_display_luminance_info SEI.

FIG. 13 is a block diagram illustrating an exemplary configuration of an encoding device according to a second embodiment of the present disclosure.

FIG. 14 is a diagram illustrating an exemplary syntax of a colour_primaries_info SEI.

FIG. 15 is a diagram for describing information of the colour_primaries_info SEI.

FIG. 16 is a diagram for describing information of the colour_primaries_info SEI.

FIG. 17 is a diagram for describing information of the colour_primaries_info SEI.

FIG. 18 is a diagram for describing information of the colour_primaries_info SEI.

FIG. 19 is a diagram for describing information of the colour_primaries_info SEI.

FIG. 23 is a diagram for describing an MP4 box as a system layer in which color gamut information and luminance information are arranged.

MODE FOR CARRYING OUT THE INVENTION

First Embodiment (Exemplary Configuration of Encoding Device According to First Embodiment)

Figure 1:
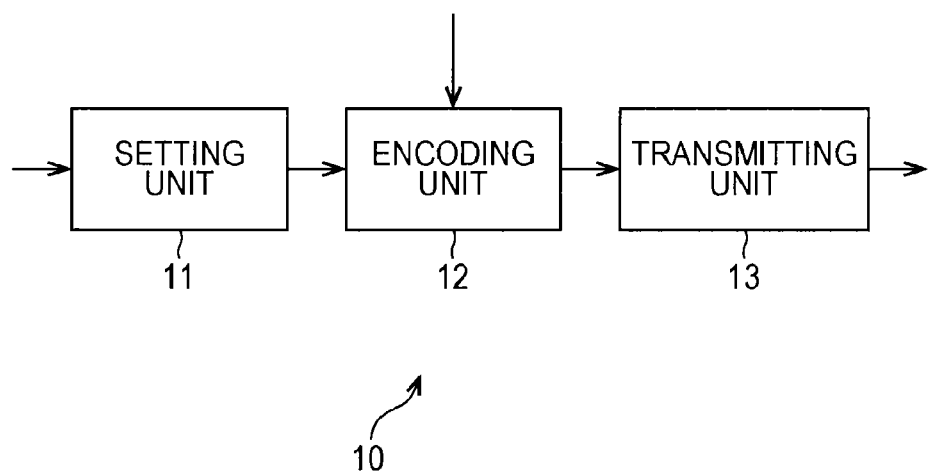
FIG. 1 is a block diagram illustrating an exemplary configuration of an encoding device according to a first embodiment of the present disclosure.

FIG. 1 is a block diagram illustrating an exemplary configuration of an encoding device according to a first embodiment of the present disclosure.

An encoding device 10 of FIG. 1 includes a setting unit 11, an encoding unit 12, and a transmitting unit 13, and encodes an image according to a scheme based on the HEVC scheme.

Specifically, the setting unit 11 of the encoding device 10 sets parameter sets such as a sequence parameter set (SPS), a picture parameter set (PPS), a VUI, and a supplemental enhancement information (SEI).

Examples of the SEI include a colour_primaries_info SEI, a ref_display_luminance_info SEI, and the like. The colour_primaries_info SEI is an SEI including color gamut information indicating a (boundary of) a color gamut. The ref_display_luminance_info SEI is an SEI including luminance information (color gamut information of a master display) indicating luminance levels of white, gray, and black of the master display (display unit) that displays an encoding target image at the time of authoring of the encoding target image. The setting unit 11 provides the set parameter sets to the encoding unit 12.

The encoding target image is input to the encoding unit 12 in units of frames. The encoding unit 12 encodes the input encoding target image according to the HEVC scheme. The encoding unit 12 generates an encoded stream based on encoded data obtained as a result of encoding and the parameter sets provided from the setting unit 11, and provides the encoded stream to the transmitting unit 13.

The transmitting unit 13 transmits the encoded stream provided from the encoding unit 12 to a decoding device which will be described later.

(Exemplary Syntax of Colour_Primaries_Info SEI)

FIG. 2 is a diagram illustrating an exemplary syntax of the colour_primaries_info SEI.

As illustrated in a second line of FIG. 2, colour_primaries_info_id is described in the colour_primaries_info SEI. As illustrated in FIG. 3, colour_primaries_info_id is an ID identifying the purpose of the color gamut information.

As illustrated in a third line of FIG. 2, colour_primaries_type is described in the colour_primaries_info SEI. As illustrated in FIG. 3, colour_primaries_type indicates a color space type. For example, as illustrated in a table of FIG. 3, colour_primaries_type is 1 when a color space type is an RGB color coordinate system, and colour_primaries_type is 2 when a color space type is an XYZ color coordinate system.

As illustrated in a fourth line of FIG. 2, colour_primaries_info_present_flag is described in the colour_primaries_info SEI. As illustrated in FIG. 3, colour_primaries_info_present_flag is a flag indicating whether or not primary color information indicating a position of the primary color in the color space in the color gamut information is described in the colour_primaries_info SEI. colour_primaries_info_present_flag is 1 when the primary color information is described, and colour_primaries_info_present_flag is 0 when the primary color information is not described.

As illustrated in a fifth line of FIG. 2, white_point_info_present_flag is described in the colour_primaries_info SET. As illustrated in FIG. 3, white_point_info_present_flag is a flag indicating whether or not white information indicating a position (white point) of white in the color space in the color gamut information is described in the colour_primaries_info SEI. White_point_info_present_flag is 1 when the white information is described, and white_point_info_present_flag is 0 when the white information is not described.

As illustrated in sixth and seventh lines of FIG. 2, when colour_description_present_flag included in a VUI is 1, limited_colour_gamut_boundaries_flag is described in the colour_primaries_info SET. Further, colour_description_present_flag is a flag indicating whether or not an index identifying a color gamut defined in a VUI in another standard is described. Colour_description_present_flag is 1 when an index is described in a VUI, and colour_description_present_flag is 0 when an index is not described in a VUI.

Further, limited_colour_gamut_boundaries_flag is a flag indicating whether or not a color gamut of an encoding target image is limited to a color gamut identified by an index described in a VUI as illustrated in FIG. 4. Limited_colour_gamut_boundaries_flag is 0 when a color gamut is limited, and limited_colour_gamut_boundaries_flag is 1 when a color gamut is not limited.

As illustrated in eighth and ninth lines of FIG. 2, when limited_colour_gamut_boundaries_flag is 1, limited_colour_gamut_range_in_percent is described in the colour_primaries_info SEI. As illustrated in FIG. 4, limited_colour_gamut_range_in_percent indicates a cover ratio of a color gamut of an encoding target image to a color gamut identified by an index described in a VUI. In other words, limited_colour_gamut_range_in_percent is a ratio of a color gamut of an encoding target image to a color gamut identified by an index described in a VUI.

As illustrated in tenth and eleventh lines of FIG. 2, when colour_primaries_info_present_flag is 1, colour_primaries_order_type is described in the colour_primaries_info SEI. As illustrated in FIG. 4, colour_primaries_order_type is a type of a description order of the primary color information.

For example, as illustrated in a table of FIG. 4, when the color space type is the RGB color coordinate system, the primary color information is described in the order of red, green, and blue, red, green, and blue, and then described in the descending order of wavelengths of the other colors (for example, the order of yellow and cyan), colour_primaries_order_type is 1. Further, when the color space type is the RGB color coordinate system and the primary color information is described in the descending order of wavelengths (for example, the order of red, yellow, green, cyan, and blue), colour_primaries_order_type is 2. When the color space type is the XYZ color coordinate system and the primary color information is described in the order of X, Y, and Z, colour_primaries_order_type is 3.

Further, as illustrated in a twelfth line of FIG. 2, when colour_primaries_info_present_flag is 1, num_colour_primaries_minus3 is described in the colour_primaries_info SEI. As illustrated in FIG. 4, num_colour_primaries_minus3 is a value obtained by subtracting three from the number of pieces of primary color information described in the colour_primaries_info SEI.

As illustrated in thirteenth and sixteenth lines of FIG. 2, when colour_primaries_info_present_flag is 1, primary color information is described in the colour_primaries_info SEI by the number obtained by adding three to num_colour_primaries_minus3. The primary color information includes colour_primaries_info_sei_element (ColourPrimaryXSign[i], ColourPrimaryXExp[i], ColourPrimaryXMantissa[i], and ColourPrimaryXManlen[i]) indicating positions of primary colors in an X direction in the color space and colour_primaries_info_sei_element (ColourPrimaryYSign[i], ColourPrimaryYExp[i], ColourPrimaryYMantissa[i], and ColourPrimaryYManlen[i]) indicating positions in a Y direction.

As illustrated in seventeenth to nineteenth lines of FIG. 2, when white_point_info_present_flag is 1, white information is described in the colour_primaries_info SEI.

The white information includes colour_primaries_info_sei_element (WhitePointXSign, WhitePointXExp, WhitePointXMantissa, WhitePointXManlen) indicating a position of white in the X direction in the color space and colour_primaries_info_sei_element (WhitePointYSign, WhitePointYExp, WhitePointYMantissa, WhitePointYManlen) indicating a position in the Y direction.

(Exemplary Syntax of Colour_Primaries_Info_Sei_Element)

FIG. 5 is a diagram illustrating an exemplary syntax of colour_primaries_info_sei_element configuring the primary color information and the white information.

As illustrated in FIG. 5, colour_primaries_info_sei_element includes colour_primaries_info_sign, colour_primaries_info_exponent, colour_primaries_info_mantissa_len_minus1, and colour_primaries_info_mantissa.

In FIG. 5, ColourPrimaryXSign[i], ColourPrimaryYSign[i], WhitePointXSign, and WhitePointYSign are referred to collectively as "OutSign." Similarly, ColourPrimaryXExp[i], ColourPrimaryYExp[i], WhitePointXExp, and WhitePointYExp are referred to collectively as "OutExp," and ColourPrimaryXMantissa[i], ColourPrimaryYMantissa[i], WhitePointXMantissa, and WhitePointYMantissa are referred to collectively as "OutMantissa." Further, ColourPrimaryXManlen[i], ColourPrimaryYManlen[i], WhitePointXManlen, and WhitePointYManlen are referred to collectively as "OutManLen."

As illustrated in FIG. 6, colour_primaries_info_sign indicates a sign of a floating point of coordinates a position of a corresponding color in a color space. colour_primaries_info_sign is 0 when the sign is positive, and colour_primaries_info_sign is 1 when the sign is negative.

As illustrated in FIG. 6, colour_primaries_info_exponent indicates an exponent of a floating point of coordinates a position of a corresponding color in a color space.

As illustrated in FIG. 6, colour_primaries_info_mantissa_len_minus1 is a value obtained by subtracting 1 from the number of bits of colour_primaries_info_mantissa. As illustrated in FIG. 6, colour_primaries_info_mantissa is a mantissa of a floating point of coordinates of a position of a corresponding color in a color space.

As described above, colour_primaries_info_sei_element can indicate coordinates x of a position of a corresponding color in a color space. In other words, as illustrated in FIG. 7, the coordinates x can be obtained by the following Equations (1) using colour_primaries_info_sign, colour_primaries_info_exponent, colour_primaries_info_mantissa_len_minus1, and colour_primaries_info_mantissa.

[Mathematical Formula 1]

$$\text{If } 0<e<127, x=(-1)^s*2^{e-31}*(1+n\div 2^V)$$

$$\text{If } e=0, x=(-1)^s*2^{-(30+V)}*n \quad (1)$$

In Equation (1), s denotes colour_primaries_info_sign, and e indicates colour_primaries_info_exponent. Further, n denotes colour_primaries_info_mantissa, and v denotes colour_primaries_info_mantissa_len_minus1.

For example, when colour_primaries_info_sei_element is colour_primaries_info_sei_element (ColourPrimaryXSign[i], ColourPrimaryXExp[i], ColourPrimaryXMantissa[i], and ColourPrimaryXManlen[i]) indicating coordinates ColourPrimariesX of the primary colors in the x direction in the color space, ColourPrimariesXSign that is colour_primaries_info_sign of colour_primaries_info_sei_element (ColourPrimaryXSign[i], ColourPrimaryXExp[i], ColourPrimaryXMantissa[i], and ColourPrimaryXManlen[i]) is substituted into s of Equation (1) as illustrated in a table of FIG. 7.

Further, ColourPrimariesXExp that is colour_primaries_info_exponent of colour_primaries_info_sei_element (ColourPrimaryXSign[i], ColourPrimaryXExp[i], ColourPrimaryXMantissa[i], and ColourPrimaryXManlen[i]) is substituted into e of Equation (1). Furthermore, ColourPrimaryXMantissa that is colour_primaries_info_mantissa of colour_primaries_info_sei_element (ColourPrimaryXSign[i], ColourPrimaryXExp[i], ColourPrimaryXMantissa[i], and ColourPrimaryXManlen[i]) is substituted into n of Equation (1), and ColourPrimaryXManlen that is colour_primaries_info_mantissa_len_minus1 is substituted into v. Thus, coordinates ColourPrimariesX of the positions of the primary colors in the x direction in the color space are calculated as the coordinates x.

Similarly, when colour_primaries_info_sei_element is colour_primaries_info_sei_element (ColourPrimaryYSign[i], ColourPrimaryYExp[i], and ColourPrimaryYMantissa[i], ColourPrimaryYManlen[i]), coordinates ColourPrimariesY of the positions of the primary colors in the y direction in the color space are calculated as the coordinates x.

When colour_primaries_info_sei_element is colour_primaries_info_sei_element (WhitePointXSign, WhitePointYExp, WhitePointXMantissa, and WhitePointXManlen), coordinates WhitePointX of the position of white in the x direction in the color space are calculated as the coordinates x.

When colour_primaries_info_sei_element is colour_primaries_info_sei_element (WhitePointYSign, WhitePointYExp, WhitePointYMantissa, and WhitePointYManlen), coordinates WhitePointY of the position of white in the y direction in the color space are calculated as the coordinates x.

(Exemplary Syntax of Ref_Display_Luminance_Info SEI)

FIG. 8 is a diagram illustrating an exemplary syntax of the ref_display_luminance_info SEI.

As illustrated in a second line of FIG. 8, ref_display_luminance_info_id is described in the ref_display_luminance_info SEI. As illustrated in FIG. 9, ref_display_luminance_info_id an ID identifying the purpose of luminance information of white, gray, and black of the master display (reference display).

As illustrated in a third line of FIG. 8, ref_display_luminance_white_present_flag is described in the ref_display_luminance_info SEI. As illustrated in FIG. 9, ref_display_luminance_white_present_flag is a flag indicating whether or not luminance information of white of the master display is described in the ref_display_luminance_info SEI. When the luminance information of white of the master display is described in the ref_display_luminance_info SEI, ref_display_luminance_white_present_flag is 1, and when the luminance information of white of the master display is not described in the ref_display_luminance_info SEI, ref_display_luminance_white_present_flag is 0.

As illustrated in fourth and fifth lines of FIG. 8, even for black and gray, similarly, ref_display_luminance_black_present_flag and ref_display_luminance_gray_present_flag are described in the ref_display_luminance_info SEI.

Further, as illustrated in sixth and seventh lines of FIG. 8, when ref_display_luminance_white_present_flag is 1, ref_display_luminance_white is described in the ref_display_luminance_info SEI. As illustrated in FIG. 9, ref_display_luminance_white is luminance information of white.

As illustrated in eighth and ninth lines of FIG. 8, for black, similarly, when ref_display_luminance_black_present_flag is 1, ref_display_luminance_black serving as luminance information of black is described in the ref_display_luminance_info SEI.

Further, as illustrated in tenth and eleventh lines of FIG. 8, even for gray, similarly, when ref_display_luminance_gray_present_flag is 1, ref_display_luminance_gray serving as luminance information of gray is described in the ref_display_luminance_info SEI.

(Description of Processing of Encoding Device)

Figure 10:
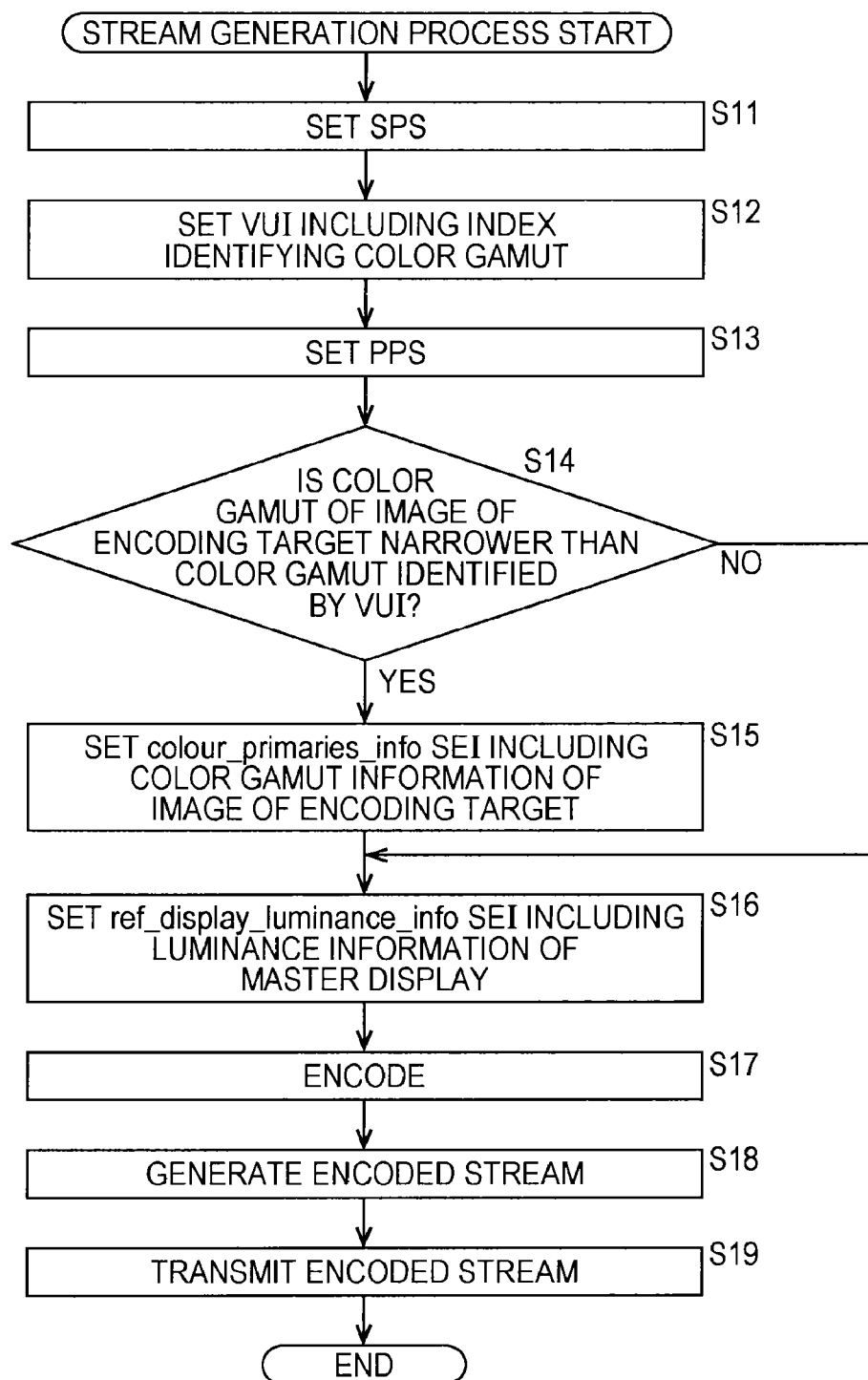
FIG. 10 is a flowchart for describing a stream generation process of an encoding device.

FIG. 10 is a flowchart for describing a stream generation process of the encoding device 10.

In step S11 of FIG. 10, the setting unit 11 of the encoding device 10 sets an SPS. In step S12, the setting unit 11 sets a VUI including an index (identification information) identifying a color gamut defined in another standard.

In step S13, the setting unit 11 sets a PPS. In step S14, the setting unit 11 determines whether or not a color gamut of an encoding target image is narrower than a color gamut identified by the index included in the VUI.

When it is determined in step S14 that the color gamut of the encoding target image is narrower than the color gamut identified by the index included in the VUI, the process proceeds to step S15. In step S15, the setting unit 11 sets the colour_primaries_info SEI including color gamut information of the encoding target image, and the process proceeds to step S16.

Meanwhile, when it is determined in step S14 that the color gamut of the encoding target image is not narrower than the color gamut identified by the index included in the VUI, the colour_primaries_info SEI including the color gamut information of the encoding target image is not set. For example, the colour_primaries_info SEI including limited_colour_gamut_range_in_percent is set. Then, the process proceeds to step S16.

In step S16, the setting unit 11 sets the ref_display_luminance_info SEI including the luminance information of white, gray, and black of the master display. The setting unit 11 provides the parameter sets such as the set SPS, the PPS, the VUI, the colour_primaries_info SEI, and the ref_display_luminance_info SEI to the encoding unit 12.

In step S17, the encoding unit 12 encodes an encoding target image of frame units input from the outside according to the HEVC scheme. In step S18, the encoding unit 12 generates encoded stream based on encoded data obtained as a result of encoding and the parameter sets provided from the setting unit 11, and provides the encoded stream to the transmitting unit 13.

In step S19, the transmitting unit 13 transmits the encoded stream provided from the encoding unit 12 to the decoding device which will be described later, and then the process ends.

As described above, the encoding device 10 sets and transmits the colour_primaries_info SEI including the color gamut information, and thus even when an encoding target image has a color gamut different from a color gamut defined in another standard, it is possible to enable the decoding side to accurately recognize a color gamut of an encoding target image.

Further, the encoding device 10 sets and transmits the ref_display_luminance_info SEI including the luminance information of white, black, and gray, and thus it is possible to enable the decoding side to recognize the luminance information of the master display.

The above description has been made in connection with the example in which the colour_primaries_info SEI including the color gamut information is set when the color gamut of the encoding target image is narrower than the color gamut identified by the index included in the VUI, but the colour_primaries_info SEI including the color gamut information may be set when the color gamut of the encoding target image is broader than the color gamut identified by the index included in the VUI.

(Exemplary Configuration of Decoding Device According to First Embodiment)

Figure 11:
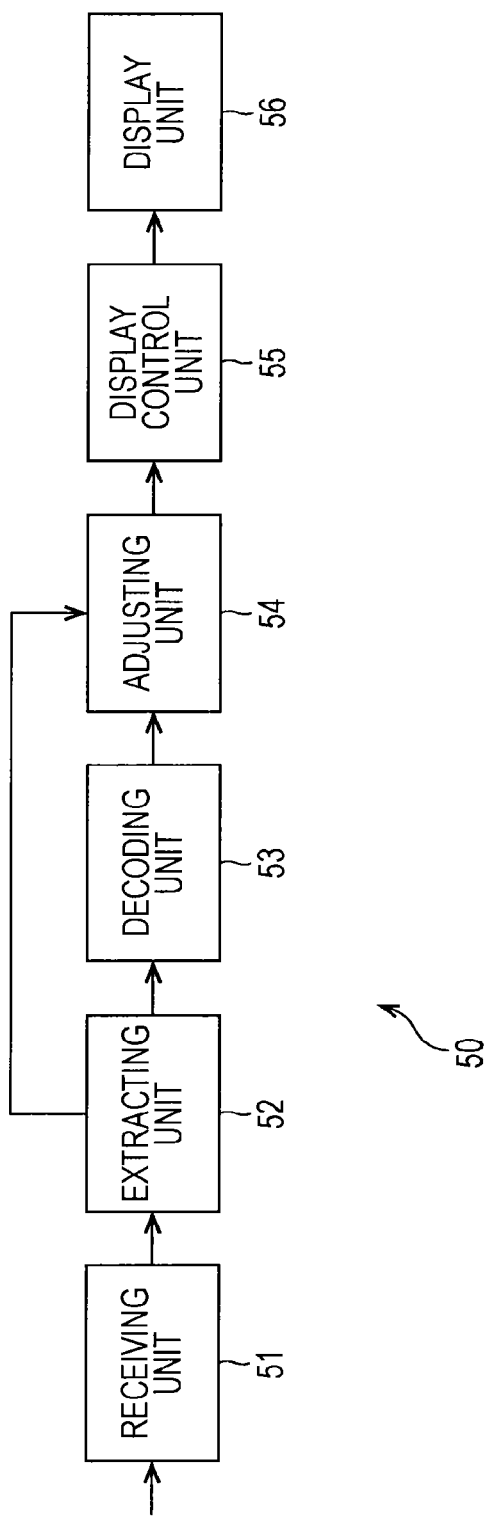
FIG. 11 is a block diagram illustrating an exemplary configuration of a decoding device according to the first embodiment of the present disclosure.

FIG. 11 is a block diagram illustrating an exemplary configuration of a decoding device that decodes the encoded stream transmitted from the encoding device 10 of FIG. 1 according to the first embodiment of the present disclosure.

A decoding device 50 of FIG. 11 includes a receiving unit 51, an extracting unit 52, a decoding unit 53, an adjusting unit 54, a display control unit 55, and a display unit 56.

The receiving unit 51 of the decoding device 50 receives the encoded stream transmitted from the encoding device 10 of FIG. 1, and provides the encoded stream to the extracting unit 52.

The extracting unit 52 extracts parameter sets and encoded data from the encoded stream provided from the receiving unit 51. The extracting unit 52 provides the parameter sets and the encoded data to the decoding unit 53. Further, the extracting unit 52 provides the VUI, the colour_primaries_info SEI, the ref_display_luminance_info SEI among the parameter sets to the adjusting unit 54.

The decoding unit 53 decodes the encoded data provided from the extracting unit 52 according to the HEVC scheme. At this time, the decoding unit 53 also refers to the parameter sets provided from the extracting unit 52 as necessary. The decoding unit 53 provides an image obtained as a result of decoding to the adjusting unit 54.

The adjusting unit 54 acquires color gamut information from the colour_primaries_info SEI provided from the extracting unit 52 or recognizes a color gamut based on the index included in the VUI. The adjusting unit 54 adjusts a color gamut of the image provided from the decoding unit 53 based on either a color gamut indicated by the acquired color gamut information or the recognized color gamut and a color gamut of the display unit 56.

Further, the adjusting unit 54 acquires the luminance information of white, black, and gray from the ref_display_luminance_info SEI provided from the extracting unit 52. The adjusting unit 54 adjusts a luminance dynamic range of the image whose color gamut has been adjusted based on the acquired luminance information and the luminance information of the display unit 56. The adjusting unit 54 provides the image whose luminance dynamic range has been adjusted to the display control unit 55.

Here, the adjusting of the luminance dynamic range is assumed to be performed after the adjusting of the color gamut, but the adjusting of the luminance dynamic range may be performed before the adjusting of the color gamut.

The display control unit 55 causes the image provided from the adjusting unit 54 to be displayed on the display unit 56.

(Description of Processing of Decoding Device)

Figure 12:
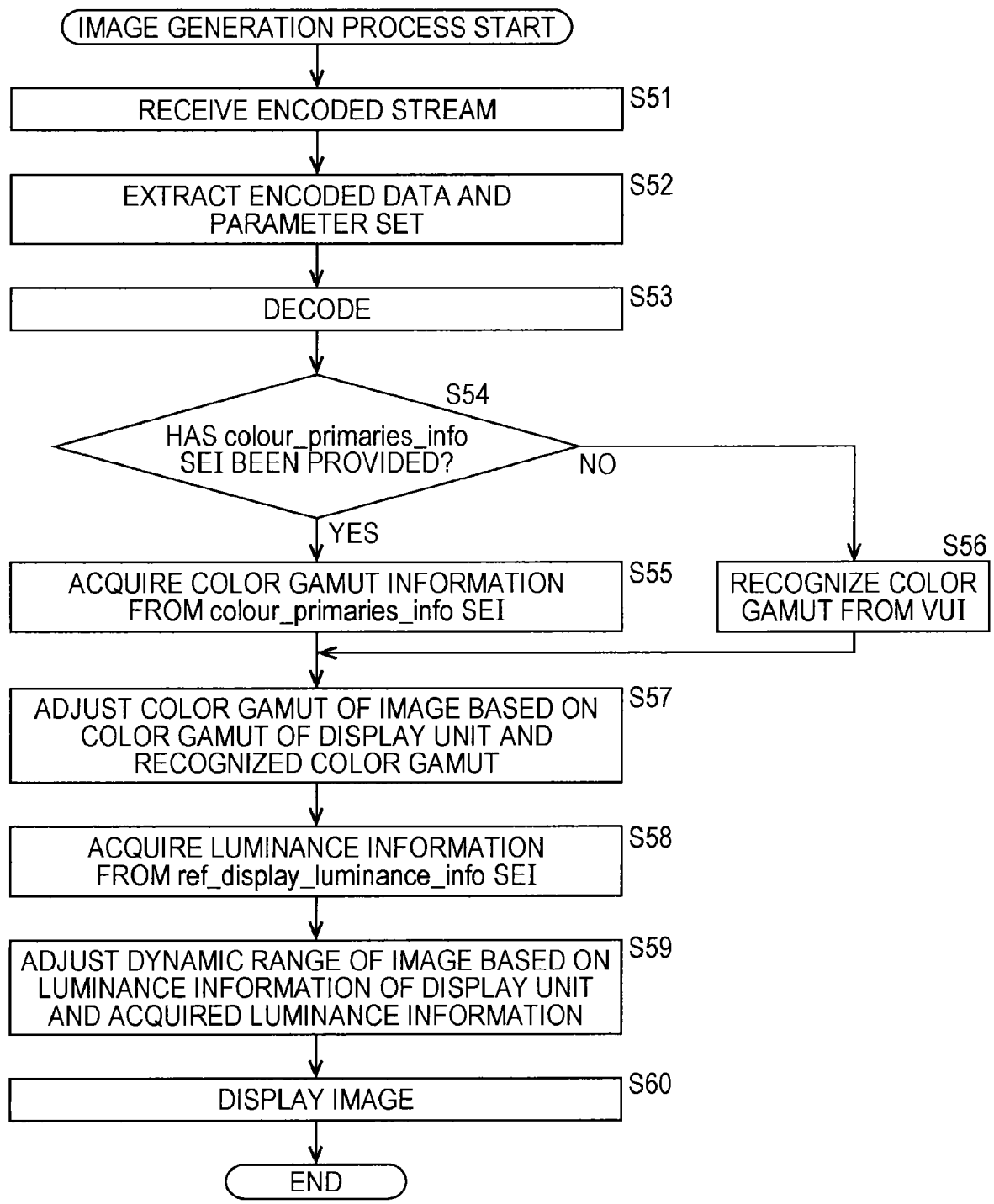
FIG. 12 is a flowchart for describing an image generation process of the decoding device of FIG. 11.

FIG. 12 is a flowchart for describing an image generation process of the decoding device 50 of FIG. 11.

In step S51 of FIG. 12, the receiving unit 51 of the decoding device 50 receives the encoded stream transmitted from the encoding device 10 of FIG. 1, and provides the encoded stream to the extracting unit 52.

In step S52, the extracting unit 52 extracts parameter sets and encoded data from the encoded stream provided from the receiving unit 51. The extracting unit 52 provides the parameter sets and the encoded data to the decoding unit 53. Further, the extracting unit 52 provides the VUI, the colour_primaries_info SEI, the ref_display_luminance_info SEI among the parameter sets to the adjusting unit 54.

In step S53, the decoding unit 53 decodes the encoded data provided from the extracting unit 52 according to the HEVC scheme. At this time, the decoding unit 53 refers to the parameter sets provided from the extracting unit 52 as necessary. The decoding unit 53 provides an image obtained as a result of decoding to the adjusting unit 54.

In step S54, the adjusting unit 54 determines whether or not the colour_primaries_info SEI has been provided from the extracting unit 52. When it is determined in step S54 that the colour_primaries_info SEI has been provided, the process proceeds to step S55.

In step S55, the adjusting unit 54 acquires the color gamut information from the colour_primaries_info SEI, and recognizes a color gamut indicated by the acquired color gamut information. Further, when the color gamut information is not included in the colour_primaries_info SEI, for example, a color gamut is recognized based on limited_colour_gamut_range_in_percent. Then, the process proceeds to step S57.

Meanwhile, when it is determined in step S54 that the colour_primaries_info SEI has not been provided, in step S56, the adjusting unit 54 recognizes a color gamut defined in another standard based on the index included in the VUI provided from the extracting unit 52. Then, the process proceeds to step S57.

In step S57, the adjusting unit 54 adjusts a color gamut of the image provided from the decoding unit 53 based on the color gamut of the display unit 56 or the color gamut recognized in step S55 or step S56.

In step S58, the adjusting unit 54 acquires the luminance information of white, black, and gray from the ref_display_luminance_info SEI provided from the extracting unit 52.

In step S59, the adjusting unit 54 adjusts a luminance dynamic range of the image whose color gamut has been adjusted based on the luminance information of the display unit 56 and the acquired luminance information. The adjusting unit 54 provides the image whose luminance dynamic range has been adjusted to the display control unit 55.

In step S60, the display control unit 55 causes the image provided from the adjusting unit 54 to be displayed on the display unit 56, and then the process ends.

As described above, the decoding device 50 receives the colour_primaries_info SEI including the color gamut information, and thus can accurately recognize a color gamut of an encoding target image. As a result, it is possible to optimize a color gamut of a decoded image. In other words, when a color gamut of an encoding target image has a color gamut different from a color gamut defined in another standard, it is possible to a color gamut of a decoded image from being reduced or enlarged in vain.

Further, the decoding device 50 receives the ref_display_luminance_info SEI including the luminance information of white, black, and gray and thus accurately recognize the luminance information of the master display. As a result, it is possible to optimize a luminance dynamic range of a decoded image.

Furthermore, when a color gamut of an encoding target image is larger than a color gamut identified by an index included in the VUI, the color gamut information may not be described in the colour_primaries_info SEI. In this case, the decoding device 50 recognizes a color gamut of an encoding target image and adjusts a color gamut based on limited_colour_gamut_range_in_percent and a color gamut identified by an index included in a VUI.

As described above, when the color gamut information is not described, the decoding device 50 can accurately recognize a color gamut of an encoding target image based on limited_colour_gamut_range_in_percent, compared to when a color gamut of an encoding target is defined by an index of a VUI.

Second Embodiment (Exemplary Configuration of Encoding Device According to Second Embodiment)

FIG. 13 is a block diagram illustrating an exemplary configuration of an encoding device according to a second embodiment of the present disclosure.

Among components illustrated in FIG. 13, the same components as the components illustrated in FIG. 1 are denoted by the same reference numerals. A repeated description will be appropriately omitted.

A configuration of an encoding device 70 of FIG. 13 differs from the configuration of FIG. 1 in that a setting unit 72 is provided instead of the setting unit 11, and an image adjusting unit 71 is newly provided.

An image is input to the image adjusting unit 71 of the encoding device 70 from the outside. The image adjusting unit 71 performs, for example, an operation of editing an image input from the outside while causing the image to be displayed on the master display (not illustrated) according to a user's authoring work. The image adjusting unit 71 provides color gamut information of an edited image and luminance information of white and black of the master display (not illustrated) to the setting unit 72. Further, the image adjusting unit 71 inputs the edited image to the encoding unit 12 as an encoding target image.

The setting unit 72 sets an SPS, a PPS, and a VUI. Further, the setting unit 72 sets the colour_primaries_info SEI including the color gamut information and the luminance information provided from the image adjusting unit 71. The setting unit 72 provides the parameter sets such as the set SPS, the PPS, the VUI, and the colour_primaries_info SEI to the encoding unit 12.

(Exemplary Syntax of Colour_Primaries_Info SEI)

FIG. 14 is a diagram illustrating an exemplary syntax of the colour_primaries_info SEI, and FIGS. 15 to 19 are diagrams for describing information of the colour_primaries_info SEI.

As illustrated in FIG. 14, colour_primaries_info_id is described in the colour_primaries_info SEI. As illustrated in FIG. 15, colour_primaries_info_id is an ID identifying the purpose of the color gamut information.

Further, as illustrated in FIG. 14, colour_primaries_cancel_flag is described in the colour_primaries_info SEI. As illustrated in FIG. 15, colour_primaries_cancel_flag is a flag indicating whether or not continuity of a previous colour_primaries_info SEI is canceled. Colour_primaries_cancel_flag is 1 when the continuity of the previous colour_primaries_info SEI is canceled, and it is 0 when the continuity of the previous colour_primaries_info SEI is not canceled.

As illustrated in FIG. 14, when colour_primaries_cancel_flag is 0, colour_primaries_persistence_flag is described in the colour_primaries_info SEI. As illustrated in FIG. 15, colour_primaries_persistence_flag is a flag indicating whether or not the color gamut information and the luminance information included in the colour_primaries_info SEI is applied to a plurality of consecutive pictures. colour_primaries_persistence_flag is 1 when the color gamut information and the luminance information are applied to a plurality of consecutive pictures, and it is 0 when the color gamut information and the luminance information are applied to only one picture.

Further, as illustrated in FIG. 14, white_level_display_luminance_present_flag is described in the colour_primaries_info SEI. As illustrated in FIG. 16, white_level_display_luminance_present_flag is a flag indicating whether or not white_level_display_luminance is described in the colour_primaries_info SEI. As illustrated in FIG. 19, white_level_display_luminance is the luminance information of white of the master display. White_level_display_luminance_present_flag is 1 when the luminance information of white of the master display is described in the colour_primaries_info SEI, and white_level_display_luminance_present_flag is 0 when the luminance information of white of the master display is not described in the colour_primaries_info SEI.

As illustrated in FIGS. 14 and 16, for black, similarly, black_level_display_luminance_present_flag is described in the colour_primaries_info SEI.

Further, as illustrated in FIG. 14, colour_gamut_coverage_present_flag is described in the colour_primaries_info SET. As illustrated in FIG. 16, colour_gamut_coverage_present_flag is a flag indicating whether or not colour_gamut_coverage is described in the colour_primaries_info SEI. As illustrated in FIG. 19, colour_gamut_coverage is information indicating a cover ratio of a color gamut of an encoding target image to a color gamut identified by an index described in a VUI. Colour_gamut_coverage_present_ flag is 1 when colour_gamut_coverage is described in the colour_primaries_info SEI, and colour_gamut_coverage_present_flag is 0 when colour_gamut_coverage is not described in the colour_primaries_info SEI.

As illustrated in FIGS. 14 and 17, colour_primary_Red_x indicating a chromaticity of red in the x direction in the CIE color coordinate system in the color gamut information and colour_primary_Red_y indicating a chromaticity of red in the y direction are also described in the colour_primaries_info SEI. As illustrated in FIGS. 14 and 18, for green, blue, and white, similarly, colour_primary_Green_x, colour_primary_Green_y, colour_primary_Blue_x, colour_primary_Blue_y, white_point_x, and white_point_y are described in the colour_primaries_info SEI as the color gamut information.

The color gamut information is described using a 16-bit fixed point. In other words, the color gamut information is considered to be transmitted from the image adjusting unit 71 or the like, for example, through Extended display identification data (EDID) of High-Definition Multimedia Interface (HDMI) (a registered trademark) in which a size of transmittable information is limited. Further, the applicant has currently proposed metadata related to a color gamut described using a fixed point as International Electrotechnical Commission (IEC) 61966-12-2. Thus, in order not to change the size of the color gamut information or in order to cause the proposed metadata to be used as the color gamut information, the color gamut information is described using a fixed point.

Further, the color gamut information according to the first embodiment may be described using a 16-bit fixed point as well.

As illustrated in FIG. 14, when white_level_display_luminance_present_flag is 1, white_level_display_luminance is described in the colour_primaries_info SEI. When black_level_display_luminance_present_flag is 1, black_level_display_luminance is described. As illustrated in FIG. 19, black_level_display_luminance is the luminance information of black of the master display.

As described above, white_level_display_luminance and black_level_display_luminance are described in the colour_primaries_info SEI. In other words, the applicant has currently proposed metadata related to luminance including luminance information of white and black as IEC 61966-12-2. Thus, in order to cause the proposed metadata to be used as white_level_display_luminance and black_level_display_luminance, white_level_display_luminance and black_level_display_luminance are described in the colour_primaries_info SEI.

Further, as illustrated in FIG. 14, when colour_gamut_coverage_present_flag is 1, colour_gamut_coverage is described in the colour_primaries_info SEI.

(Description of Processing of Encoding Device)

Figure 20:
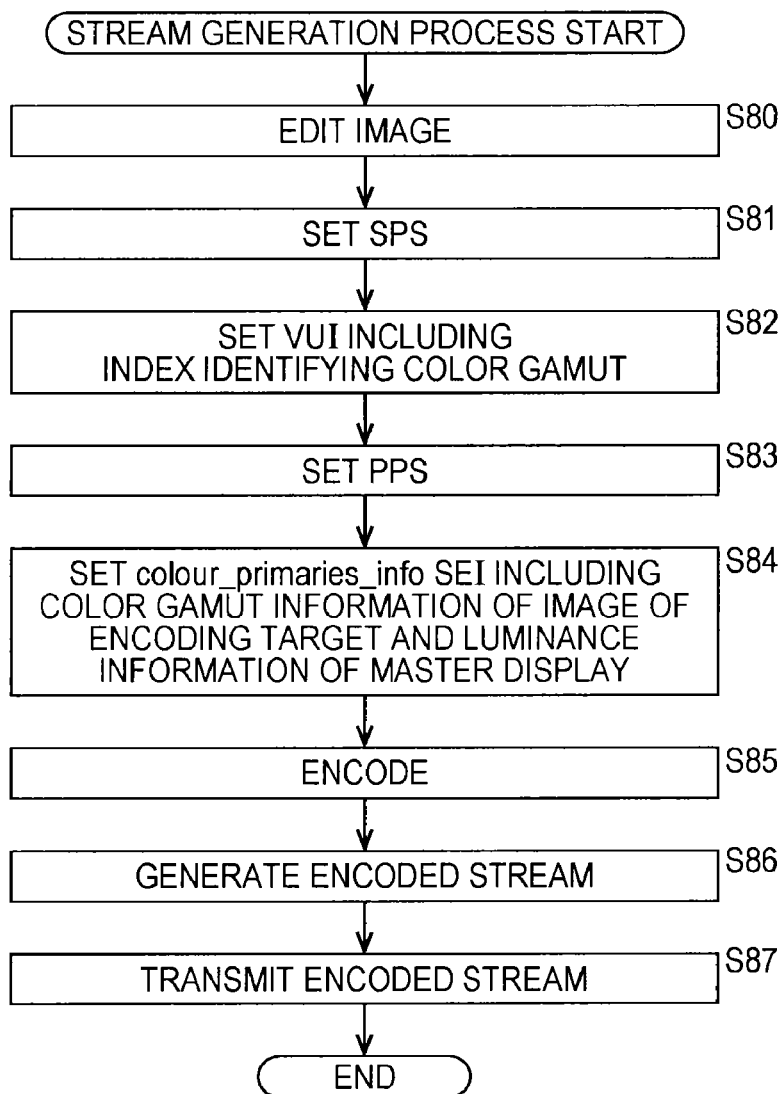
FIG. 20 is a flowchart for describing a stream generation process of an encoding device.

FIG. 20 is a flowchart for describing a stream generation process of the encoding device 70.

In step S80 of FIG. 20, the image adjusting unit 71 performs an operation of editing an image input from the outside while causing the image to be displayed on the master display (not illustrated) according to the user's authoring work. The image adjusting unit 71 provides color gamut information of an edited image and luminance information of white and black of the master display (not illustrated) to the setting unit 72. Further, the image adjusting unit 71 inputs the edited image to the encoding unit 12 as an encoding target image.

A process of steps S81 to S83 is the same as the process of steps S11 to S13 of FIG. 10, and thus a description thereof is omitted.

In step S84, the setting unit 72 sets the colour_primaries_info SEI including the color gamut information of the encoding target image and the luminance information of the master display provided from the image adjusting unit 71.

A process of steps S85 to S87 is the same as the process of steps S17 to S19 of FIG. 20, and thus a description thereof is omitted.

As described above, the encoding device 70 sets and transmits the colour_primaries_info SEI including the color gamut information, and thus even when an encoding target image has a color gamut different from a color gamut defined in another standard, it is possible to enable the decoding side to accurately recognize a color gamut of an encoding target image.

Further, the encoding device 70 sets white_level_display_luminance and black_level_display_luminance to the colour_primaries_info SEI and transmits the colour_primaries_info SEI, and thus it is possible to enable the decoding side to recognize the luminance information of the master display.

(Exemplary Configuration of Decoding Device According to Second Embodiment)

Figure 21:
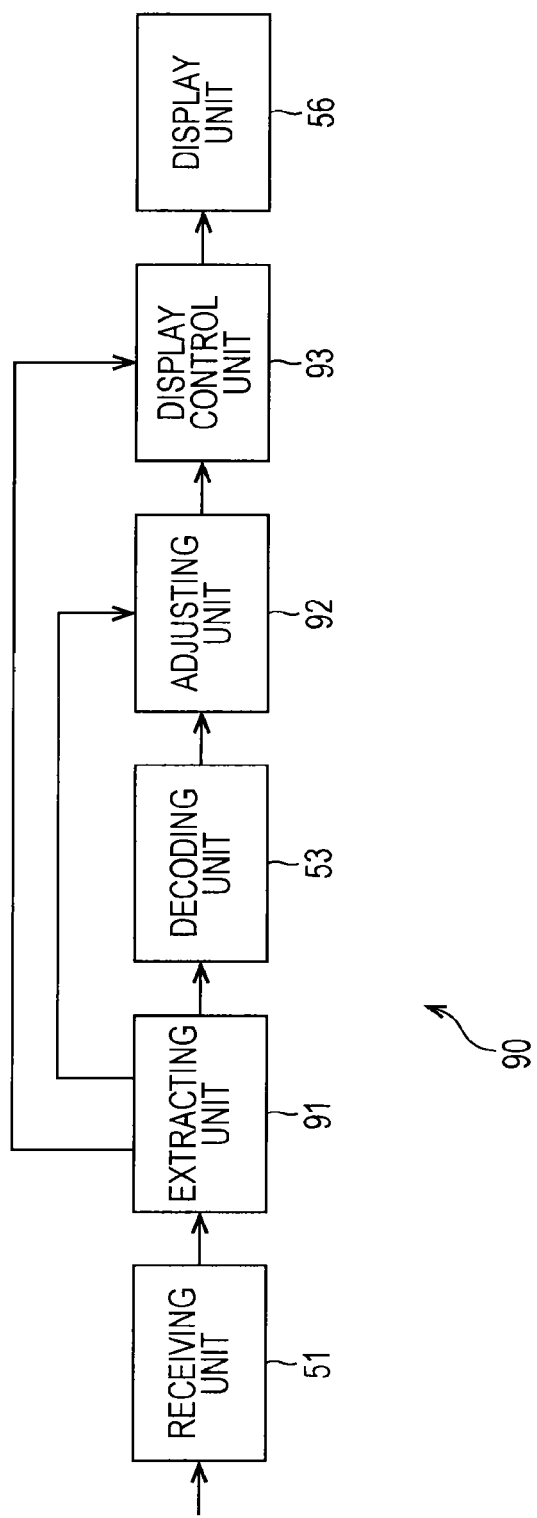
FIG. 21 is a block diagram illustrating an exemplary configuration of a decoding device according to the second embodiment of the present disclosure.

FIG. 21 is a block diagram illustrating an exemplary configuration of a decoding device that decodes the encoded stream transmitted from the encoding device 70 of FIG. 13 according to the second embodiment of the present disclosure.

Among components illustrated in FIG. 21, the same components as the components illustrated in FIG. 11 are denoted by the same reference numerals. A repeated description will be appropriately omitted.

A configuration of a decoding device 90 of FIG. 21 differs from the configuration of FIG. 11 in that an extracting unit 91, an adjusting unit 92, and a display control unit 93 are provided instead of the extracting unit 52, the adjusting unit 54, and the display control unit 55.

The extracting unit 91 of the decoding device 90 of FIG. 21 extracts parameter sets and encoded data from the encoded stream provided from the receiving unit 51. The extracting unit 91 provides the parameter sets and the encoded data to the decoding unit 53. Further, the extracting unit 91 provides the VUI and the colour_primaries_info SEI among the parameter sets to the adjusting unit 92, and provides the colour_primaries_info SEI to the display control unit 93.

The adjusting unit 92 acquires color gamut information and colour_gamut_coverage from the colour_primaries_info SEI provided from the extracting unit 91. Further, the adjusting unit 92 recognizes a color gamut based on an index included in the VUI provided from the extracting unit 91. The adjusting unit 92 adjusts the color gamut of the image provided from the decoding unit 53 based on either of the color gamut indicated by the acquired color gamut information and the recognized color gamut, the color gamut based on colour_gamut_coverage, and the color gamut of the display unit 56. The adjusting unit 92 provides the image whose color gamut has been adjusted to the display control unit 93.

The display control unit 93 acquires luminance information of white and black from the colour_primaries_info SEI provided from the extracting unit 91. The display control unit 93 adjusts a luminance dynamic range of the image of the adjusted color gamut provided from the adjusting unit 92 based on the acquired luminance information and the luminance information of the display unit 56. The display control unit 93 provides the image whose luminance dynamic range has been adjusted to be displayed on the display unit 56.

(Description of Processing of Decoding Device)

Figure 22:
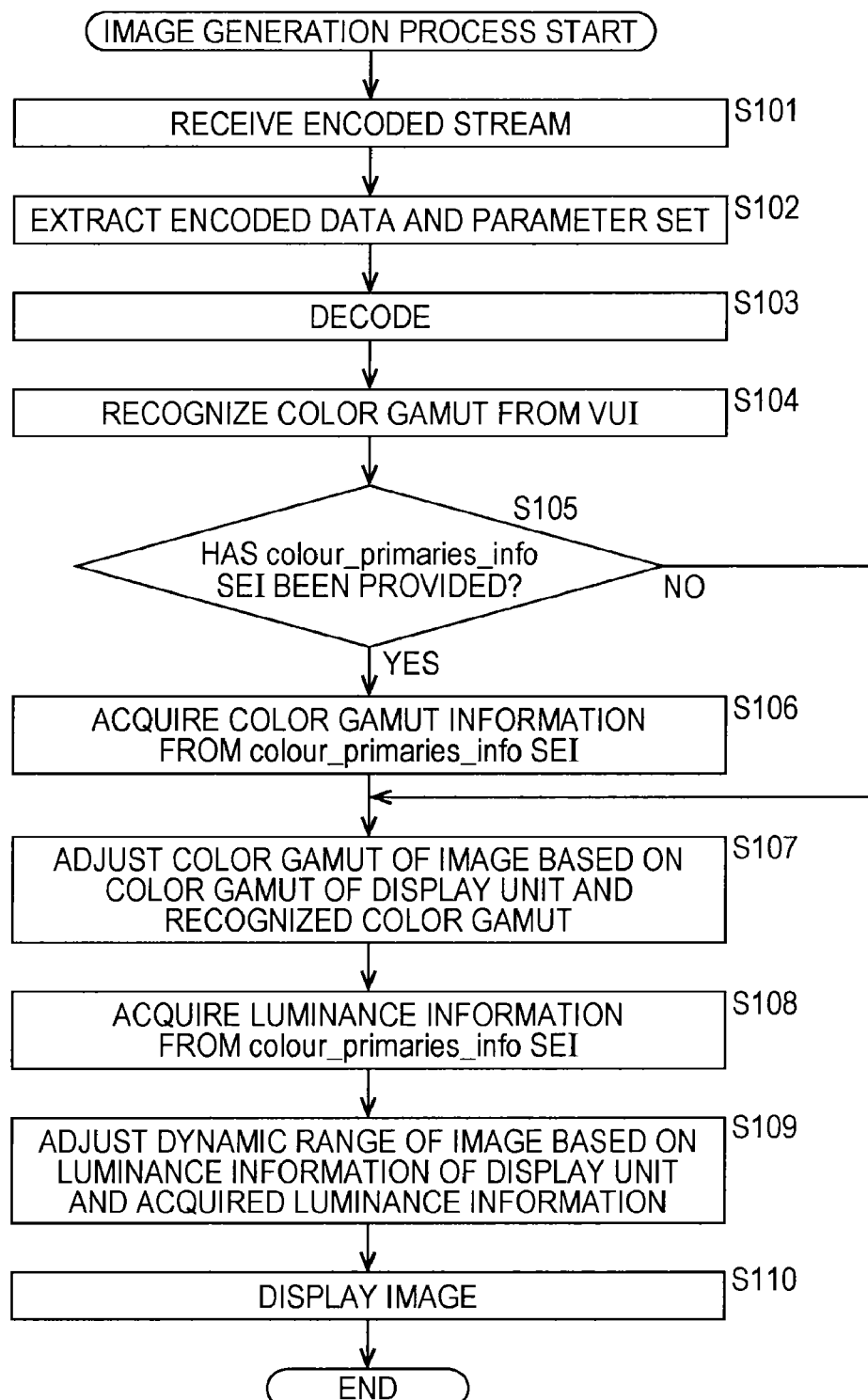
FIG. 22 is a flowchart for describing an image generation process of the decoding device of FIG. 21.

FIG. 22 is a flowchart for describing an image generation process of the decoding device 90 of FIG. 21.

In step S101 of FIG. 22, the receiving unit 51 of the decoding device 90 receives the encoded stream transmitted from the encoding device 70 of FIG. 13, and provides the encoded stream to the extracting unit 91.

In step S102, the extracting unit 91 extracts parameter sets and encoded data from the encoded stream provided from the receiving unit 51. The extracting unit 91 provides the parameter sets and the encoded data to the decoding unit 53. Further, the extracting unit 91 provides the VUI and the colour_primaries_info SEI among the parameter sets to the adjusting unit 92, and provides the colour_primaries_info SEI to the display control unit 93.

In step S103, the decoding unit 53 decodes the encoded data provided from the extracting unit 91 according to the HEVC scheme. At this time, the decoding unit 53 refers to the parameter sets provided from the extracting unit 91 as necessary. The decoding unit 53 provides an image obtained as a result of decoding to the adjusting unit 92.

In step S104, the adjusting unit 92 recognizes a color gamut defined in another standard based on an index included in the VUI provided from the extracting unit 91.

In step S105, the adjusting unit 92 determines whether or not the colour_primaries_info SEI has been provided from the extracting unit 91. When it is determined in step S105 that the colour_primaries_info SEI has been provided, the process proceeds to step S106.

In step S106, the adjusting unit 92 acquires the color gamut information from the colour_primaries_info SEI, and recognizes a color gamut indicated by the acquired color gamut information. Further, when the color gamut information is not included in the colour_primaries_info SEI, for example, a color gamut is recognized based on colour_gamut_coverage and the color gamut recognized in step S104. Then, the process proceeds to step S107.

Meanwhile, when it is determined in step S105 that the colour_primaries_info SEI has not been provided, the process proceeds to step S107.

In step S107, the adjusting unit 92 adjusts a color gamut of the image provided from the decoding unit 53 based on the color gamut of the display unit 56 or the color gamut recognized in step S104 or step S106.

In step S108, the display control unit 93 acquires luminance information of white and black from the colour_primaries_info SEI provided from the extracting unit 91. In step S109, the display control unit 93 adjusts a luminance dynamic range of the image of the adjusted color gamut provided from the adjusting unit 92 based on the luminance information of the display unit 56 and the acquired luminance information.

In step S110, the display control unit 93 provides the image whose luminance dynamic range has been adjusted to be displayed on the display unit 56, and then the process ends.

As described above, the decoding device 90 receives the colour_primaries_info SEI including the color gamut information, and thus can accurately recognize a color gamut of an encoding target image. As a result, it is possible to optimize a color gamut of a decoded image. In other words, when a color gamut of an encoding target image has a color gamut different from a color gamut defined in another standard, it is possible to a color gamut of a decoded image from being reduced or enlarged in vain.

For example, when a color gamut of the display unit 56 is larger than a color gamut of an encoding target image, the decoding device 90 can display a decoded image without adjusting a color gamut of the decoded image. As a result, it is possible to cause an image desired by an authoring operator to be displayed on the display unit 56.

Further, the decoding device 90 can display a high-quality decoded image by adjusting a color gamut of a decoded image based on an accurately recognized color gamut.

Furthermore, since white_level_display_luminance and black_level_display_luminance are also included in the colour_primaries_info SEI, the decoding device 90 can accurately recognize the luminance information of the master display. As a result, it is possible to optimize a luminance dynamic range of a decoded image.

The above description has been made in connection with the example in which the color gamut information and the luminance information are arranged in the SEI, but the color gamut information and the luminance information may be arranged in a system layer.

<Example in which Color Gamut Information and Luminance Information are Arranged in MP4 Box>

(Description of MP4 Box in which Color Gamut Information and Luminance Information are Arranged)

FIG. 23 is a diagram for describing an MP4 box as a system layer in which the color gamut information and the luminance information are arranged.

As illustrated in FIG. 23, when the color gamut information and the luminance information are arranged in the MP4 box, a Colour Primaries Information Box (tinf) box storing ColourPrimariesInfo as the color gamut information and the luminance information is newly defined. The tinf box is stored in (a stbl box stored in) a trak box or a track fragment box (traf box).

ColourPrimariesInfo has a configuration similar to the colour_primaries_info SEI of FIG. 2 and the ref_display_luminance_info SEI of FIG. 8 or the colour_primaries_info SEI of FIG. 14 except that padding value for byte alignment is inserted.

The present disclosure can be applied even to the AVC scheme.

Third Embodiment (Description of Computer According to Present Disclosure)

The above-described series of processes may be executed by hardware or software. When the series of processes are executed by software, a program configuring the software is installed in a computer. Here, examples of the computer includes a computer incorporated into dedicated hardware and a general purpose personal computer that includes various programs installed therein and is capable of executing various kinds of functions.

Figure 24:
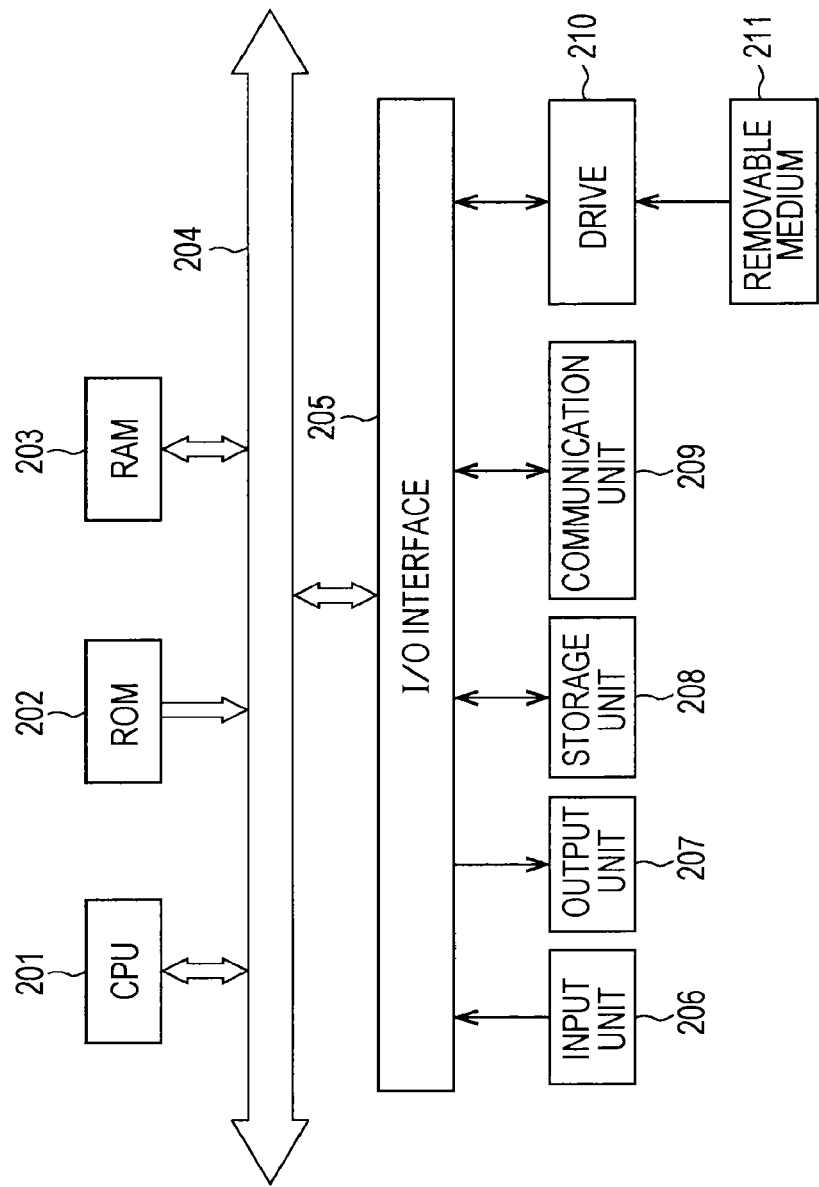
FIG. 24 is a block diagram illustrating an exemplary hardware configuration of a computer.

FIG. 24 is a block diagram illustrating an exemplary hardware configuration of a computer that executes the above-described series of processes by a program.

In a computer, a central processing unit (CPU) 201, a read only memory (ROM) 202, and a random access memory (RAM) 203 are connected with one another via a bus 204.

An input/output (I/O) interface 205 is further connected to the bus 204. An input unit 206, an output unit 207, a storage unit 208, a communication unit 209, and a drive 210 are connected to the I/O interface 205.

The input unit 206 includes a keyboard, a mouse, a microphone, and the like. The output unit 207 includes a display, a speaker, and the like. The storage unit 208 includes a hard disk, a non-volatile memory, and the like. The communication unit 209 includes a network interface or the like. The drive 210 drives a removable medium 211 such as a magnetic disk, an optical disk, a magneto optical disk, or a semiconductor memory.

In the computer having the above configuration, the CPU 201 executes the above-described series of processes, for example, by loading the program stored in the storage unit 208 onto the RAM 203 through the I/O interface 205 and the bus 204 and executing the program.

For example, the program executed by the computer (the CPU 201) may be recorded in the removable medium 211 as a package medium or the like and provided. Further, the program may be provided through a wired or wireless transmission medium such as a local area network (LAN), the Internet, or digital satellite broadcasting.

In the computer, the removable medium 211 is mounted to the drive 210, and then the program may be installed in the storage unit 208 through the I/O interface 205. Further, the program may be received by the communication unit 209 via a wired or wireless transmission medium and then installed in the storage unit 208. In addition, the program may be installed in the ROM 202 or the storage unit 208 in advance.

Further, the program may be a program in which the processes are chronologically performed in the order described in this disclosure or may be a program in which the processes are performed in parallel or at necessary timings such as called timings.

Fourth Embodiment (Application to Multi-View Image Coding and Multi-View Image Decoding)

Figure 25:
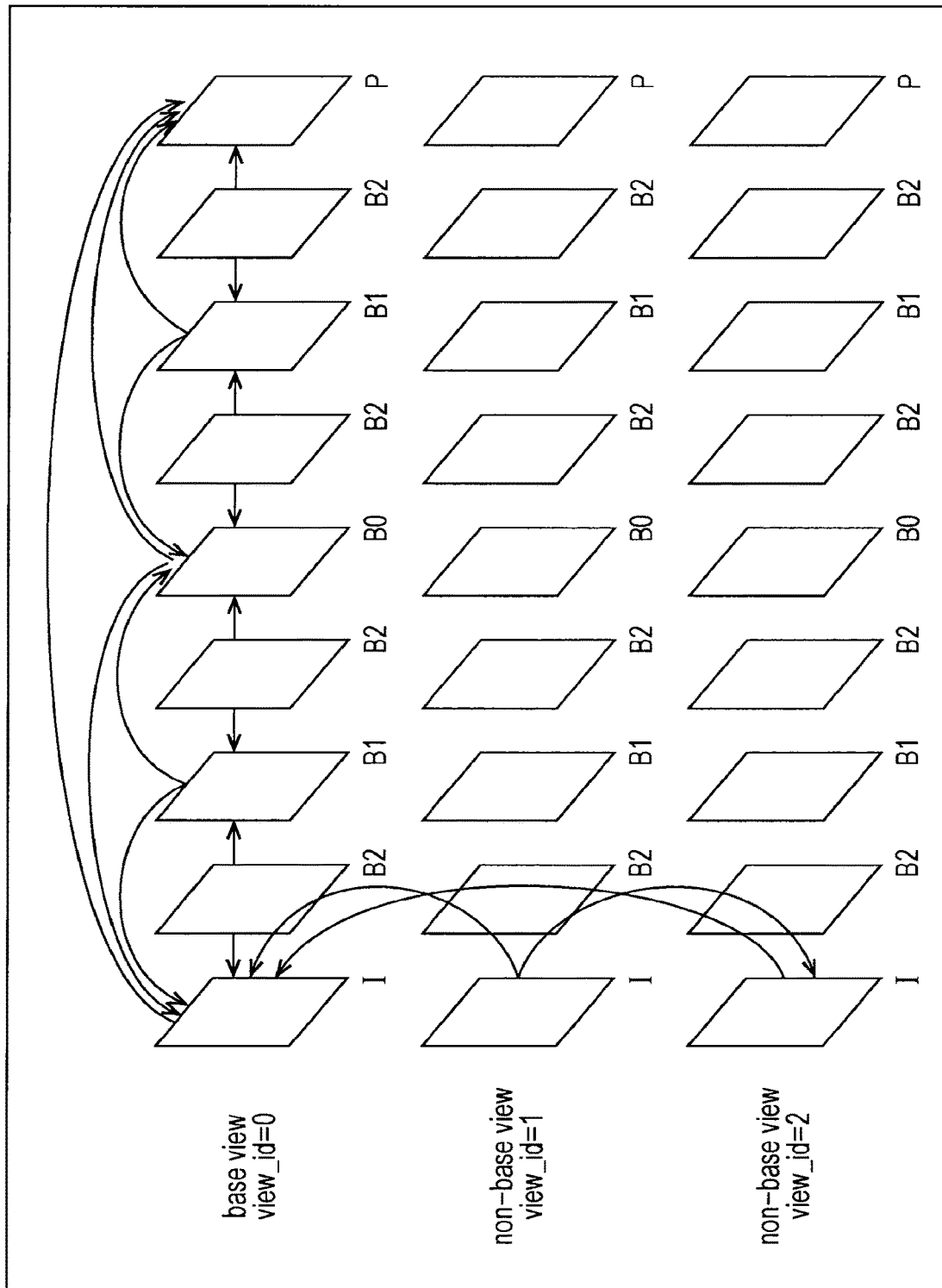
FIG. 25 is a diagram illustrating an exemplary multi-view image coding scheme.

The above-described series of processes can be applied to multi-view image coding and multi-view image decoding. FIG. 25 illustrates an exemplary multi-view image coding scheme.

As illustrated in FIG. 25, a multi-view image includes images of a plurality of views. The plurality of views of the multi-view image include a base view in which encoding and decoding are performed using only an image of its own view without using images of other views and a non-base view in which encoding and decoding are performed using images of other views. As the non-base view, an image of a base view may be used, and an image of another non-base view may be used.

When the multi-view image of FIG. 25 is encoded and decoded, an image of each view is encoded and decoded, but the technique according to the first embodiment may be applied to encoding and decoding of respective views. Accordingly, a color gamut of an encoding target image can be accurately recognized at a decoding side.

Furthermore, the flags or the parameters used in the technique according to the first embodiment may be shared in encoding and decoding of respective views. More specifically, for example, the syntax elements of the colour_primaries_info SEI or the ref_display_luminance_info SEI may be shared in encoding and decoding of respective views. Of course, any other necessary information may be shared in encoding and decoding of respective views.

Accordingly, it is possible to prevent transmission of redundant information and reduce an amount (bit rate) of information to be transmitted (that is, it is possible to prevent coding efficiency from degrading.

(Multi-View Image Encoding Device)

Figure 26:
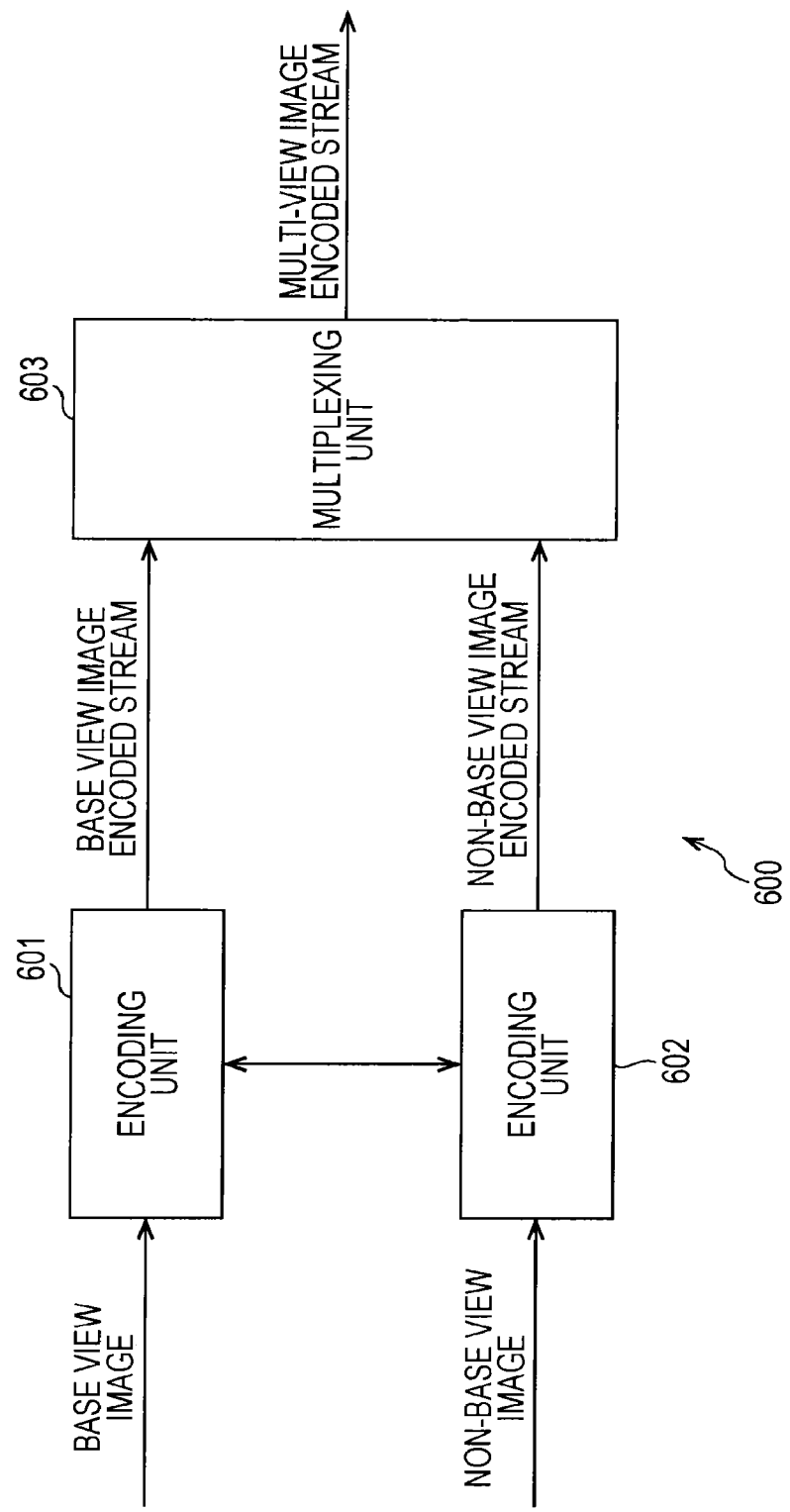
FIG. 26 is a diagram illustrating an exemplary configuration of a multi-view image encoding device to which the present disclosure is applied.

FIG. 26 is a diagram illustrating a multi-view image encoding device that performs the above-described multi-view image coding. A multi-view image encoding device 600 includes an encoding unit 601, an encoding unit 602, and a multiplexing unit 603 as illustrated in FIG. 26.

The encoding unit 601 encodes a base view image, and generates a base view image encoded stream. The encoding unit 602 encodes a non-base view image, and generates a non-base view image encoded stream. The multiplexing unit 603 performs multiplexing of the base view image encoded stream generated by the encoding unit 601 and the non-base view image encoded stream generated by the encoding unit 602, and generates a multi-view image encoded stream.

The encoding device 10 (FIG. 1) can be applied as the encoding unit 601 and the encoding unit 602 of the multi-view image encoding device 600. In other words, it is possible to enable a decoding side to accurately recognize a color gamut of an encoding target image when encoding of each view is performed. Further, the encoding unit 601 and the encoding unit 602 can perform encoding using the same flags or parameters (for example, syntax elements related to inter-image processing) (that is, can share the flags or the parameters), and thus it is possible to prevent the coding efficiency from degrading.

(Multi-View Image Decoding Device)

Figure 27:
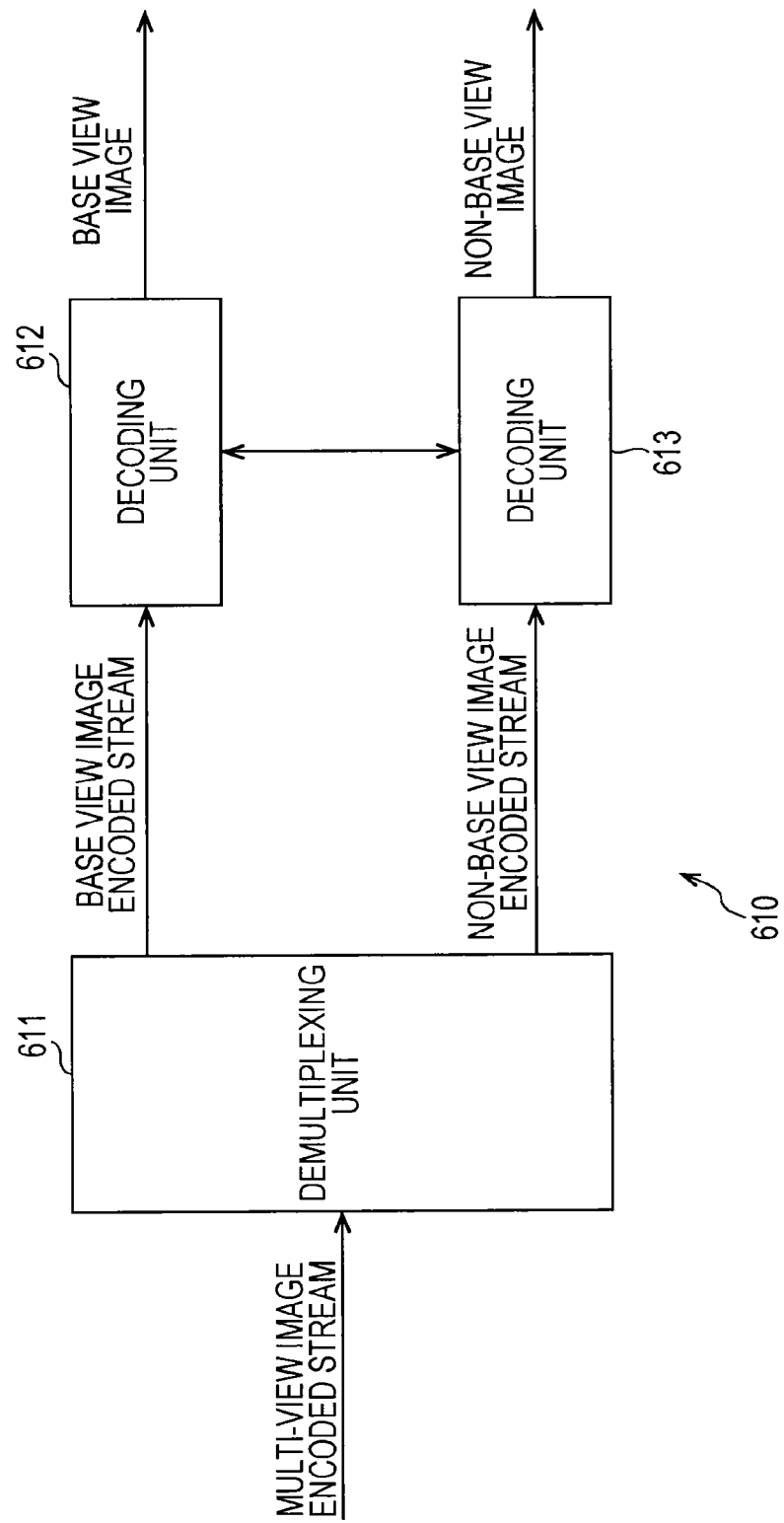
FIG. 27 is a diagram illustrating an exemplary configuration of a multi-view image decoding device to which the present disclosure is applied.

FIG. 27 is a diagram illustrating a multi-view image decoding device that performs the above-described multi-view image decoding. A multi-view image decoding device 610 includes a demultiplexing unit 611, a decoding unit 612, and a decoding unit 613 as illustrated in FIG. 27.

The demultiplexing unit 611 performs demultiplexing of the multi-view image encoded stream obtained by multiplexing the base view image encoded stream and the non-base view image encoded stream, and extracts the base view image encoded stream and the non-base view image encoded stream. The decoding unit 612 decodes the base view image encoded stream extracted by the demultiplexing unit 611, and obtains the base view image. The decoding unit 613 decodes the non-base view image encoded stream extracted by the demultiplexing unit 611, and obtains the non-base view image.

The decoding device 50 (FIG. 11) can be applied as the decoding unit 612 and the decoding unit 613 of the multi-view image decoding device 610. In other words, a color gamut of an encoding target image can be accurately recognized when decoding of each view is performed. Further, the decoding unit 612 and the decoding unit 613 can perform decoding using the same flags or parameters (for example, syntax elements related to inter-image processing) (that is, can share the flags or the parameters), and thus it is possible to prevent the coding efficiency from degrading.

Fifth Embodiment (Application to Scalable Image Coding and Scalable Image Decoding)

Figure 28:
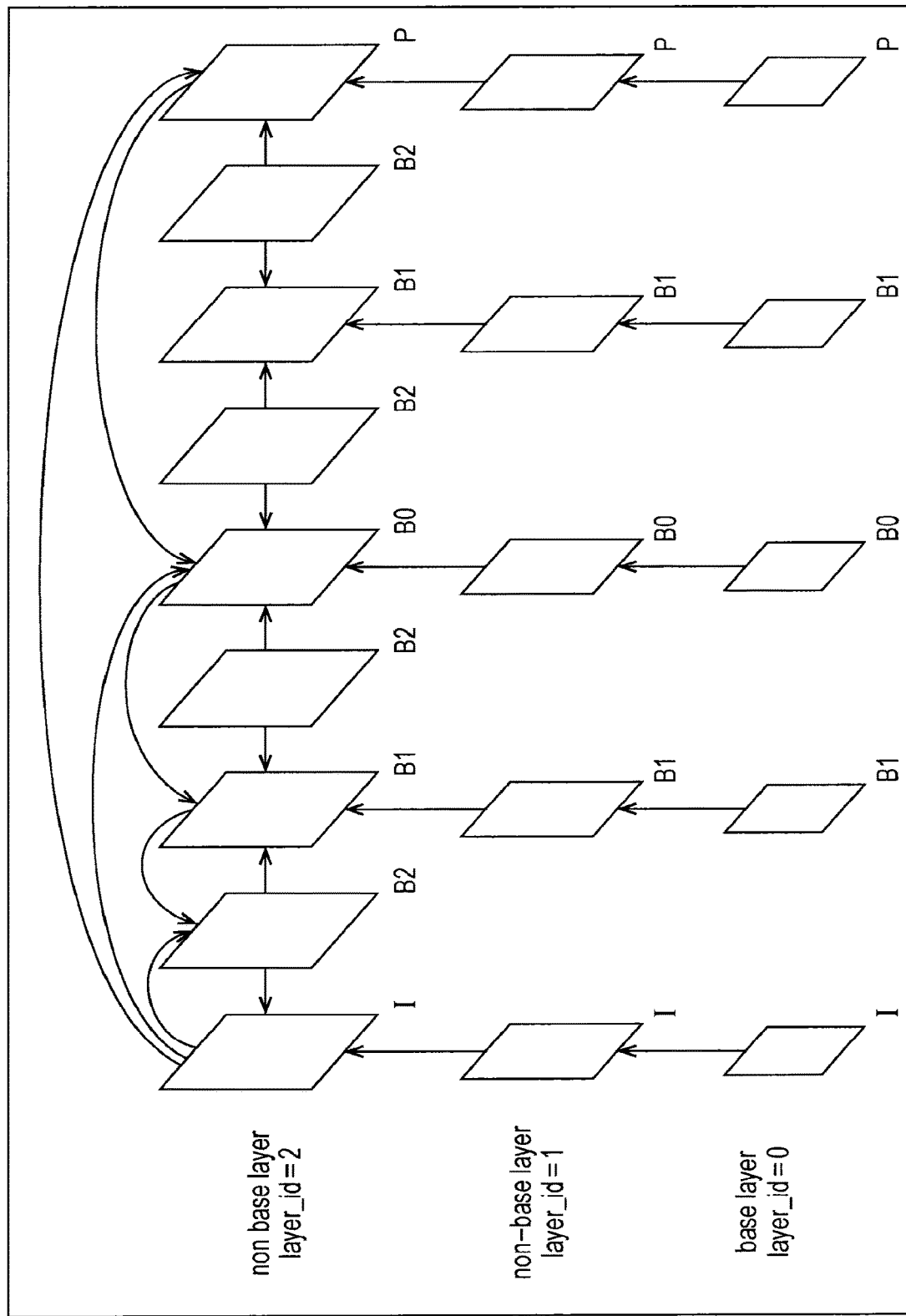
FIG. 28 is a diagram illustrating an exemplary scalable image coding scheme.

The above-described series of processes can be applied to scalable image coding and scalable image decoding (scalable coding and scalable decoding). FIG. 28 illustrates an exemplary scalable image coding scheme.

The scalable image coding (scalable coding) is a scheme in which an image is divided into a plurality of layers (hierarchized) so that image data has a scalable function for a certain parameter, and encoding is performed on each layer. The scalable image decoding (scalable decoding) is decoding corresponding to the scalable image coding.

As illustrated in FIG. 28, for hierarchization of an image, an image is divided into a plurality of images (layers) based on a certain parameter having a scalable function. In other words, a hierarchized image (a scalable image) includes images of a plurality of layers that differ in a value of the certain parameter from one another. The plurality of layers of the scalable image include a base layer in which encoding and decoding are performed using only an image of its own layer without using images of other layers and non-base layers (which are also referred to as "enhancement layers") in which encoding and decoding are performed using images of other layers. As the non-base layer, an image of the base layer may be used, and an image of any other non-base layer may be used.

Generally, the non-base layer is configured with data (differential data) of a differential image between its own image and an image of another layer so that the redundancy is reduced. For example, when one image is hierarchized into two layers, that is, a base layer and a non-base layer (which is also referred to as an enhancement layer), an image of a quality lower than an original image is obtained when only data of the base layer is used, and an original image (that is, a high quality image) is obtained when both data of the base layer and data of the non-base layer are combined.

As an image is hierarchized as described above, images of various qualities can be obtained depending on the situation. For example, for a terminal having a low processing capability such as a mobile terminal, image compression information of only the base layer is transmitted, and a moving image of low spatial and temporal resolutions or a low quality is reproduced, and for a terminal having a high processing capability such as a television or a personal computer, image compression information of the enhancement layer as well as the base layer is transmitted, and a moving image of high spatial and temporal resolutions or a high quality is reproduced. In other words, without performing the transcoding process, image compression information according to a capability of a terminal or a network can be transmitted from a server.

When the scalable image illustrated in FIG. 28 is encoded and decoded, images of respective layers are encoded and decoded, but the technique according to the first embodiment may be applied to encoding and decoding of the respective layers. Accordingly, a color gamut of an encoding target image can be accurately recognized at the decoding side.

Furthermore, the flags or the parameters used in the technique according to the first embodiment may be shared in encoding and decoding of respective layers. More specifically, for example, the syntax elements of the colour_primaries_info SEI or the ref_display_luminance_info SEI may be shared in encoding and decoding of respective layers. Of course, any other necessary information may be shared in encoding and decoding of respective views.

Accordingly, it is possible to prevent transmission of redundant information and reduce an amount (bit rate) of information to be transmitted (that is, it is possible to prevent coding efficiency from degrading.

(Scalable Parameter)

Figure 29:
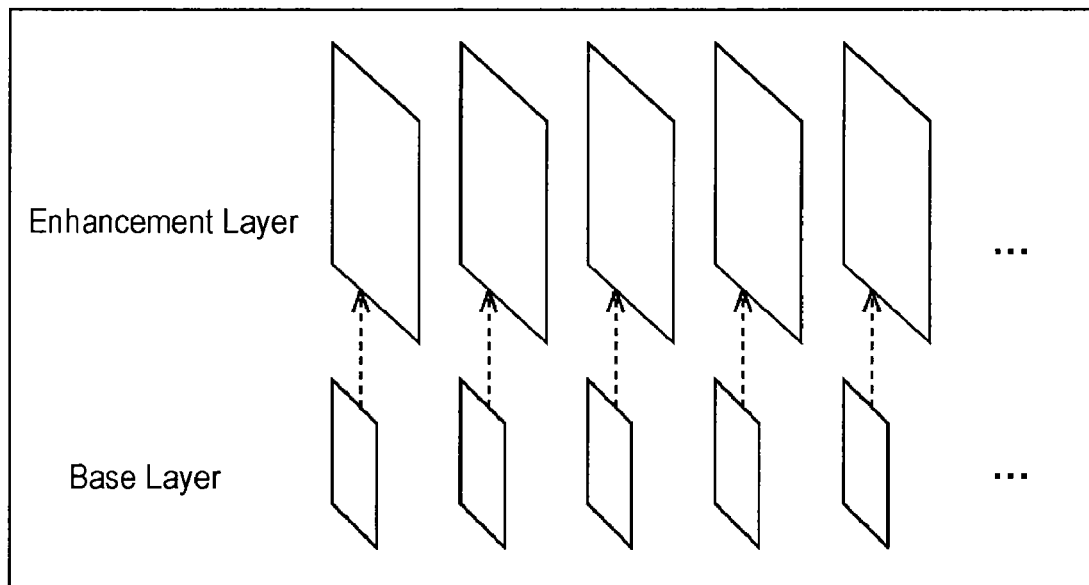
FIG. 29 is a diagram for describing exemplary spatial scalable coding.

In the scalable image coding and the scalable image decoding (the scalable coding and the scalable decoding), any parameter has a scalable function. For example, a spatial resolution may be used as the parameter (spatial scalability) as illustrated in FIG. 29. In the case of the spatial scalability, respective layers have different image resolutions. In other words, in this case, each picture is hierarchized into two layers, that is, a base layer of a resolution spatially lower than that of an original image and an enhancement layer that is combined with the base layer to obtain an original spatial resolution as illustrated in FIG. 29. Of course, the number of layers is an example, and each picture can be hierarchized into an arbitrary number of layers.

Figure 30:
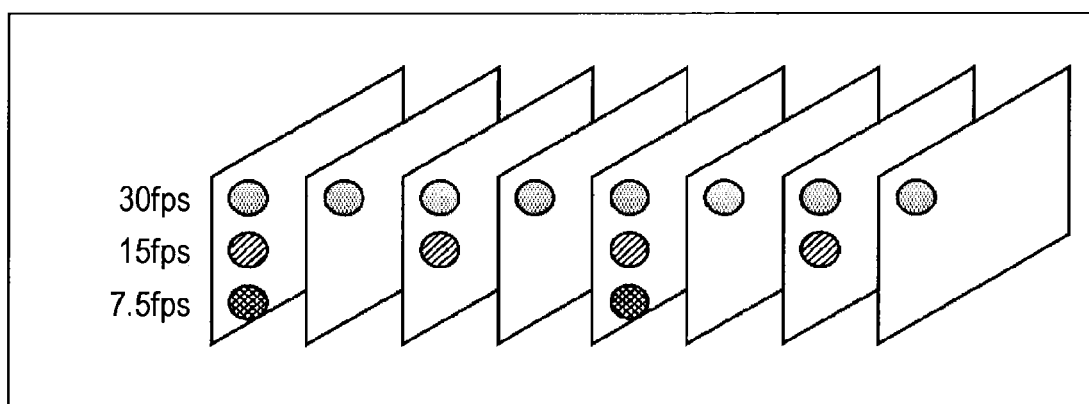
FIG. 30 is a diagram for describing exemplary temporal scalable coding.

As another parameter having such scalability, for example, a temporal resolution may be applied (temporal scalability) as illustrated in FIG. 30. In the case of the temporal scalability, respective layers having different frame rates. In other words, in this case, each picture is hierarchized into two layers, that is, a base layer of a frame rate lower than that of an original moving image and an enhancement layer that is combined with the base layer to obtain an original frame rate as illustrated in FIG. 30. Of course, the number of layers is an example, and each picture can be hierarchized into an arbitrary number of layers.

Figure 31:
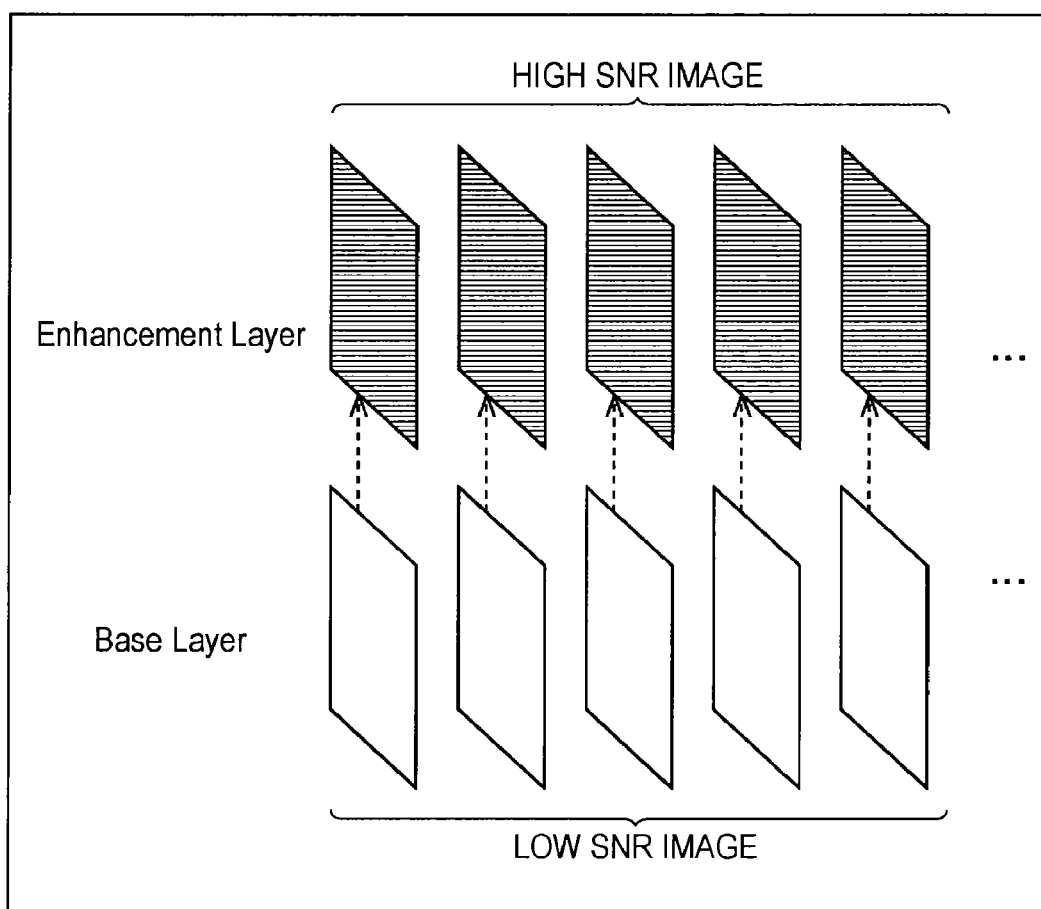
FIG. 31 is a diagram for describing exemplary scalable coding of a signal-to-noise ratio.

As another parameter having such scalability, for example, a signal-to-noise ratio (SNR) may be applied (SNR scalability). In the case of the SNR scalability, respective layers having different SNRs. In other words, in this case, each picture is hierarchized into two layers, that is, a base layer of a SNR lower than that of an original image and an enhancement layer that is combined with the base layer to obtain an original SNR as illustrated in FIG. 31. Of course, the number of layers is an example, and each picture can be hierarchized into an arbitrary number of layers.

A parameter other than the above-described examples may be applied as a parameter having scalability. For example, a bit depth may be used as a parameter having scalability (bit-depth scalability). In the case of the bit-depth scalability, respective layers have different bit depths. In this case, for example, the base layer (base layer) includes a 8-bit image, and a 10-bit image can be obtained by adding the enhancement layer to the base layer.

As another parameter having scalability, for example, a chroma format may be used (chroma scalability). In the case of the chroma scalability, respective layers have different chroma formats. In this case, for example, the base layer (base layer) includes a component image of a 4:2:0 format, and a component image of a 4:2:2 format can be obtained by adding the enhancement layer to the base layer.

(Scalable Image Encoding Device)

Figure 32:
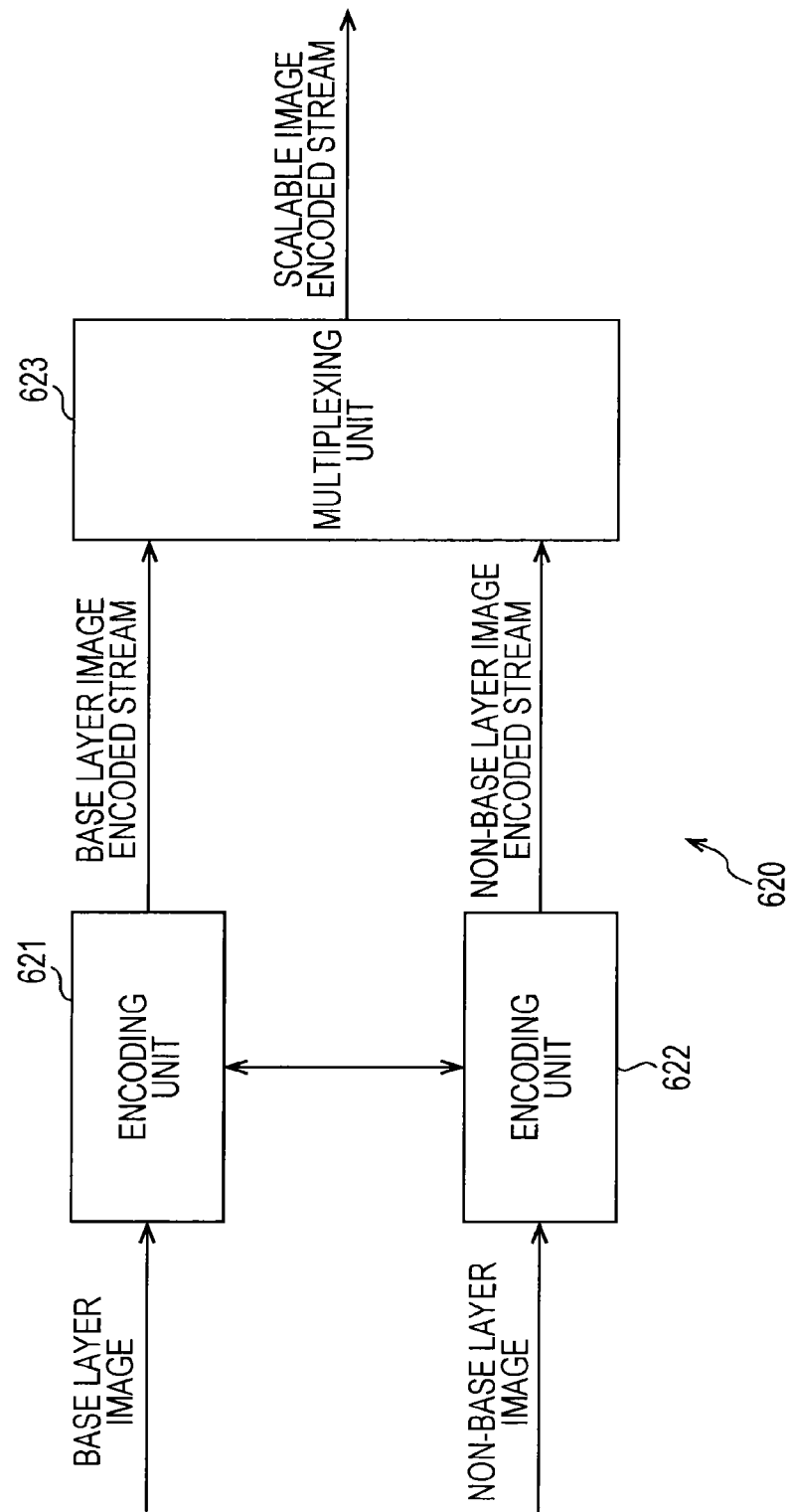
FIG. 32 is a diagram illustrating an exemplary configuration of a scalable image encoding device to which the present disclosure is applied.

FIG. 32 is a diagram illustrating a scalable image encoding device that performs the above-described scalable image coding. A scalable image encoding device 620 includes an encoding unit 621, an encoding unit 622, and a multiplexing unit 623 as illustrated in FIG. 32.

The encoding unit 621 encodes a base layer image, and generates a base layer image encoded stream. The encoding unit 622 encodes a non-base layer image, and generates a non-base layer image encoded stream. The multiplexing unit 623 performs multiplexing the base layer image encoded stream generated by the encoding unit 621 and the non-base layer image encoded stream generated by the encoding unit 622, and generates a scalable image encoded stream.

The encoding device 10 (FIG. 1) can be applied as the encoding unit 621 and the encoding unit 622 of the scalable image encoding device 620. In other words, it is possible to enable the decoding side to accurately recognize a color gamut of an encoding target image when encoding of each layer is performed. Further, the encoding unit 621 and the encoding unit 622 can perform, for example, control of an intra-prediction filter process using the same flags or parameters (for example, syntax elements related to inter-image processing) (that is, can share the flags or the parameters), and thus it is possible to prevent the coding efficiency from degrading.

(Scalable Image Decoding Device)

Figure 33:
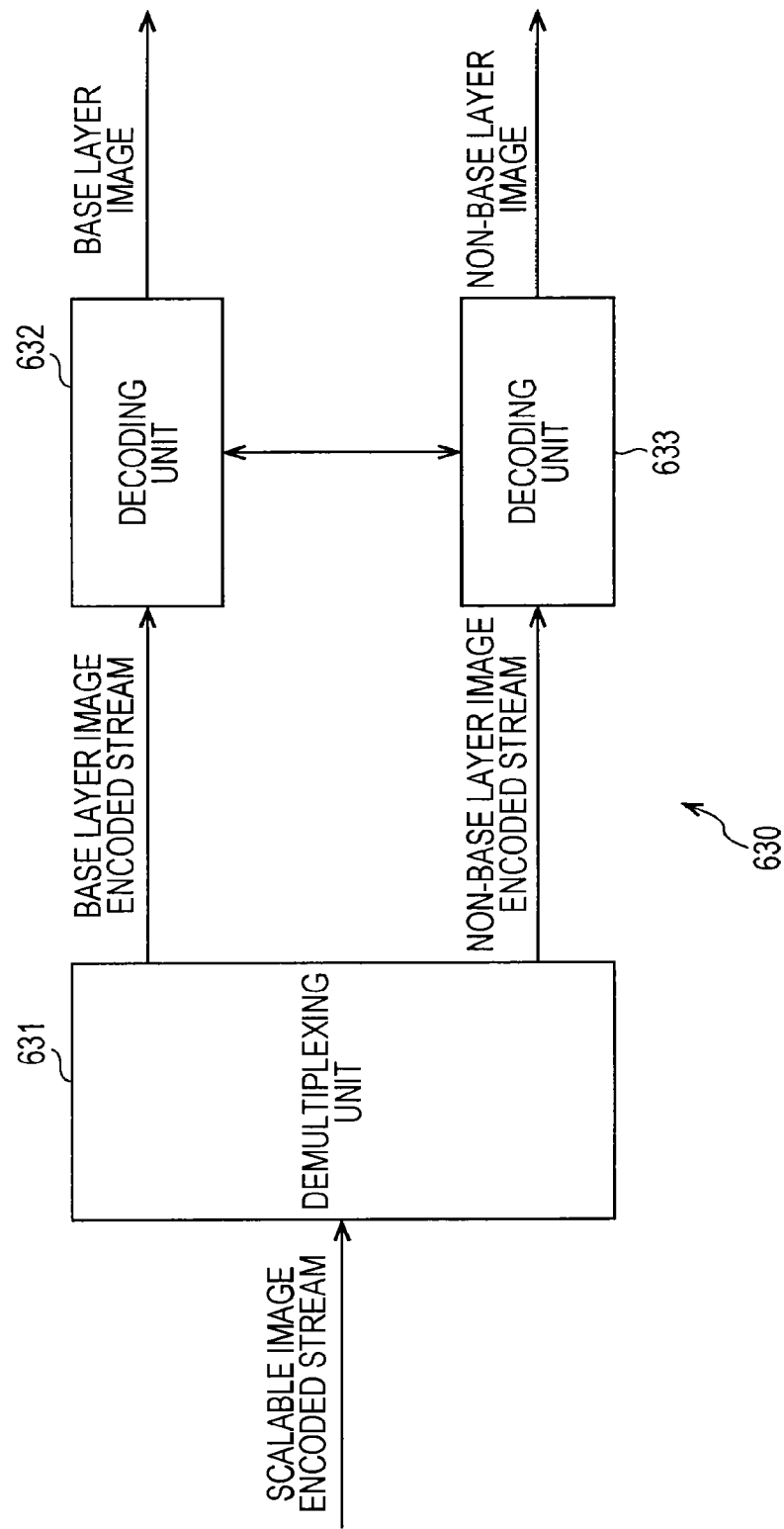
FIG. 33 is a diagram illustrating an exemplary configuration of a scalable image decoding device to which the present disclosure is applied.

FIG. 33 is a diagram illustrating a scalable image decoding device that performs the above-described scalable image decoding. A scalable image decoding device 630 includes a demultiplexing unit 631, a decoding unit 632, and a decoding unit 633 as illustrated in FIG. 33.

The demultiplexing unit 631 performs demultiplexing of the scalable image encoded stream obtained by multiplexing the base layer image encoded stream and the non-base layer image encoded stream, and extracts the base layer image encoded stream and the non-base layer image encoded stream. The decoding unit 632 decodes the base layer image encoded stream extracted by the demultiplexing unit 631, and obtains the base layer image. The decoding unit 633 decodes the non-base layer image encoded stream extracted by the demultiplexing unit 631, and obtains the non-base layer image.

The decoding device 50 (FIG. 11) can be applied as the decoding unit 632 and the decoding unit 633 of the scalable image decoding device 630. In other words, a color gamut of an encoding target image can be accurately recognized when decoding of each layer is performed. Further, the decoding unit 612 and the decoding unit 613 can perform decoding using the same flags or parameters (for example, syntax elements related to inter-image processing) (that is, can share the flags or the parameters), and thus it is possible to prevent the coding efficiency from degrading.

Sixth Embodiment (Exemplary Configuration of Television Device)

Figure 34:
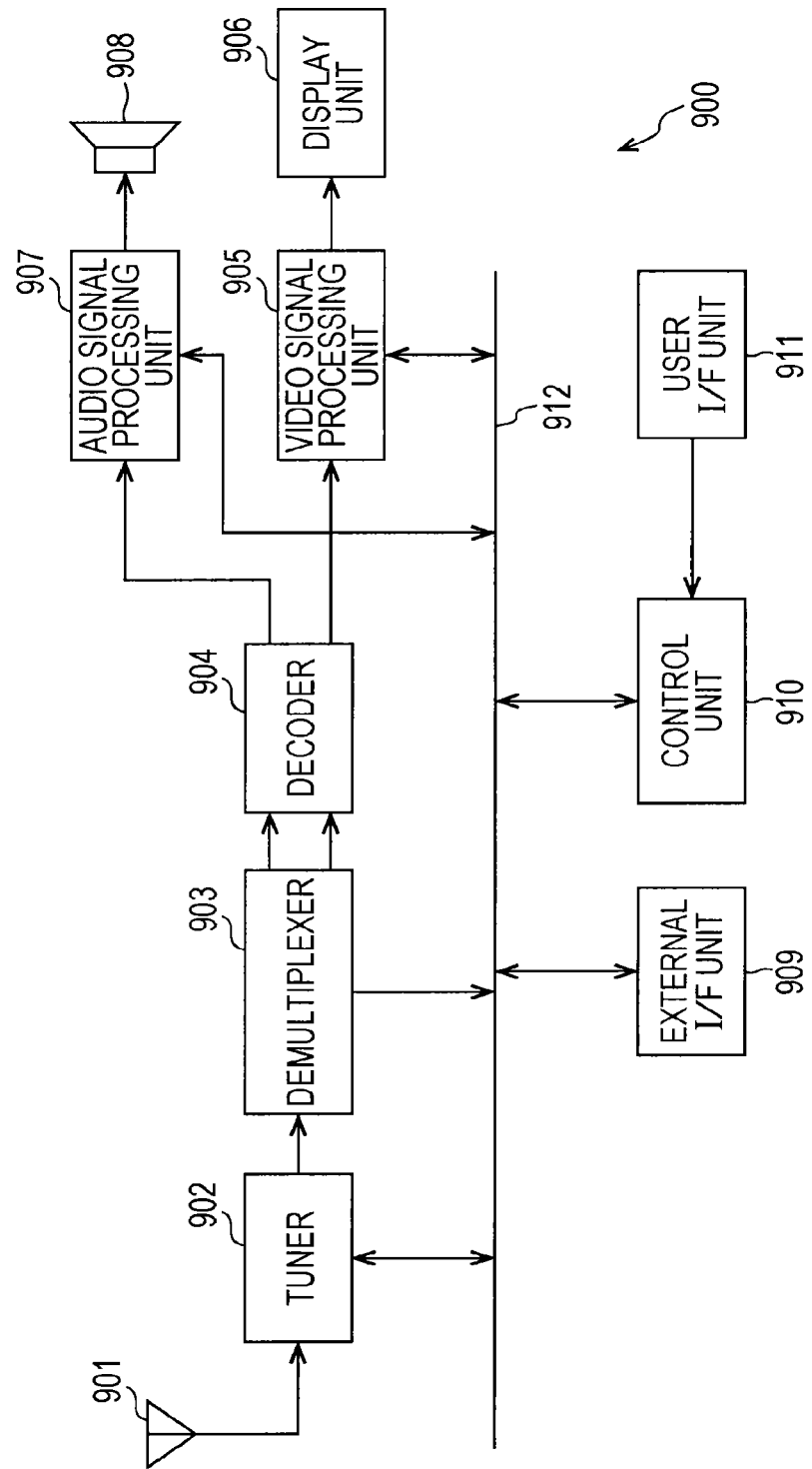
FIG. 34 is a diagram illustrating an exemplary schematic configuration of a television device to which the present disclosure is applied.

FIG. 34 illustrates a schematic configuration of a television device to which the present technology is applied. A television device 900 includes an antenna 901, a tuner 902, a demultiplexer 903, a decoder 904, a video signal processing unit 905, a display unit 906, an audio signal processing unit 907, a speaker 908, and an external I/F unit 909. The television device 900 further includes a control unit 910, a user I/F unit 911, and the like.

The tuner 902 tunes to a desired channel from a broadcast signal received by the antenna 901, performs demodulation, and outputs an obtained encoded bitstream to the demultiplexer 903.

The demultiplexer 903 extracts video or audio packets of a program of a viewing target from the encoded bitstream, and outputs data of the extracted packets to the decoder 904. The demultiplexer 903 provides data of packets of data such as an electronic program guide (EPG) to the control unit 910. Further, when scrambling has been performed, descrambling is performed by the demultiplexer or the like.

The decoder 904 performs a decoding process of decoding the packets, and outputs video data and audio data generated by the decoding process to the video signal processing unit 905 and the audio signal processing unit 907.

The video signal processing unit 905 performs a noise canceling process or video processing according to a user setting on the video data. The video signal processing unit 905 generates video data of a program to be displayed on the display unit 906, image data according to processing based on an application provided via a network, or the like. The video signal processing unit 905 generates video data for displaying, for example, a menu screen used to select an item, and causes the video data to be superimposed on video data of a program. The video signal processing unit 905 generates a drive signal based on the video data generated as described above, and drives the display unit 906.

The display unit 906 drives a display device (for example, a liquid crystal display device or the like) based on the drive signal provided from the video signal processing unit 905, and causes a program video or the like to be displayed.

The audio signal processing unit 907 performs a certain process such as a noise canceling process on the audio data, performs a digital to analog (D/A) conversion process and an amplification process on the processed audio data, and provides resultant data to the speaker 908 to output a sound.

The external I/F unit 909 is an interface for a connection with an external device or a network, and performs transmission and reception of data such as video data or audio data.

The user I/F unit 911 is connected with the control unit 910. The user I/F unit 911 includes an operation switch, a remote control signal receiving unit, and the like, and provides an operation signal according to the user's operation to the control unit 910.

The control unit 910 includes a central processing unit (CPU), a memory, and the like. The memory stores a program executed by the CPU, various kinds of data necessary when the CPU performs processing, EPG data, data acquired via a network, and the like. The program stored in the memory is read and executed by the CPU at a certain timing such as a timing at which the television device 900 is activated. The CPU executes the program, and controls the respective units such that the television device 900 is operated according to the user's operation.

The television device 900 is provided with a bus 912 that connects the tuner 902, the demultiplexer 903, the video signal processing unit 905, the audio signal processing unit 907, the external I/F unit 909, and the like with the control unit 910.

In the television device having the above configuration, the decoder 904 is provided with the function of the decoding device (decoding method) according to the present application. Thus, it is possible to accurately recognize a color gamut of an encoding target image.

Seventh Embodiment (Exemplary Configuration of Mobile Telephone)

Figure 35:
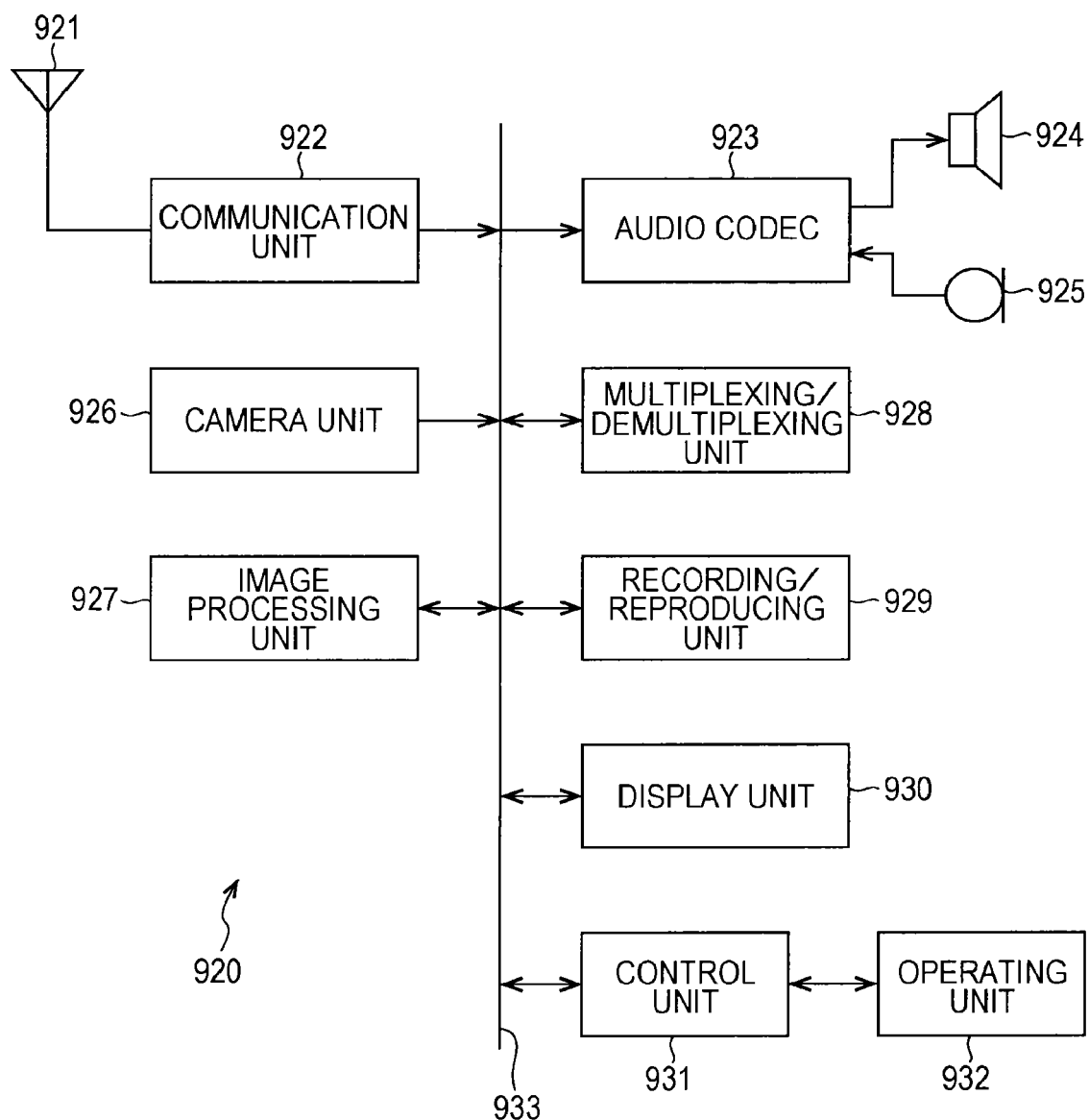
FIG. 35 is a diagram illustrating an exemplary schematic configuration of a mobile telephone to which the present disclosure is applied.

FIG. 35 illustrates a schematic configuration of a mobile telephone to which the present technology is applied. A mobile telephone 920 includes a communication unit 922, a voice codec 923, a camera unit 926, an image processing unit 927, a multiplexing/demultiplexing unit 928, a recording/reproducing unit 929, a display unit 930, and a control unit 931. These units are connected with one another via a bus 933.

Further, an antenna 921 is connected to the communication unit 922, and a speaker 924 and a microphone 925 are connected to the voice codec 923. Further, an operating unit 932 is connected to the control unit 931.

The mobile telephone 920 performs various kinds of operations such as transmission and reception of a voice signal, transmission and reception of an electronic mail or image data, image capturing, or data recording in various modes such as a voice call mode and a data communication mode.

In the voice call mode, a voice signal generated by the microphone 925 is converted to voice data through the voice codec 923, compressed, and then provided to the communication unit 922. The communication unit 922 performs, for example, a modulation process and a frequency transform process of the voice data, and generates a transmission signal. Further, the communication unit 922 provides the transmission signal to the antenna 921 so that the transmission signal is transmitted to a base station (not illustrated). Further, the communication unit 922 performs an amplification process, a frequency transform process, and a demodulation process of a reception signal received through the antenna 921, and provides the obtained voice data to the voice codec 923. The voice codec 923 decompresses the voice data, converts the compressed data to an analog voice signal, and outputs the analog voice signal to the speaker 924.

In the data communication mode, when mail transmission is performed, the control unit 931 receives text data input by operating the operating unit 932, and causes the input text to be displayed on the display unit 930. Further, the control unit 931 generates mail data, for example, based on a user instruction input through the operating unit 932, and provides the mail data to the communication unit 922. The communication unit 922 performs, for example, a modulation process and a frequency transform process of the mail data, and transmits an obtained transmission signal through the antenna 921. Further, the communication unit 922 performs, for example, an amplification process, a frequency transform process, and a demodulation process of a reception signal received through the antenna 921, and restores the mail data. The mail data is provided to the display unit 930 so that mail content is displayed.

The mobile telephone 920 can store the received mail data in a storage medium through the recording/reproducing unit 929. The storage medium is an arbitrary rewritable storage medium. Examples of the storage medium include a semiconductor memory such as a RAM or an internal flash memory, a hard disk, a magnetic disk, a magneto optical disk, an optical disk, and a removable medium such as a universal serial bus (USB) memory or a memory card.

In the data communication mode, when image data is transmitted, image data generated through the camera unit 926 is provided to the image processing unit 927. The image processing unit 927 performs an encoding process of encoding the image data, and generates encoded data.

The multiplexing/demultiplexing unit 928 multiplexes the encoded data generated through the image processing unit 927 and the voice data provided from the voice codec 923 according to a certain scheme, and provides resultant data to the communication unit 922. The communication unit 922 performs, for example, a modulation process and a frequency transform process of the multiplexed data, and transmits an obtained transmission signal through the antenna 921. Further, the communication unit 922 performs, for example, an amplification process, a frequency transform process, and a demodulation process of a reception signal received through the antenna 921, and restores multiplexed data. The multiplexed data is provided to the multiplexing/demultiplexing unit 928. The multiplexing/demultiplexing unit 928 demultiplexes the multiplexed data, and provides the encoded data and the voice data to the image processing unit 927 and the voice codec 923. The image processing unit 927 performs a decoding process of decoding the encoded data, and generates image data. The image data is provided to the display unit 930 so that a received image is displayed. The voice codec 923 converts the voice data into an analog voice signal, provides the analog voice signal to the speaker 924, and outputs a received voice.

In the mobile telephone having the above configuration, the image processing unit 927 is provided with the function of the encoding device and the decoding device (the encoding method and the decoding method) according to the present application. Thus, it is possible to enable the decoding side to accurately recognize a color gamut of an encoding target image. Further, it is possible to accurately recognize a color gamut of an encoding target image.

Eighth Embodiment (Exemplary Configuration of Recording/Reproducing Device)

Figure 36:
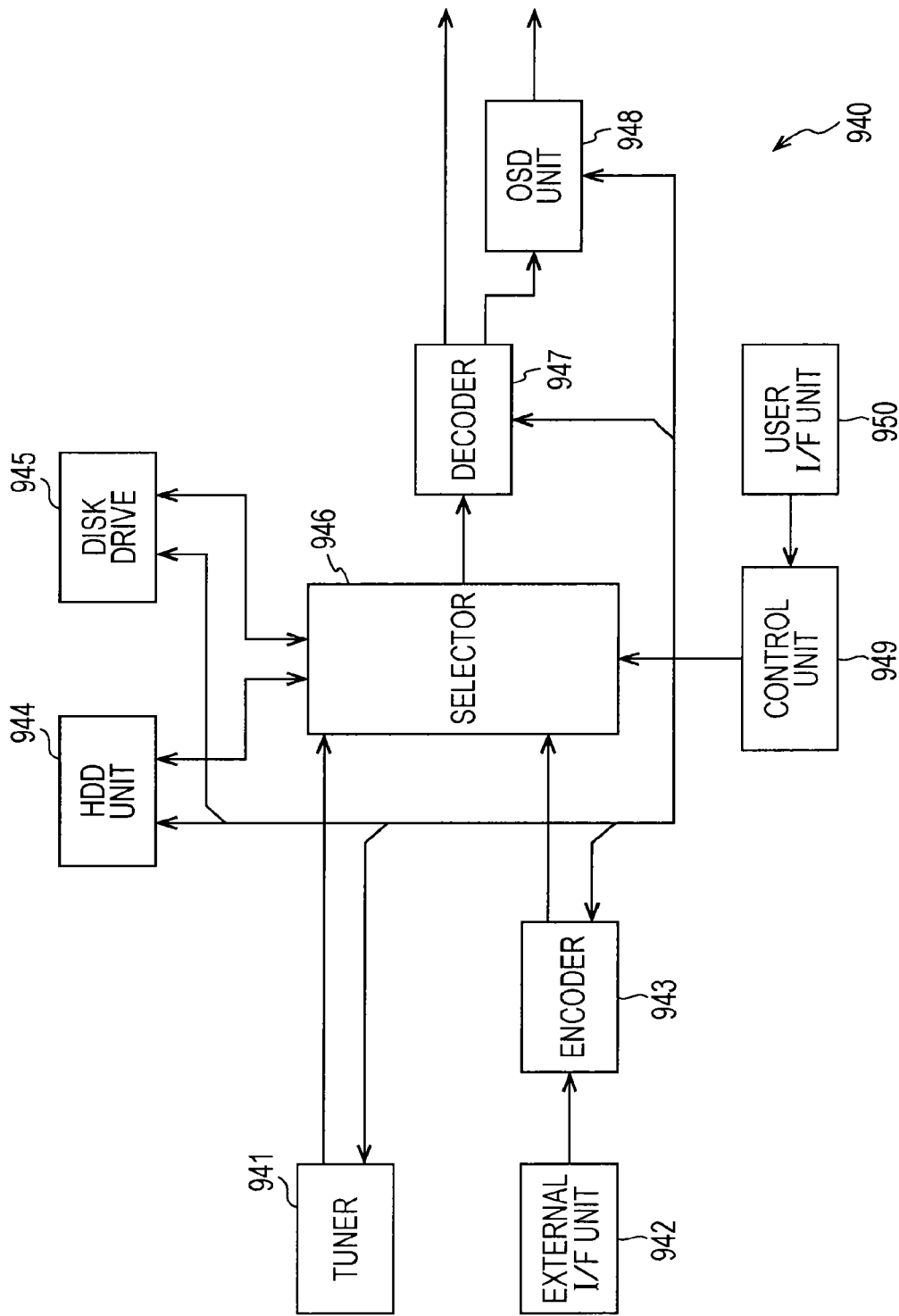
FIG. 36 is a diagram illustrating an exemplary schematic configuration of a recording/reproducing device to which the present disclosure is applied.

FIG. 36 illustrates a schematic configuration of a recording/reproducing device to which the present technology is applied. A recording/reproducing device 940 records, for example, audio data and video data of a received broadcast program in a recording medium, and provides the recorded data to the user at a timing according to the user's instruction. Further, the recording/reproducing device 940 can acquire, for example, audio data or video data from another device and cause the acquired data to be recorded in a recording medium. Furthermore, the recording/reproducing device 940 decodes and outputs the audio data or the video data recorded in the recording medium so that an image display or a sound output can be performed in a monitor device.

The recording/reproducing device 940 includes a tuner 941, an external I/F unit 942, an encoder 943, a hard disk drive (HDD) unit 944, a disk drive 945, a selector 946, a decoder 947, an on-screen display (OSD) unit 948, a control unit 949, and a user I/F unit 950.

The tuner 941 tunes to a desired channel from a broadcast signal received through an antenna (not illustrated). The tuner 941 demodulates a reception signal of the desired channel, and outputs an obtained encoded bitstream to the selector 946.

The external I/F unit 942 is configured with at least one of an IEEE1394 interface, a network interface, a USB interface, a flash memory interface, and the like. The external I/F unit 942 is an interface for a connection with an external device, a network, a memory card, and the like, and receives data such as video data to audio data to be recorded.

The encoder 943 ends non-encoded video data or audio data provided from the external I/F unit 942 according to a certain scheme, and outputs an encoded bitstream to the selector 946.

The HDD unit 944 records content data such as a video or a sound, various kinds of programs, and other data in an internal hard disk, and reads recorded data from the hard disk at the time of reproduction or the like.

The disk drive 945 records a signal in a mounted optical disk, and reproduces a signal from the optical disk. Examples of the optical disk include a DVD disk (DVD-Video, DVD-RAM, DVD-R, DVD-RW, DVD+R, DVD+RW, and the like) and a Blu-ray (a registered trademark) disk.

When a video or a sound is recorded, the selector 946 selects either of an encoded bitstream provided the tuner 941 and an encoded bitstream provided from the encoder 943, and provides the selected encoded bitstream to either of the HDD unit 944 or the disk drive 945. Further, when a video or a sound is reproduced, the selector 946 provides the encoded bitstream output from the HDD unit 944 or the disk drive 945 to the decoder 947.

The decoder 947 performs the decoding process of decoding the encoded bitstream. The decoder 947 provides video data generated by performing the decoding process to the OSD unit 948. Further, the decoder 947 outputs audio data generated by performing the decoding process.

The OSD unit 948 generates video data used to display, for example, a menu screen used to, for example, select an item, and outputs the video data to be superimposed on the video data output from the decoder 947.

The user I/F unit 950 is connected to the control unit 949. The user I/F unit 950 includes an operation switch, a remote control signal receiving unit, and the like, and provides an operation signal according to the user's operation to the control unit 949.

The control unit 949 is configured with a CPU, a memory, and the like. The memory stores a program executed by the CPU and various kinds of data necessary when the CPU performs processing. The program stored in the memory is read and executed by the CPU at a certain timing such as a timing at which the recording/reproducing device 940 is activated. The CPU executes the program, and controls the respective units such that the recording/reproducing device 940 is operated according to the user's operation.

In the recording/reproducing device having the above configuration, the decoder 947 is provided with the function of the decoding device (decoding method) according to the present application. Thus, it is possible to accurately recognize a color gamut of an encoding target image.

Ninth Embodiment (Exemplary Configuration of Imaging Device)

Figure 37:
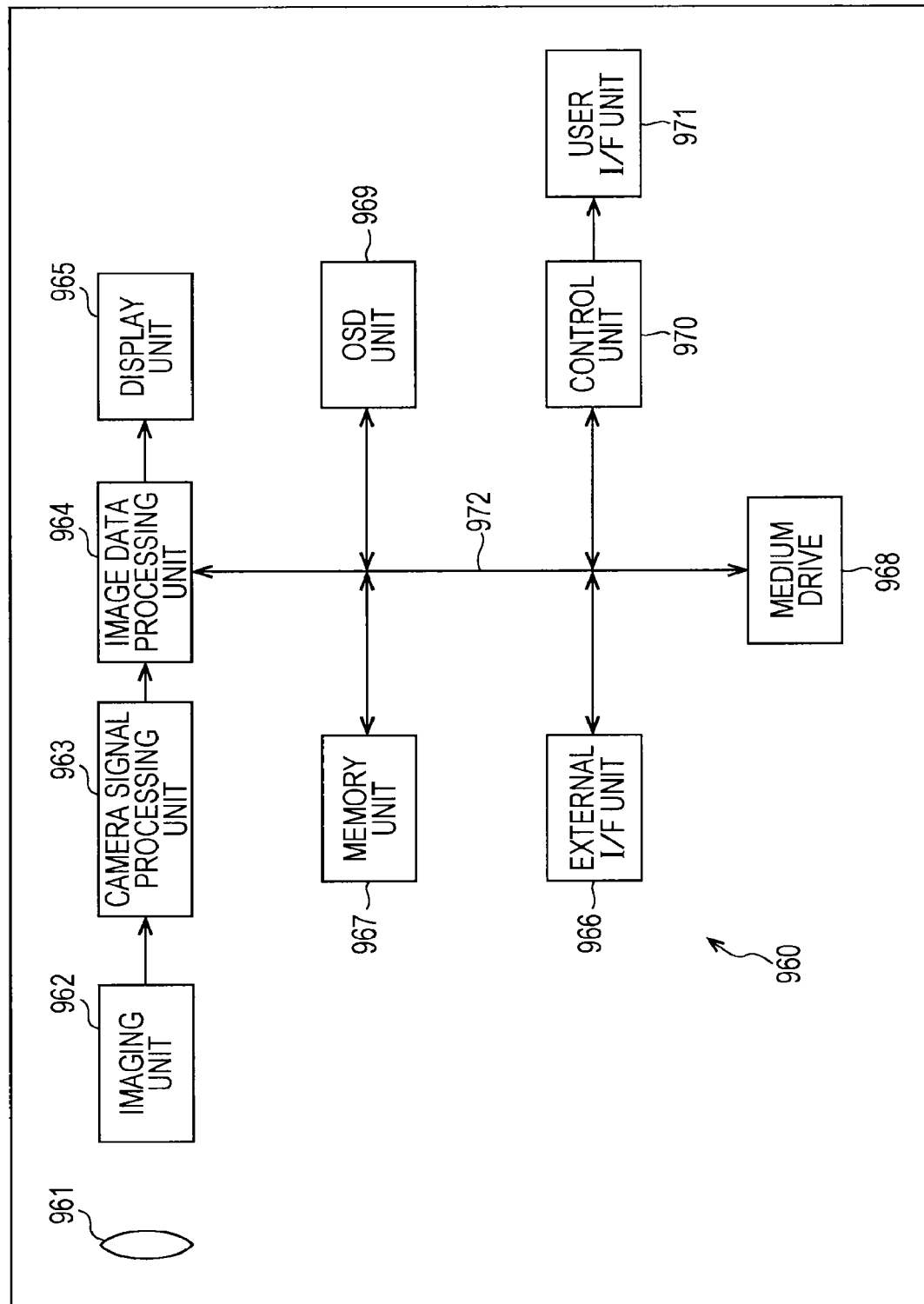
FIG. 37 is a diagram illustrating an exemplary schematic configuration of an imaging device to which the present disclosure is applied.

FIG. 37 illustrates a schematic configuration of an imaging device to which the present technology is applied. An imaging device 960 photographs a subject, and causes an image of the subject to be displayed on a display unit or records image data in a recording medium.

The imaging device 960 includes an optical block 961, an imaging unit 962, a camera signal processing unit 963, an image data processing unit 964, a display unit 965, an external I/F unit 966, a memory unit 967, a medium drive 968, an OSD unit 969, and a control unit 970. Further, a user I/F unit 971 is connected to the control unit 970. Furthermore, the image data processing unit 964, the external I/F unit 966, the memory unit 967, the medium drive 968, the OSD unit 969, the control unit 970, and the like are connected with one another via a bus 972.

The optical block 961 is configured with a focus lens, a diaphragm mechanism, and the like. The optical block 961 forms an optical image of a subject on an imaging plane of the imaging unit 962. The imaging unit 962 is configured with a CCD image sensor or a CMOS image sensor, and generates an electrical signal according to an optical image obtained by photoelectric conversion, and provides the electrical signal to the camera signal processing unit 963.

The camera signal processing unit 963 performs various kinds of camera signal processes such as knee correction, gamma correction, and color correction on the electrical signal provided from the imaging unit 962. The camera signal processing unit 963 provides the image data that has been subjected to the camera signal processes to the image data processing unit 964.

The image data processing unit 964 performs the encoding process of encoding the image data provided from the camera signal processing unit 963. The image data processing unit 964 provides encoded data generated by performing the encoding process to the external I/F unit 966 or the medium drive 968. Further, the image data processing unit 964 performs the decoding process of decoding encoded data provided from the external I/F unit 966 or the medium drive 968. The image data processing unit 964 provides image data generated by performing the decoding process to the display unit 965. Further, the image data processing unit 964 performs a process of providing the image data provided from the camera signal processing unit 963 to the display unit 965, or provides display data acquired from the OSD unit 969 to the display unit 965 to be superimposed on image data.

The OSD unit 969 generates a menu screen including a symbol, a text, or a diagram or display data such as an icon, and outputs the generated menu screen or the display data to the image data processing unit 964.

The external I/F unit 966 is configured with, for example, an USB I/O terminal or the like, and connected with a printer when an image is printed. Further, a drive is connected to the external I/F unit 966 as necessary, a removable medium such as a magnetic disk or an optical disk is appropriately mounted, and a computer program read from the removable medium is installed as necessary. Furthermore, the external I/F unit 966 is connected to a certain network such as an LAN or the Internet, and includes a network interface. The control unit 970 can read encoded data from the medium drive 968, for example, according to an instruction given through the user I/F unit 971 and provide the read encoded data to another device connected via a network through the external I/F unit 966. Further, the control unit 970 can acquire encoded data or image data provided from another device via a network through the external I/F unit 966 and provide the acquire encoded data or the image data to the image data processing unit 964.

As a recording medium driven by the medium drive 968, for example, an arbitrary readable/writable removable medium such as a magnetic disk, a magneto optical disk, an optical disk, or a semiconductor memory is used. Further, the recording medium may be a tape device, a disk, or a memory card regardless of a type of a removable medium. Of course, the recording medium may be a non-contact integrated circuit (IC) card or the like.

Further, the medium drive 968 may be integrated with the recording medium to configure a non-portable storage medium such as an internal HDD or a solid state drive (SSD).

The control unit 970 is configured with a CPU. The memory unit 967 stores a program executed by the control unit 970, various kinds of data necessary when the control unit 970 performs processing, and the like. The program stored in the memory unit 967 is read and executed by the control unit 970 at a certain timing such as a timing at which the imaging device 960 is activated. The control unit 970 executes the program, and controls the respective units such that the imaging device 960 is operated according to the user's operation.

In the imaging device having the above configuration, the image data processing unit 964 is provided with the function of the decoding device (decoding method) according to the present application. Thus, it is possible to enable the decoding side to accurately recognize a color gamut of an encoding target image. Further, it is possible to accurately recognize a color gamut of an encoding target image.

<Applications of Scalable Coding>

(First System)

Next, concrete application examples of scalable encoded data generated by scalable coding will be described. The scalable coding is used for selection of data to be transmitted, for example, as illustrated in FIG. 38.

Figure 38:
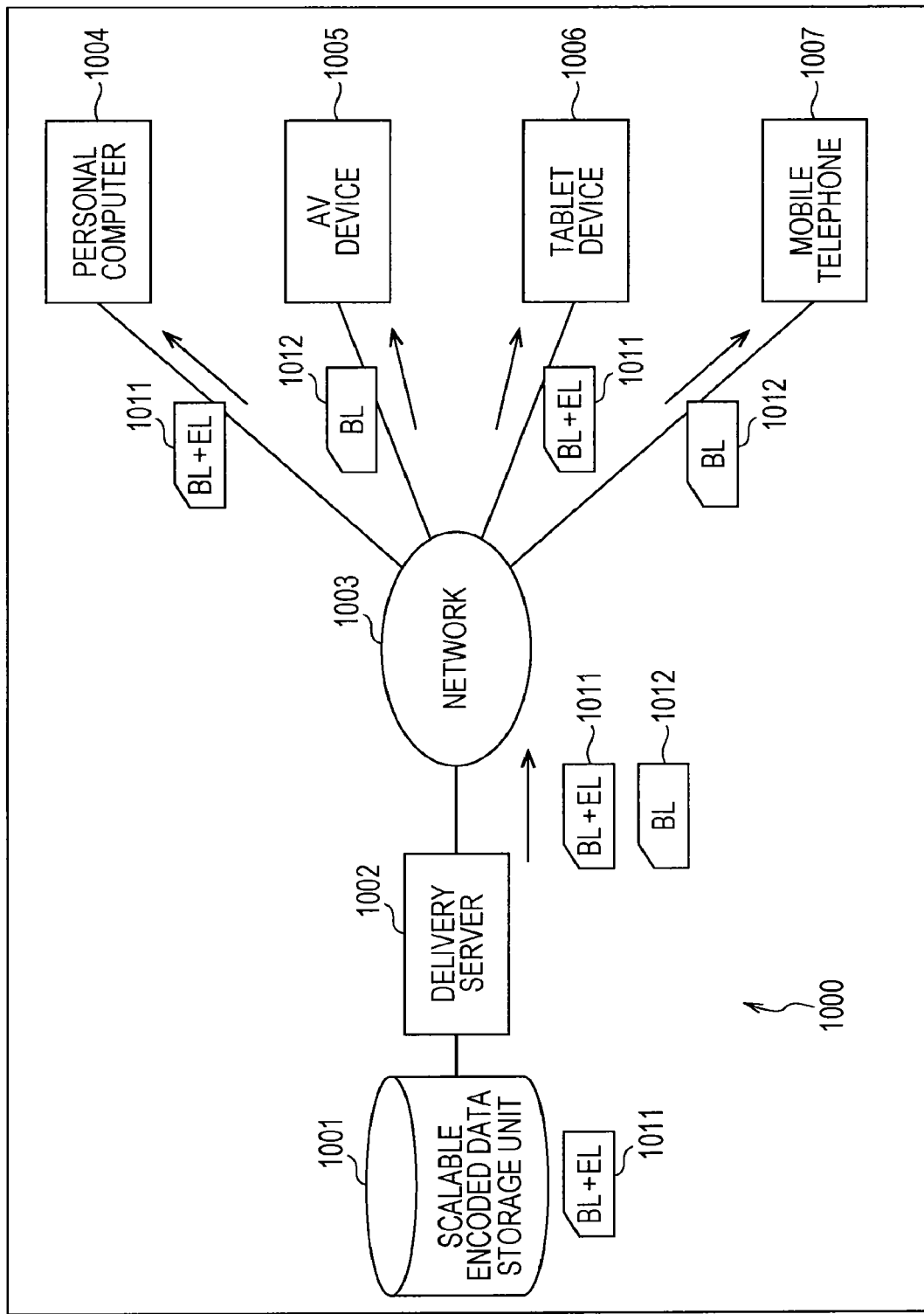
FIG. 38 is a block diagram illustrating a scalable coding application example.

In a data transmission system 1000 illustrated in FIG. 38, a delivery server 1002 reads scalable encoded data stored in a scalable encoded data storage unit 1001, and delivers the scalable encoded data to terminal devices such as a personal computer 1004, an AV device 1005, a tablet device 1006, and a mobile telephone 1007 via a network 1003.

At this time, the delivery server 1002 selects an appropriate high-quality encoded data according to the capabilities of the terminal devices or a communication environment, and transmits the selected high-quality encoded data. Although the delivery server 1002 transmits unnecessarily high-quality data, the terminal devices do not necessarily obtains a high-quality image, and a delay or an overflow may occur. Further, a communication band may be unnecessarily occupied, and a load of a terminal device may be unnecessarily increased. On the other hand, although the delivery server 1002 transmits unnecessarily low-quality data, the terminal devices are unlikely to obtain an image of a sufficient quality. Thus, the delivery server 1002 reads scalable encoded data stored in the scalable encoded data storage unit 1001 as encoded data of a quality appropriate for the capability of the terminal device or a communication environment, and then transmits the read data.

For example, the scalable encoded data storage unit 1001 is assumed to stores scalable encoded data (BL+EL) 1011 that is encoded by the scalable coding. The scalable encoded data (BL+EL) 1011 is encoded data including both of a base layer and an enhancement layer, and both an image of the base layer and an image of the enhancement layer can be obtained by decoding the scalable encoded data (BL+EL) 1011.

The delivery server 1002 selects an appropriate layer according to the capability of a terminal device to which data is transmitted or a communication environment, and reads data of the selected layer. For example, for the personal computer 1004 or the tablet device 1006 having a high processing capability, the delivery server 1002 reads the high-quality scalable encoded data (BL+EL) 1011 from the scalable encoded data storage unit 1001, and transmits the scalable encoded data (BL+EL) 1011 without change. On the other hand, for example, for the AV device 1005 or the mobile telephone 1007 having a low processing capability, the delivery server 1002 extracts data of the base layer from the scalable encoded data (BL+EL) 1011, and transmits a scalable encoded data (BL) 1012 that is the same content as the scalable encoded data (BL+EL) 1011 but lower in quality than the scalable encoded data (BL+EL) 1011.

As described above, an amount of data can be easily adjusted using scalable encoded data, and thus it is possible to prevent the occurrence of a delay or an overflow and prevent a load of a terminal device or a communication medium from being unnecessarily increased. Further, the scalable encoded data (BL+EL) 1011 is reduced in redundancy between layers, and thus it is possible to reduce an amount of data to be smaller than when individual data is used as encoded data of each layer. Thus, it is possible to more efficiently use a memory area of the scalable encoded data storage unit 1001.

Further, various devices such as the personal computer 1004 to the mobile telephone 1007 can be applied as the terminal device, and thus the hardware performance of the terminal devices differ according to each device. Further, since various applications can be executed by the terminal devices, software has various capabilities. Furthermore, all communication line networks including either or both of a wired network and a wireless network such as the Internet or a local area network (LAN), can be applied as the network 1003 serving as a communication medium, and thus various data transmission capabilities are provided. In addition, a change may be made by another communication or the like.

In this regard, the delivery server 1002 may be configured to perform communication with a terminal device serving as a transmission destination of data before starting data transmission and obtain information related to a capability of a terminal device such as hardware performance of a terminal device or a performance of an application (software) executed by a terminal device and information related to a communication environment such as an available bandwidth of the network 1003. Then, the delivery server 1002 may select an appropriate layer based on the obtained information.

Further, the extracting of the layer may be performed in a terminal device. For example, the personal computer 1004 may decode the transmitted scalable encoded data (BL+EL) 1011 and display the image of the base layer or the image of the enhancement layer. Further, for example, the personal computer 1004 may extract the scalable encoded data (BL) 1012 of the base layer from the transmitted scalable encoded data (BL+EL) 1011, store the scalable encoded data (BL) 1012 of the base layer, transfer the scalable encoded data (BL) 1012 of the base layer to another device, decode the scalable encoded data (BL) 1012 of the base layer, and display the image of the base layer.

Of course, the number of the scalable encoded data storage units 1001, the number of the delivery servers 1002, the number of the networks 1003, and the number of terminal devices are arbitrary. The above description has been made in connection with the example in which the delivery server 1002 transmits data to the terminal devices, but the application example is not limited to this example. The data transmission system 1000 can be applied to any system in which when encoded data generated by the scalable coding is transmitted to a terminal device, an appropriate layer is selected according to a capability of a terminal devices or a communication environment, and the encoded data is transmitted.

(Second System)

Figure 39:
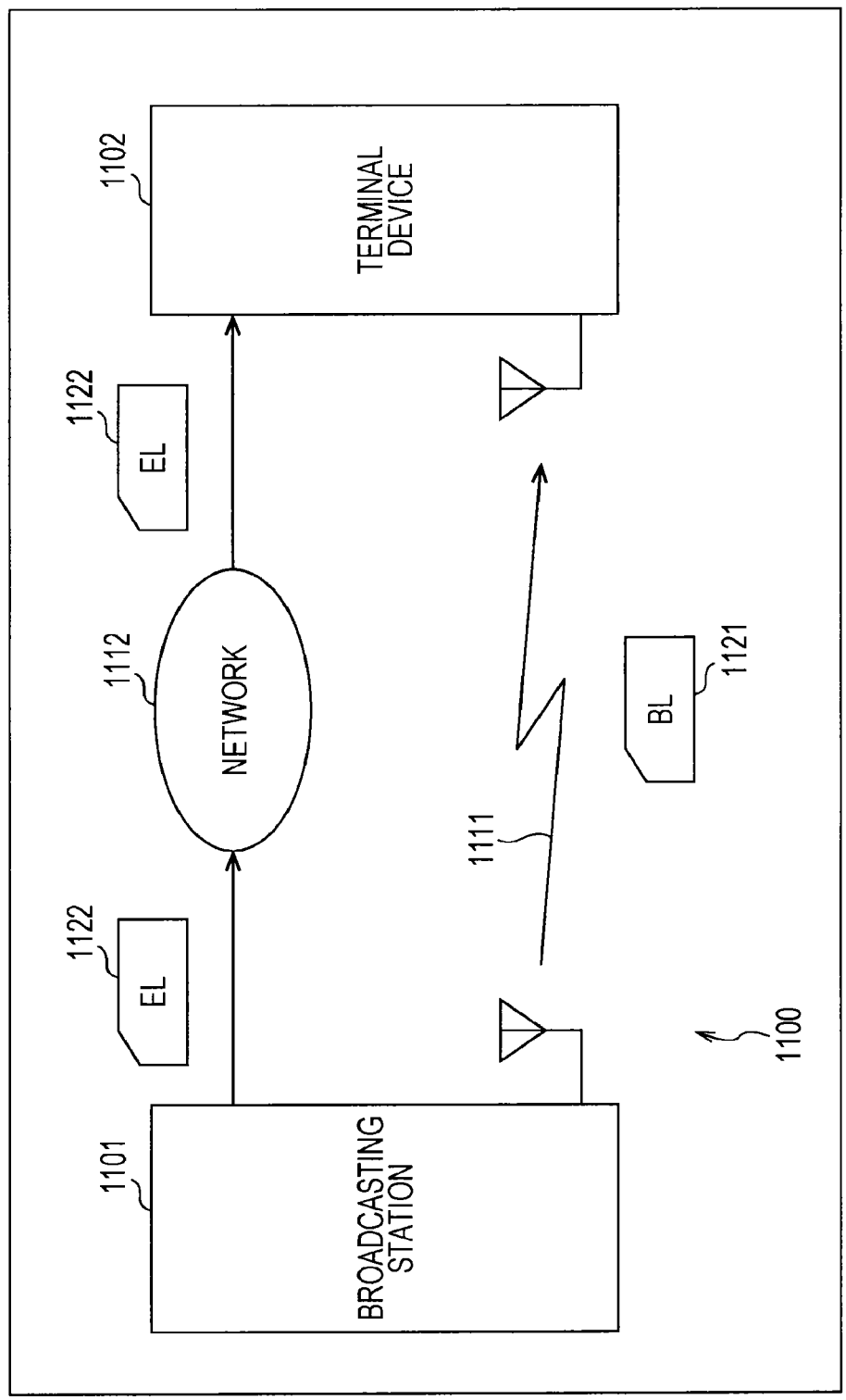
FIG. 39 is a block diagram illustrating another scalable coding application example.

The scalable coding is used for transmission using a plurality of communication media, for example, as illustrated in FIG. 39.

In a data transmission system 1100 illustrated in FIG. 39, a broadcasting station 1101 transmits scalable encoded data (BL) 1121 of a base layer through terrestrial broadcasting 1111. Further, the broadcasting station 1101 transmits scalable encoded data (EL) 1122 of an enhancement layer (for example, packetizes the scalable encoded data (EL) 1122 and then transmits resultant packets) via an arbitrary network 1112 configured with a communication network including either or both of a wired network and a wireless network.

A terminal device 1102 has a reception function of receiving the terrestrial broadcasting 1111 broadcast by the broadcasting station 1101, and receives the scalable encoded data (BL) 1121 of the base layer transmitted through the terrestrial broadcasting 1111. The terminal device 1102 further has a communication function of performing communication via the network 1112, and receives the scalable encoded data (EL) 1122 of the enhancement layer transmitted via the network 1112.

The terminal device 1102 decodes the scalable encoded data (BL) 1121 of the base layer acquired through the terrestrial broadcasting 1111, for example, according to the user's instruction or the like, obtains the image of the base layer, stores the obtained image, and transmits the obtained image to another device.

Further, the terminal device 1102 combines the scalable encoded data (BL) 1121 of the base layer acquired through the terrestrial broadcasting 1111 with the scalable encoded data (EL) 1122 of the enhancement layer acquired through the network 1112, for example, according to the user's instruction or the like, obtains the scalable encoded data (BL+EL), decodes the scalable encoded data (BL+EL) to obtain the image of the enhancement layer, stores the obtained image, and transmits the obtained image to another device.

As described above, it is possible to transmit scalable encoded data of respective layers, for example, through different communication media. Thus, it is possible to distribute a load, and it is possible to prevent the occurrence of a delay or an overflow.

Further, it is possible to select a communication medium used for transmission for each layer according to the situation, transmission. For example, the scalable encoded data (BL) 1121 of the base layer having a relative large amount of data may be transmitted through a communication medium having a large bandwidth, and the scalable encoded data (EL) 1122 of the enhancement layer having a relative small amount of data may be transmitted through a communication medium having a small bandwidth. Further, for example, a communication medium for transmitting the scalable encoded data (EL) 1122 of the enhancement layer may be switched between the network 1112 and the terrestrial broadcasting 1111 according to an available bandwidth of the network 1112. Of course, the same applies to data of an arbitrary layer.

As control is performed as described above, it is possible to further suppress an increase in a load in data transmission.

Of course, the number of layers is an arbitrary, and the number of communication media used for transmission is also arbitrary. Further, the number of the terminal devices 1102 serving as a data delivery destination is also arbitrary. The above description has been described in connection with the example of broadcasting from the broadcasting station 1101, and the application example is not limited to this example. The data transmission system 1100 can be applied to any system in which encoded data generated by the scalable coding is divided into two or more in units of layers and transmitted through a plurality of lines.

(Third System)

Figure 40:
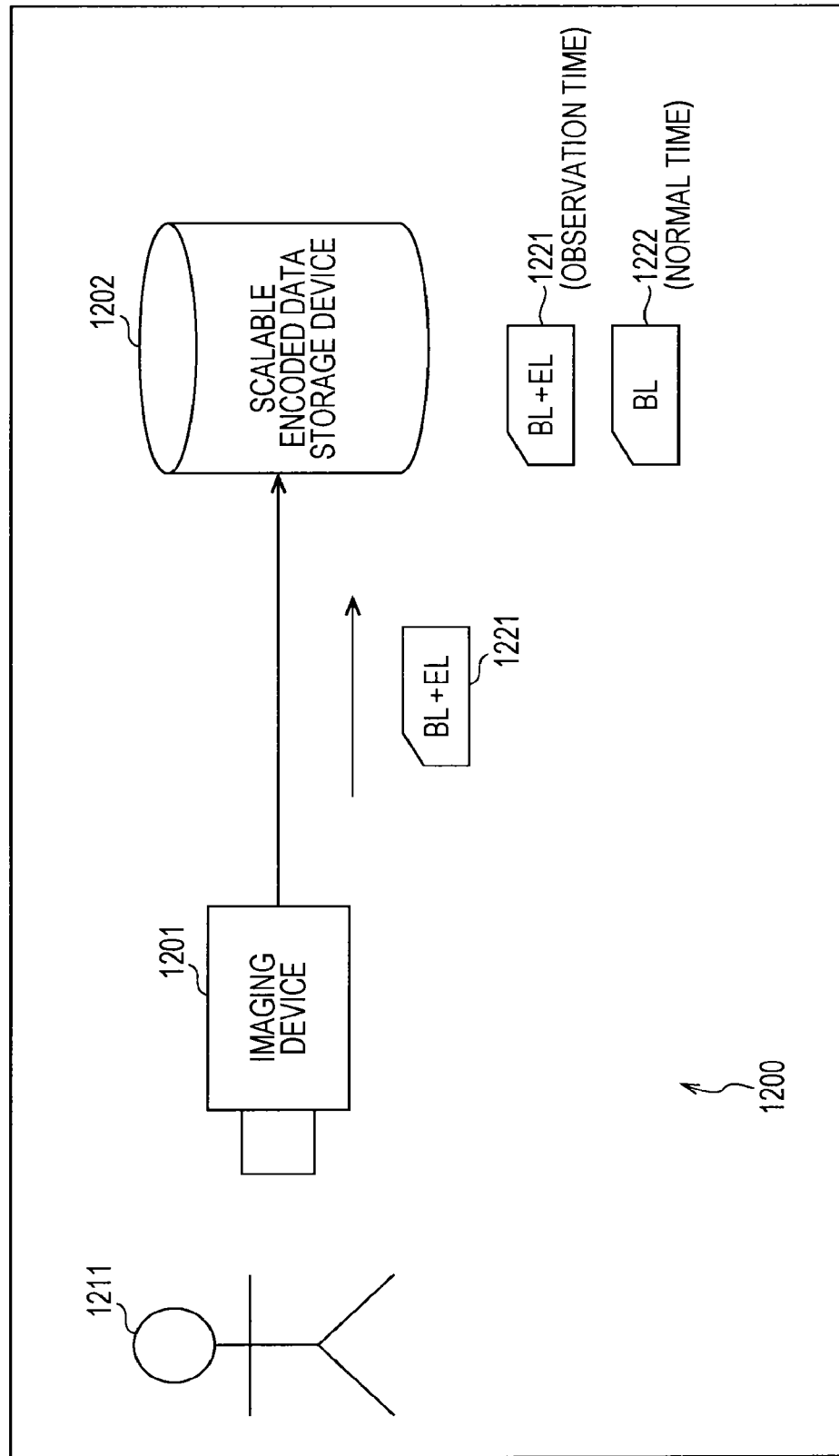
FIG. 40 is a block diagram illustrating another scalable coding application example.

The scalable coding is used for storage of encoded data, for example, as illustrated in FIG. 40.

In an imaging system 1200 illustrated in FIG. 40, an imaging device 1201 photographs a subject 1211, performs the scalable coding on obtained image data, and provides scalable encoded data (BL+EL) 1221 to a scalable encoded data storage device 1202.

The scalable encoded data storage device 1202 stores the scalable encoded data (BL+EL) 1221 provided from the imaging device 1201 in a quality according to the situation. For example, during a normal time, the scalable encoded data storage device 1202 extracts data of the base layer from the scalable encoded data (BL+EL) 1221, and stores the extracted data as scalable encoded data (BL) 1222 of the base layer having a small amount of data in a low quality. On the other hand, for example, during an observation time, the scalable encoded data storage device 1202 stores the scalable encoded data (BL+EL) 1221 having a large amount of data in a high quality without change.

Accordingly, the scalable encoded data storage device 1202 can store an image in a high quality only when necessary, and thus it is possible to suppress an increase in an amount of data and improve use efficiency of a memory area while suppressing a reduction in a value of an image caused by quality deterioration.

For example, the imaging device 1201 is a monitoring camera. When monitoring target (for example, intruder) is not shown on a photographed image (during a normal time), content of the photographed image is likely to be inconsequential, and thus a reduction in an amount of data is prioritized, and image data (scalable encoded data) is stored in a low quality. On the other hand, when a monitoring target is shown on a photographed image as the subject 1211 (during an observation time), content of the photographed image is likely to be consequential, and thus an image quality is prioritized, and image data (scalable encoded data) is stored in a high quality.

It may be determined whether it is the normal time or the observation time, for example, by analyzing an image through the scalable encoded data storage device 1202. Further, the imaging device 1201 may perform the determination and transmits the determination result to the scalable encoded data storage device 1202.

Further, a determination criterion as to whether it is the normal time or the observation time is arbitrary, and content of an image serving as the determination criterion is arbitrary. Of course, a condition other than content of an image may be a determination criterion. For example, switching may be performed according to the magnitude or a waveform of a recorded sound, switching may be performed at certain time intervals, or switching may be performed according an external instruction such as the user's instruction.

The above description has been described in connection with the example in which switching is performed between two states of the normal time and the observation time, but the number of states is arbitrary. For example, switching may be performed among three or more states such as a normal time, a low-level observation time, an observation time, a high-level observation time, and the like. Here, an upper limit number of states to be switched depends on the number of layers of scalable encoded data.

Further, the imaging device 1201 may decide the number of layers for the scalable coding according to a state. For example, during the normal time, the imaging device 1201 may generate the scalable encoded data (BL) 1222 of the base layer having a small amount of data in a low quality and provide the scalable encoded data (BL) 1222 of the base layer to the scalable encoded data storage device 1202. Further, for example, during the observation time, the imaging device 1201 may generate the scalable encoded data (BL+EL) 1221 of the base layer having a large amount of data in a high quality and provide the scalable encoded data (BL+EL) 1221 of the base layer to the scalable encoded data storage device 1202.

The above description has been made in connection with the example of a monitoring camera, but the purpose of the imaging system 1200 is arbitrary and not limited to a monitoring camera.

Tenth Embodiment

Other Embodiments

The above embodiments have been described in connection with the example of the device, the system, or the like according to the present technology, but the present technology is not limited to the above examples and may be implemented as any component mounted in the device or the device configuring the system, for example, a processor serving as a system (large scale integration) LSI or the like, a module using a plurality of processors or the like, a unit using a plurality of modules or the like, a set (that is, some components of the device) in which any other function is further added to a unit, or the like.

(Exemplary Configuration of Video Set)

Figure 41:
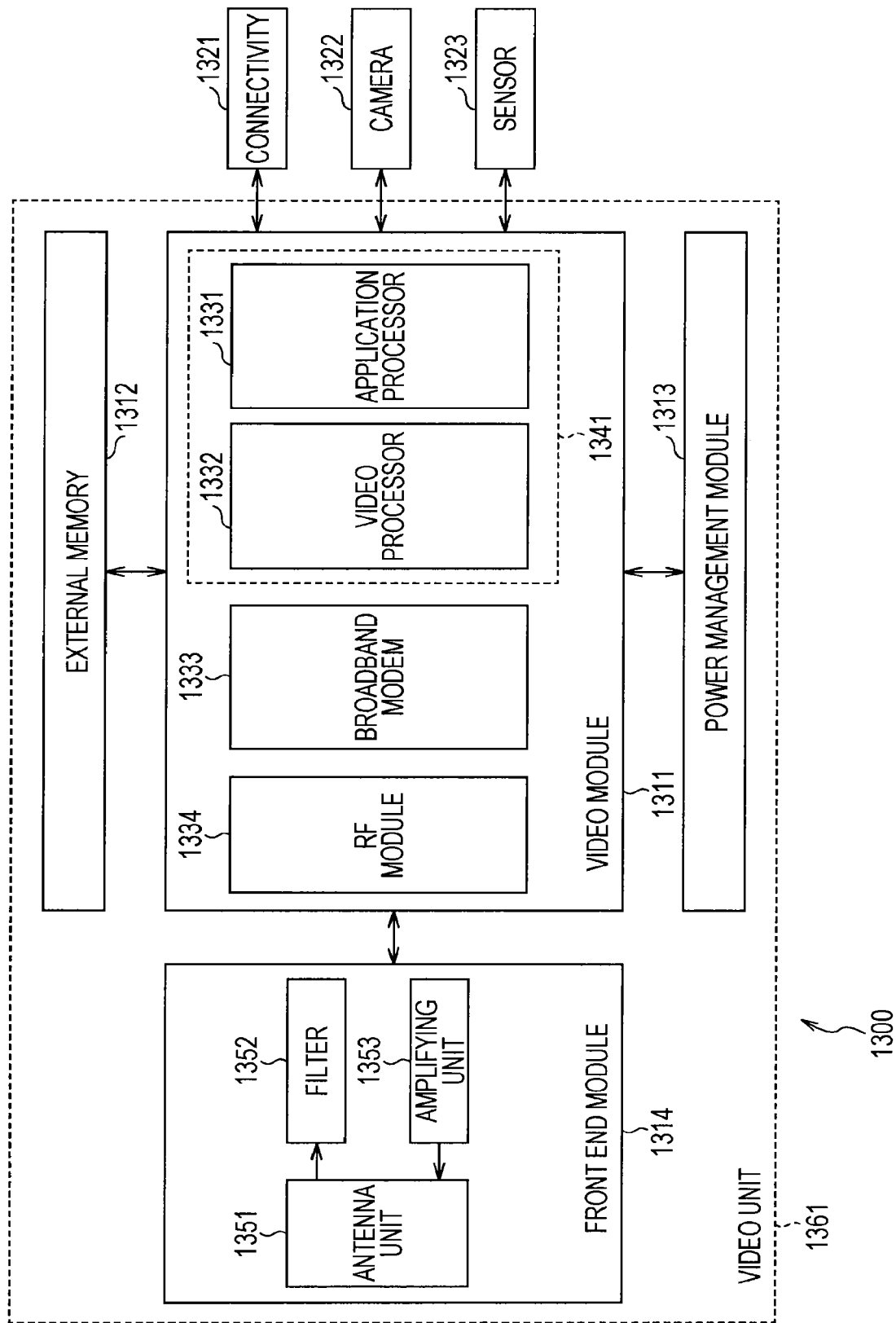
FIG. 41 illustrates an exemplary schematic configuration of a video set to which the present disclosure is applied.

An example in which the present technology is implemented as a set will be described with reference to FIG. 41. FIG. 41 illustrates an exemplary schematic configuration of a video set to which the present technology is applied.

In recent years, functions of electronic devices have become diverse, and when some components are implemented as sale, provision, or the like in development or manufacturing, there are many cases in which a plurality of components having relevant functions are combined and implemented as a set having a plurality of functions as well as cases in which an implementation is performed as a component having a single function.

A video set 1300 illustrated in FIG. 41 is a multi-functionalized configuration in which a device having a function related to image encoding and/or image decoding is combined with a device having any other function related to the function.

As illustrated in FIG. 41, the video set 1300 includes a module group such as a video module 1311, an external memory 1312, a power management module 1313, and a front end module 1314 and a device having relevant functions such as a connectivity 1321, a camera 1322, and a sensor 1323.

A module is a part having multiple functions into which several relevant part functions are integrated. A concrete physical configuration is arbitrary, but, for example, it is configured such that a plurality of processes having respective functions, electronic circuit elements such as a resistor and a capacitor, and other devices are arranged and integrated on a wiring substrate. Further, a new module may be obtained by combining another module or a processor with a module.

In the case of the example of FIG. 41, the video module 1311 is a combination of components having functions related to image processing, and includes an application processor, a video processor, a broadband modem 1333, and a radio frequency (RF) module 1334.

A processor is one in which a configuration having a certain function is integrated into a semiconductor chip through System On a Chip (SoC), and also refers to, for example, a system LSI (Large Scale Integration) or the like. The configuration having the certain function may be a logic circuit (hardware configuration), may be a CPU, a ROM, a RAM, and a program (software configuration) executed using the CPU, the ROM, and the RAM, and may be a combination of a hardware configuration and a software configuration. For example, a processor may include a logic circuit, a CPU, a ROM, a RAM, and the like, some functions may be implemented through the logic circuit (hardware component), and the other functions may be implemented through a program (software component) executed by the CPU.

The application processor 1331 of FIG. 41 is a processor that executes an application related to image processing. An application executed by the application processor 1331 can not only perform a calculation process but also control components inside and outside the video module 1311 such as the video processor 1332 as necessary in order to implement a certain function.

The video processor 1332 is a process having a function related to image encoding and/or image decoding.

The broadband modem 1333 is a processor (or module) that performs a process related to wired and/or wireless broadband communication that is performed via broadband line such as the Internet or a public telephone line network. For example, the broadband modem 1333 converts data (digital signal) to be transmitted into an analog signal, for example, through digital modulation, demodulates a received analog signal, and converts the analog signal into data (digital signal). For example, the broadband modem 1333 can perform digital modulation and demodulation on arbitrary information such as image data processed by the video processor 1332, a stream in which image data is encoded, an application program, or setting data.

The RF module 1334 is a module that performs a frequency transform process, a modulation/demodulation process, an amplification process, a filtering process, and the like on an radio frequency (RF) signal transceived through an antenna. For example, the RF module 1334 performs, for example, frequency transform on a baseband signal generated by the broadband modem 1333, and generates an RF signal. Further, for example, the RF module 1334 performs, for example, frequency transform on an RF signal received through the front end module 1314, and generates a baseband signal.

Further, a dotted line 1341, that is, the application processor 1331 and the video processor 1332 may be integrated into a single processor as illustrated in FIG. 41.

The external memory 1312 is installed outside the video module 1311, and a module having a storage device used by the video module 1311. The storage device of the external memory 1312 can be implemented by any physical configuration, but is commonly used to store large capacity data such as image data of frame units, and thus it is desirable to implement the storage device of the external memory 1312 using a relative chip large-capacity semiconductor memory such as a dynamic random access memory (DRAM).

The power management module 1313 manages and controls power supply to the video module 1311 (the respective components in the video module 1311).

The front end module 1314 is a module that provides a front end function (a circuit of a transceiving end at an antenna side) to the RF module 1334. As illustrated in FIG. 41, the front end module 1314 includes, for example, an antenna unit 1351, a filter 1352, and an amplifying unit 1353.

The antenna unit 1351 includes an antenna that transceives a radio signal and a peripheral configuration. The antenna unit 1351 transmits a signal provided from the amplifying unit 1353 as a radio signal, and provides a received radio signal to the filter 1352 as an electrical signal (RF signal). The filter 1352 performs, for example, a filtering process on an RF signal received through the antenna unit 1351, and provides a processed RF signal to the RF module 1334. The amplifying unit 1353 amplifies the RF signal provided from the RF module 1334, and provides the amplified RF signal to the antenna unit 1351.

The connectivity 1321 is a module having a function related to a connection with the outside. A physical configuration of the connectivity 1321 is arbitrary. For example, the connectivity 1321 includes a configuration having a communication function other than a communication standard supported by the broadband modem 1333, an external I/O terminal, or the like.

For example, the connectivity 1321 may include a module having a communication function based on a wireless communication standard such as Bluetooth (a registered trademark), IEEE 802.11 (for example, Wireless Fidelity (Wi-Fi) (a registered trademark)), Near Field Communication (NFC), InfraRed Data Association (IrDA), an antenna that transceives a signal satisfying the standard, or the like. Further, for example, the connectivity 1321 may include a module having a communication function based on a wired communication standard such as Universal Serial Bus (USB), or High-Definition Multimedia Interface (HDMI) (a registered trademark) or a terminal that satisfies the standard. Furthermore, for example, the connectivity 1321 may include any other data (signal) transmission function or the like such as an analog I/O terminal.

Further, the connectivity 1321 may include a device of a transmission destination of data (signal). For example, the connectivity 1321 may include a drive (including a hard disk, a solid state drive (SSD), a Network Attached Storage (NAS), or the like as well as a drive of a removable medium) that reads/writes data from/in a recording medium such as a magnetic disk, an optical disk, a magneto optical disk, or a semiconductor memory. Furthermore, the connectivity 1321 may include an output device (a monitor, a speaker, or the like) that outputs an image or a sound.

The camera 1322 is a module having a function of photographing a subject and obtaining image data of the subject. For example, image data obtained by the photographing of the camera 1322 is provided to and encoded by the video processor 1332.

The sensor 1323 is a module having an arbitrary sensor function such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, a shock sensor, or a temperature sensor. For example, data detected by the sensor 1323 is provided to the application processor 1331 and used by an application or the like.

A configuration described above as a module may be implemented as a processor, and a configuration described as a processor may be implemented as a module.

In the video set 1300 having the above configuration, the present technology can be applied to the video processor 1332 as will be described later. Thus, the video set 1300 can be implemented as a set to which the present technology is applied.

(Exemplary Configuration of Video Processor)

Figure 42:
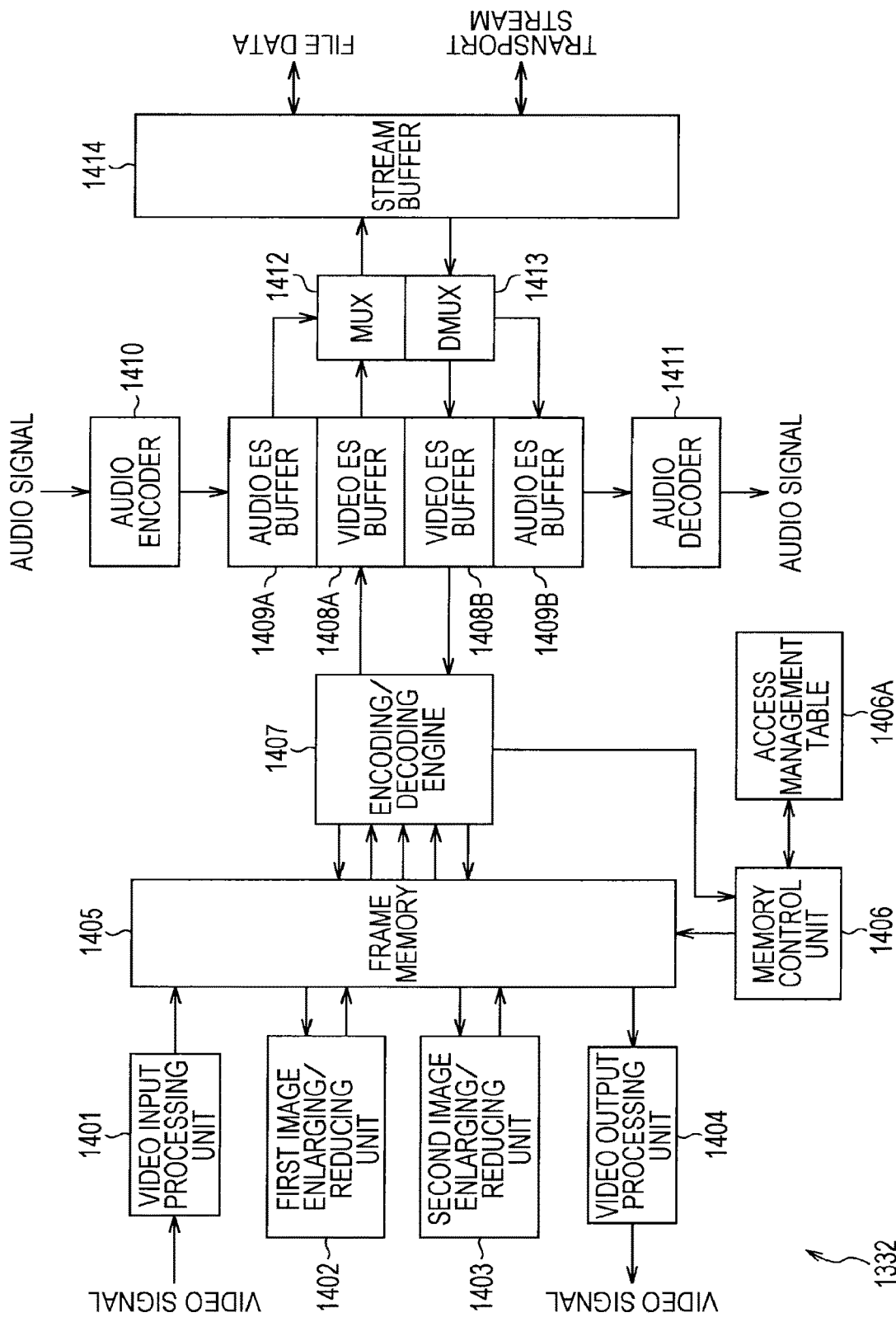
FIG. 42 illustrates an exemplary schematic configuration of a video processor to which the present disclosure is applied.

FIG. 42 illustrates an exemplary schematic configuration of the video processor 1332 (FIG. 41) to which the present technology is applied.

In the case of the example of FIG. 42, the video processor 1332 has a function of receiving an input of a video signal and an audio signal and encoding the video signal and the audio signal according to a certain scheme and a function of decoding encoded video data and audio data, and reproducing and outputting a video signal and an audio signal.

The video processor 1332 includes a video input processing unit 1401, a first image enlarging/reducing unit 1402, a second image enlarging/reducing unit 1403, a video output processing unit 1404, a frame memory 1405, and a memory control unit 1406 as illustrated in FIG. 42. The video processor 1332 further includes an encoding/decoding engine 1407, video elementary stream (ES) buffers 1408A and 1408B, and audio ES buffers 1409A and 1409B. The video processor 1332 further includes an audio encoder 1410, an audio decoder 1411, a multiplexing unit (multiplexer (MUX)) 1412, a demultiplexing unit (demultiplexer (DMUX)) 1413, and a stream buffer 1414.

For example, the video input processing unit 1401 acquires a video signal input from the connectivity 1321 (FIG. 41) or the like, and converts the video signal into digital image data. The first image enlarging/reducing unit 1402 performs, for example, a format conversion process and an image enlargement/reduction process on the image data. The second image enlarging/reducing unit 1403 performs an image enlargement/reduction process on the image data according to a format of a destination to which the image data is output through the video output processing unit 1404 or performs the format conversion process and the image enlargement/reduction process which are identical to those of the first image enlarging/reducing unit 1402 on the image data. The video output processing unit 1404 performs format conversion and conversion into an analog signal on the image data, and outputs a reproduced video signal, for example, the connectivity 1321 (FIG. 41) or the like.

The frame memory 1405 is an image data memory that is shared by the video input processing unit 1401, the first image enlarging/reducing unit 1402, the second image enlarging/reducing unit 1403, the video output processing unit 1404, and the encoding/decoding engine 1407. The frame memory 1405 is implemented as, for example, a semiconductor memory such as a DRAM.

The memory control unit 1406 receives a synchronous signal from the encoding/decoding engine 1407, and controls writing/reading access to the frame memory 1405 according to an access schedule for the frame memory 1405 written in an access management table 1406A. The access management table 1406A is updated through the memory control unit 1406 according to processing executed by the encoding/decoding engine 1407, the first image enlarging/reducing unit 1402, the second image enlarging/reducing unit 1403, or the like.

The encoding/decoding engine 1407 performs an encoding process of encoding image data and a decoding process of decoding a video stream that is data obtained by encoding image data. For example, the encoding/decoding engine 1407 encodes image data read from the frame memory 1405, and sequentially writes the encoded image data in the video ES buffer 1408A as a video stream. Further, for example, the encoding/decoding engine 1407 sequentially reads the video stream from the video ES buffer 1408B, sequentially decodes the video stream, and sequentially the decoded image data in the frame memory 1405. The encoding/decoding engine 1407 uses the frame memory 1405 as a working area at the time of the encoding or the decoding. Further, the encoding/decoding engine 1407 outputs the synchronous signal to the memory control unit 1406, for example, at a timing at which processing of each macro block starts.

The video ES buffer 1408A buffers the video stream generated by the encoding/decoding engine 1407, and then provides the video stream to the multiplexing unit (MUX) 1412. The video ES buffer 1408B buffers the video stream provided from the demultiplexing unit (DMUX) 1413, and then provides the video stream to the encoding/decoding engine 1407.

The audio ES buffer 1409A buffers an audio stream generated by the audio encoder 1410, and then provides the audio stream to the multiplexing unit (MUX) 1412. The audio ES buffer 1409B buffers an audio stream provided from the demultiplexing unit (DMUX) 1413, and then provides the audio stream to the audio decoder 1411.

For example, the audio encoder 1410 converts an audio signal input from, for example, the connectivity 1321 (FIG. 41) or the like into a digital signal, and encodes the digital signal according to a certain scheme such as an MPEG audio scheme or an AudioCode number 3 (AC3) scheme. The audio encoder 1410 sequentially writes the audio stream that is data obtained by encoding the audio signal in the audio ES buffer 1409A. The audio decoder 1411 decodes the audio stream provided from the audio ES buffer 1409B, performs, for example, conversion into an analog signal, and provides a reproduced audio signal to, for example, the connectivity 1321 (FIG. 41) or the like.

The multiplexing unit (MUX) 1412 performs multiplexing of the video stream and the audio stream. A multiplexing method (that is, a format of a bitstream generated by multiplexing) is arbitrary. Further, at the time of multiplexing, the multiplexing unit (MUX) 1412 may add certain header information or the like to the bitstream. In other words, the multiplexing unit (MUX) 1412 may convert a stream format by multiplexing. For example, the multiplexing unit (MUX) 1412 multiplexes the video stream and the audio stream to be converted into a transport stream that is a bitstream of a transfer format. Further, for example, the multiplexing unit (MUX) 1412 multiplexes the video stream and the audio stream to be converted into data (file data) of a recording file format.

The demultiplexing unit (DMUX) 1413 demultiplexes the bitstream obtained by multiplexing the video stream and the audio stream by a method corresponding to the multiplexing performed by the multiplexing unit (MUX) 1412. In other words, the demultiplexing unit (DMUX) 1413 extracts the video stream and the audio stream (separates the video stream and the audio stream) from the bitstream read from the stream buffer 1414. In other words, the demultiplexing unit (DMUX) 1413 can perform conversion (inverse conversion of conversion performed by the multiplexing unit (MUX) 1412) of a format of a stream through the demultiplexing. For example, the demultiplexing unit (DMUX) 1413 can acquire the transport stream provided from, for example, the connectivity 1321 or the broadband modem 1333 (both FIG. 41) through the stream buffer 1414 and convert the transport stream into a video stream and an audio stream through the demultiplexing. Further, for example, the demultiplexing unit (DMUX) 1413 can acquire file data read from various kinds of recording media (FIG. 41) by, for example, the connectivity 1321 through the stream buffer 1414 and converts the file data into a video stream and an audio stream by the demultiplexing.

The stream buffer 1414 buffers the bitstream. For example, the stream buffer 1414 buffers the transport stream provided from the multiplexing unit (MUX) 1412, and provides the transport stream to, for example, the connectivity 1321 or the broadband modem 1333 (both FIG. 41) at a certain timing or based on an external request or the like.

Further, for example, the stream buffer 1414 buffers file data provided from the multiplexing unit (MUX) 1412, provides the file data to, for example, the connectivity 1321 (FIG. 41) or the like at a certain timing or based on an external request or the like, and causes the file data to be recorded in various kinds of recording media.

Furthermore, the stream buffer 1414 buffers the transport stream acquired through, for example, the connectivity 1321 or the broadband modem 1333 (both FIG. 41), and provides the transport stream to the demultiplexing unit (DMUX) 1413 at a certain timing or based on an external request or the like.

Further, the stream buffer 1414 buffers file data read from various kinds of recording media in, for example, the connectivity 1321 (FIG. 41) or the like, and provides the file data to the demultiplexing unit (DMUX) 1413 at a certain timing or based on an external request or the like.

Next, an operation of the video processor 1332 having the above configuration will be described. The video signal input to the video processor 1332, for example, from the connectivity 1321 (FIG. 41) or the like is converted into digital image data according to a certain scheme such as a 4:2:2 Y/Cb/Cr scheme in the video input processing unit 1401 and sequentially written in the frame memory 1405. The digital image data is read out to the first image enlarging/reducing unit 1402 or the second image enlarging/reducing unit 1403, subjected to a format conversion process of performing a format conversion into a certain scheme such as a 4:2:0 Y/Cb/Cr scheme and an enlargement/reduction process, and written in the frame memory 1405 again. The image data is encoded by the encoding/decoding engine 1407, and written in the video ES buffer 1408A as a video stream.

Further, an audio signal input to the video processor 1332 from the connectivity 1321 (FIG. 41) or the like is encoded by the audio encoder 1410, and written in the audio ES buffer 1409A as an audio stream.

The video stream of the video ES buffer 1408A and the audio stream of the audio ES buffer 1409A are read out to and multiplexed by the multiplexing unit (MUX) 1412, and converted into a transport stream, file data, or the like. The transport stream generated by the multiplexing unit (MUX) 1412 is buffered in the stream buffer 1414, and then output to an external network through, for example, the connectivity 1321 or the broadband modem 1333 (both FIG. 41). Further, the file data generated by the multiplexing unit (MUX) 1412 is buffered in the stream buffer 1414, then output to, for example, the connectivity 1321 (FIG. 41) or the like, and recorded in various kinds of recording media.

Further, the transport stream input to the video processor 1332 from an external network through, for example, the connectivity 1321 or the broadband modem 1333 (both FIG. 41) is buffered in the stream buffer 1414 and then demultiplexed by the demultiplexing unit (DMUX) 1413. Further, the file data that is read from various kinds of recording media in, for example, the connectivity 1321 (FIG. 41) or the like and then input to the video processor 1332 is buffered in the stream buffer 1414 and then demultiplexed by the demultiplexing unit (DMUX) 1413. In other words, the transport stream or the file data input to the video processor 1332 is demultiplexed into the video stream and the audio stream through the demultiplexing unit (DMUX) 1413.

The audio stream is provided to the audio decoder 1411 through the audio ES buffer 1409B and decoded, and so an audio signal is reproduced. Further, the video stream is written in the video ES buffer 1408B, sequentially read out to and decoded by the encoding/decoding engine 1407, and written in the frame memory 1405. The decoded image data is subjected to the enlargement/reduction process performed by the second image enlarging/reducing unit 1403, and written in the frame memory 1405. Then, the decoded image data is read out to the video output processing unit 1404, subjected to the format conversion process of performing format conversion to a certain scheme such as a 4:2:2 Y/Cb/Cr scheme, and converted into an analog signal, and so a video signal is reproduced.

When the present technology is applied to the video processor 1332 having the above configuration, it is preferable that the above embodiments of the present technology be applied to the encoding/decoding engine 1407. In other words, for example, the encoding/decoding engine 1407 preferably has the function of the encoding device or the decoding device according to the first embodiment. Accordingly, the video processor 1332 can obtain the same effects as the effects described above with reference to FIGS. 1 to 12.

Further, in the encoding/decoding engine 1407, the present technology (that is, the functions of the image encoding devices or the image decoding devices according to the above embodiment) may be implemented by either or both of hardware such as a logic circuit or software such as an embedded program.

(Another Exemplary Configuration of Video Processor)

Figure 43:
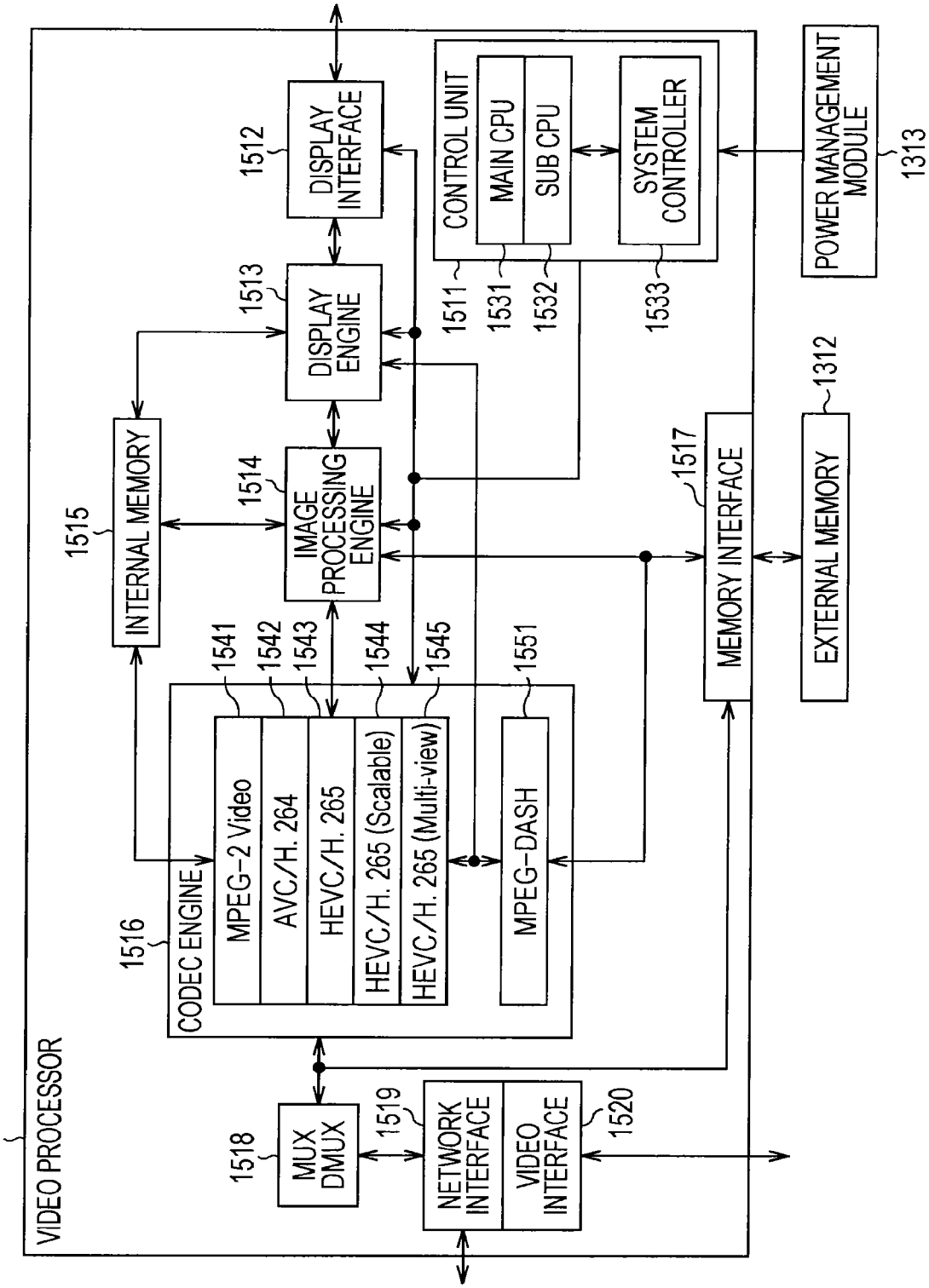
FIG. 43 illustrates another exemplary schematic configuration of a video processor to which the present disclosure is applied.

FIG. 43 illustrates another exemplary schematic configuration of the video processor 1332 (FIG. 41) to which the present technology is applied. In the case of the example of FIG. 43, the video processor 1332 has a function of encoding and decoding video data according to a certain scheme.

More specifically, the video processor 1332 includes a control unit 1511, a display interface 1512, a display engine 1513, an image processing engine 1514, and an internal memory 1515 as illustrated in FIG. 43. The video processor 1332 further includes a codec engine 1516, a memory interface 1517, a multiplexing/demultiplexing unit (MUX DMUX) 1518, a network interface 1519, and a video interface 1520.

The control unit 1511 controls an operation of each processing unit in the video processor 1332 such as the display interface 1512, the display engine 1513, the image processing engine 1514, and the codec engine 1516.

The control unit 1511 includes, for example, a main CPU 1531, a sub CPU 1532, and a system controller 1533 as illustrated in FIG. 43. The main CPU 1531 executes, for example, a program for controlling an operation of each processing unit in the video processor 1332. The main CPU 1531 generates a control signal, for example, according to the program, and provides the control signal to each processing unit (that is, controls an operation of each processing unit). The sub CPU 1532 plays a supplementary role of the main CPU 1531. For example, the sub CPU 1532 executes a child process or a subroutine of a program executed by the main CPU 1531. The system controller 1533 controls operations of the main CPU 1531 and the sub CPU 1532, for examples, designates a program executed by the main CPU 1531 and the sub CPU 1532.

The display interface 1512 outputs image data to, for example, the connectivity 1321 (FIG. 41) or the like under control of the control unit 1511. For example, the display interface 1512 converts image data of digital data into an analog signal, and outputs the analog signal to, for example, the monitor device of the connectivity 1321 (FIG. 41) as a reproduced video signal or outputs the image data of the digital data to, for example, the monitor device of the connectivity 1321 (FIG. 41).

The display engine 1513 performs various kinds of conversion processes such as a format conversion process, a size conversion process, and a color gamut conversion process on the image data under control of the control unit 1511 to comply with, for example, a hardware specification of the monitor device that displays the image.

The image processing engine 1514 performs certain image processing such as a filtering process for improving an image quality on the image data under control of the control unit 1511.

The internal memory 1515 is a memory that is installed in the video processor 1332 and shared by the display engine 1513, the image processing engine 1514, and the codec engine 1516. The internal memory 1515 is used for data transfer performed among, for example, the display engine 1513, the image processing engine 1514, and the codec engine 1516. For example, the internal memory 1515 stores data provided from the display engine 1513, the image processing engine 1514, or the codec engine 1516, and provides the data to the display engine 1513, the image processing engine 1514, or the codec engine 1516 as necessary (for example, according to a request). The internal memory 1515 can be implemented by any storage device, but since the internal memory 1515 is mostly used for storage of small-capacity data such as image data of block units or parameters, it is desirable to implement the internal memory 1515 using a semiconductor memory that is relatively small in capacity (for example, compared to the external memory 1312) and fast in response speed such as a static random access memory (SRAM).

The codec engine 1516 performs processing related to encoding and decoding of image data. An en coding/decoding scheme supported by the codec engine 1516 is arbitrary, and one or more schemes may be supported by the codec engine 1516. For example, the codec engine 1516 may have a codec function of supporting a plurality of encoding/decoding schemes and perform encoding of image data or decoding of encoded data using a scheme selected from among the schemes.

In the example illustrated in FIG. 43, the codec engine 1516 includes, for example, an MPEG-2 Video 1541, an AVC/H.264 1542, a HEVC/H.265 1543, a HEVC/H.265 (Scalable) 1544, a HEVC/H.265 (Multi-view) 1545, and an MPEG-DASH 1551 as functional blocks of processing related to a codec.

The MPEG-2 Video 1541 is a functional block of encoding or decoding image data according to an MPEG-2 scheme. The AVC/H.264 1542 is a functional block of encoding or decoding image data according to an AVC scheme. The HEVC/H.265 1543 is a functional block of encoding or decoding image data according to a HEVC scheme. The HEVC/H.265 (Scalable) 1544 is a functional block of performing scalable encoding or scalable decoding on image data according to a HEVC scheme. The HEVC/H.265 (Multi-view) 1545 is a functional block of performing multi-view encoding or multi-view decoding on image data according to a HEVC scheme.

The MPEG-DASH 1551 is a functional block of transmitting and receiving image data according to an MPEG-Dynamic Adaptive Streaming over HTTP (MPEG-DASH). The MPEG-DASH is a technique of streaming a video using a HyperText Transfer Protocol (HTTP), and has a feature of selecting appropriate one from among a plurality of pieces of encoded data that differ in a previously prepared resolution or the like in units of segments and transmitting a selected one. The MPEG-DASH 1551 performs generation of a stream complying with a standard, transmission control of the stream, and the like, and uses the MPEG-2 Video 1541 or the HEVC/H.265 (Multi-view) 1545 for encoding and decoding of image data.

The memory interface 1517 is an interface for the external memory 1312. Data provided from the image processing engine 1514 or the codec engine 1516 is provided to the external memory 1312 through the memory interface 1517. Further, data read from the external memory 1312 is provided to the video processor 1332 (the image processing engine 1514 or the codec engine 1516) through the memory interface 1517.

The multiplexing/demultiplexing unit (MUX DMUX) 1518 performs multiplexing and demultiplexing of various kinds of data related to an image such as a bitstream of encoded data, image data, and a video signal. The multiplexing/demultiplexing method is arbitrary. For example, at the time of multiplexing, the multiplexing/demultiplexing unit (MUX DMUX) 1518 can not only combine a plurality of data into one but also add certain header information or the like to the data. Further, at the time of demultiplexing, the multiplexing/demultiplexing unit (MUX DMUX) 1518 can not only divide one data into a plurality of data but also add certain header information or the like to each divided data. In other words, the multiplexing/demultiplexing unit (MUX DMUX) 1518 can converts a data format through multiplexing and demultiplexing. For example, the multiplexing/demultiplexing unit (MUX DMUX) 1518 can multiplex a bitstream to be converted into a transport stream serving as a bitstream of a transfer format or data (file data) of a recording file format. Of course, inverse conversion can be also performed through demultiplexing.

The network interface 1519 is an interface for, for example, the broadband modem 1333 or the connectivity 1321 (both FIG. 41). The video interface 1520 is an interface for, for example, the connectivity 1321 or the camera 1322 (both FIG. 41).

Next, an exemplary operation of the video processor 1332 will be described. For example, when the transport stream is received from the external network through, for example, the connectivity 1321 or the broadband modem 1333 (both FIG. 41), the transport stream is provided to the multiplexing/demultiplexing unit (MUX DMUX) 1518 through the network interface 1519, demultiplexed, and then decoded by the codec engine 1516. Image data obtained by the decoding of the codec engine 1516 is subjected to certain image processing performed, for example, by the image processing engine 1514, subjected to certain conversion performed by the display engine 1513, and provided to, for example, the connectivity 1321 (FIG. 41) or the like through the display interface 1512, and so the image is displayed on the monitor. Further, for example, image data obtained by the decoding of the codec engine 1516 is encoded by the codec engine 1516 again, multiplexed by the multiplexing/demultiplexing unit (MUX DMUX) 1518 to be converted into file data, output to, for example, the connectivity 1321 (FIG. 41) or the like through the video interface 1520, and then recorded in various kinds of recording media.

Furthermore, for example, file data of encoded data obtained by encoding image data read from a recording medium (not illustrated) through the connectivity 1321 (FIG. 41) or the like is provided to the multiplexing/demultiplexing unit (MUX DMUX) 1518 through the video interface 1520, and demultiplexed, and decoded by the codec engine 1516. Image data obtained by the decoding of the codec engine 1516 is subjected to certain image processing performed by the image processing engine 1514, subjected to certain conversion performed by the display engine 1513, and provided to, for example, the connectivity 1321 (FIG. 41) or the like through the display interface 1512, and so the image is displayed on the monitor. Further, for example, image data obtained by the decoding of the codec engine 1516 is encoded by the codec engine 1516 again, multiplexed by the multiplexing/demultiplexing unit (MUX DMUX) 1518 to be converted into a transport stream, provided to, for example, the connectivity 1321 or the broadband modem 1333 (both FIG. 41) through the network interface 1519, and transmitted to another device (not illustrated).

Further, transfer of image data or other data between the processing units in the video processor 1332 is performed, for example, using the internal memory 1515 or the external memory 1312. Furthermore, the power management module 1313 controls, for example, power supply to the control unit 1511.

When the present technology is applied to the video processor 1332 having the above configuration, it is desirable to apply the above embodiments of the present technology to the codec engine 1516. In other words, for example, it is preferable that the codec engine 1516 have a functional block of implementing the encoding device and the decoding device according to the first embodiment. Furthermore, for example, as the codec engine 1516 operates as described above, the video processor 1332 can have the same effects as the effects described above with reference to FIGS. 1 to 12.

Further, in the codec engine 1516, the present technology (that is, the functions of the image encoding devices or the image decoding devices according to the above embodiment) may be implemented by either or both of hardware such as a logic circuit or software such as an embedded program.

The two exemplary configurations of the video processor 1332 have been described above, but the configuration of the video processor 1332 is arbitrary and may have any configuration other than the above two exemplary configuration. Further, the video processor 1332 may be configured with a single semiconductor chip or may be configured with a plurality of semiconductor chips. For example, the video processor 1332 may be configured with a three-dimensionally stacked LSI in which a plurality of semiconductors are stacked. Further, the video processor 1332 may be implemented by a plurality of LSIs.

(Application Examples to Devices)

The video set 1300 may be incorporated into various kinds of devices that process image data. For example, the video set 1300 may be incorporated into the television device 900 (FIG. 34), the mobile telephone 920 (FIG. 35), the recording/reproducing device 940 (FIG. 36), the imaging device 960 (FIG. 37), or the like. As the video set 1300 is incorporated, the devices can have the same effects as the effects described above with reference to FIGS. 1 to 12.

Further, the video set 1300 may be also incorporated into a terminal device such as the personal computer 1004, the AV device 1005, the tablet device 1006, or the mobile telephone 1007 in the data transmission system 1000 of FIG. 38, the broadcasting station 1101 or the terminal device 1102 in the data transmission system 1100 of FIG. 39, or the imaging device 1201 or the scalable encoded data storage device 1202 in the imaging system 1200 of FIG. 40. As the video set 1300 is incorporated, the devices can have the same effects as the effects described above with reference to FIGS. 1 to 12.

Further, even each component of the video set 1300 can be implemented as a component to which the present technology is applied when the component includes the video processor 1332. For example, only the video processor 1332 can be implemented as a video processor to which the present technology is applied. Further, for example, the processors indicated by the dotted line 1341 as described above, the video module 1311, or the like can be implemented as, for example, a processor or a module to which the present technology is applied. Further, for example, a combination of the video module 1311, the external memory 1312, the power management module 1313, and the front end module 1314 can be implemented as a video unit 1361 to which the present technology is applied. These configurations can have the same effects as the effects described above with reference to FIGS. 1 to 12.

In other words, a configuration including the video processor 1332 can be incorporated into various kinds of devices that process image data, similarly to the case of the video set 1300. For example, the video processor 1332, the processors indicated by the dotted line 1341, the video module 1311, or the video unit 1361 can be incorporated into the television device 900 (FIG. 34), the mobile telephone 920 (FIG. 35), the recording/reproducing device 940 (FIG. 36), the imaging device 960 (FIG. 37), the terminal device such as the personal computer 1004, the AV device 1005, the tablet device 1006, or the mobile telephone 1007 in the data transmission system 1000 of FIG. 38, the broadcasting station 1101 or the terminal device 1102 in the data transmission system 1100 of FIG. 39, the imaging device 1201 or the scalable encoded data storage device 1202 in the imaging system 1200 of FIG. 40, or the like. Further, as the configuration to which the present technology is applied, the devices can have the same effects as the effects described above with reference to FIGS. 1 to 12, similarly to the video set 1300.

In the present disclosure, the description has been made in connection with the example in which various kinds of information such as the color gamut information and the luminance information is multiplexed into encoded data and transmitted from an encoding side to a decoding side. However, the technique of transmitting the information is not limited to this example. For example, the information may be transmitted or recorded as individual data associated with encoded data without being multiplexed into encoded data. Here, a term "associated" means that an image (or a part of an image such as a slice or a block) included in a bitstream can be linked with information corresponding to the image at the time of decoding. In other words, the information may be transmitted through a transmission path different from encoded data. Further, the information may be recorded in a recording medium (or a different recording area of the same recording medium) different from encoded data. Furthermore, the information and the encoded data may be associated with each other, for example, in units of a plurality of frames, frames, or arbitrary units such as parts of a frame.

In the present disclosure, a system represents a set of a plurality of components (devices, modules (parts), and the like), and all components need not be necessarily arranged in a single housing. Thus, both a plurality of devices that are arranged in individual housings and connected with one another via a network and a single device including a plurality of modules arranged in a single housing are regarded as a system.

The effects described in the present disclosure are merely examples, and other effects may be obtained.

Further, an embodiment of the present disclosure is not limited to the above embodiments, and various changes can be made within a scope not departing from the gist of the present disclosure.

For example, the present disclosure may have a cloud computing configuration in which one function is shared and jointly processed by a plurality of devices via a network.

The steps described above with reference to the flowchart may be performed by a single device or may be shared and performed by a plurality of devices.

Furthermore, when a plurality of processes are included in a single step, the plurality of processes included in the single step may be performed by a single device or may be shared and performed by a plurality of devices.

The present disclosure can have the following configurations as well.

(1)

A decoding device, including:

a receiving unit that receives an encoded stream including encoded data of an image and color gamut information indicating a color gamut of the image from an encoding device that transmits the encoded stream;

an extracting unit that extracts the encoded data and the color gamut information from the encoded stream received by the receiving unit; and a decoding unit that decodes the encoded data extracted by the extracting unit, and generates the image.

(2)

The decoding device according to (1), further including an adjusting unit that adjusts the color gamut of the image generated by the decoding unit based on the color gamut information extracted by the extracting unit.

(3)

The decoding device according to (2), wherein the encoded stream includes luminance information indicating luminance of a display unit that displays the image at a time of authoring of the image, the extracting unit extracts the luminance information from the encoded stream, and the adjusting unit adjusts a luminance dynamic range of the image generated by the decoding unit based on the luminance information extracted by the extracting unit.

(4)

The decoding device according to (3), wherein the luminance information indicates luminance of white and black of the display unit.

(5)

A decoding method performed by a decoding device, including:

a receiving step of receiving an encoded stream including encoded data of an image and color gamut information indicating a color gamut of the image from an encoding device that transmits the encoded stream;

an extracting step of extracting the encoded data and the color gamut information from the encoded stream received in the receiving step; and a decoding step of decoding the encoded data extracted in the extracting step and generating the image.

(6)

An encoding device, including:

an encoding unit that encodes an image, and generates encoded data;

a setting unit that sets color gamut information indicating a color gamut of the image; and a transmitting unit that transmits an encoded stream including the encoded data generated by the encoding unit and the color gamut information generated by the setting unit.

(7)

The encoding device according to (6), wherein the setting unit sets luminance information indicating luminance of a display unit that displays the image at a time of authoring of the image, and the transmitting unit transmits an encoded stream including the encoded data, the color gamut information, and the luminance information.

(8)

The encoding device according to (7), wherein the luminance information indicates luminance of white and black of the display unit.

(9)

An encoding method performed by an encoding device, including:

an encoding step of encoding an image and generating encoded data;

a setting step of setting color gamut information indicating a color gamut of the image; and a transmitting step of transmitting an encoded stream including the encoded data generated in the encoding step and the color gamut information generated in the setting step.

(10)

A decoding device, including:

a receiving unit that receives an encoded stream including encoded data of an image, identification information identifying a certain color gamut, and a cover ratio of a color gamut of the image to the certain color gamut from an encoding device that transmits the encoded stream;

an extracting unit that extracts the encoded data, the identification information, and the cover ratio from the encoded stream received by the receiving unit; and a decoding unit that decodes the encoded data extracted by the extracting unit, and generates the image.

(11)

The decoding device according to (10), further including an adjusting unit that adjusts the color gamut of the image generated by the decoding unit based on the identification information and the cover ratio extracted by the extracting unit.

(12)

The decoding device according to (11), wherein the encoded stream includes luminance information indicating luminance of a display unit that displays the image at a time of authoring of the image, the extracting unit extracts the luminance information from the encoded stream, and the adjusting unit adjusts a luminance dynamic range of the image generated by the decoding unit based on the luminance information extracted by the extracting unit.

(13)

The decoding device according to (12), wherein the luminance information indicates luminance of white and black of the display unit.

(14)

A decoding method performed by a decoding device, including:

a receiving step of receiving an encoded stream including encoded data of an image, identification information identifying a certain color gamut, and a cover ratio of a color gamut of the image to the certain color gamut from an encoding device that transmits the encoded stream;

an extracting step of extracting the encoded data, the identification information, and the cover ratio from the encoded stream received in the receiving step; and a decoding step of decoding the encoded data extracted in the extracting step and generating the image.

(15)

An encoding device, including:

an encoding unit that encodes an image, and generates encoded data;

a setting unit that sets identification information identifying a certain color gamut and a cover ratio of a color gamut of the image to the certain color gamut; and a transmitting unit that transmits an encoded stream including the encoded data generated by the encoding unit and the identification information and the cover ratio generated by the setting unit.

(16)

The encoding device according to (15), wherein the setting unit sets luminance information indicating luminance of a display unit that displays the image at a time of authoring of the image, and the transmitting unit transmits an encoded stream including the encoded data, the color gamut information, and the luminance information.

(17)

The encoding device according to (16), wherein the luminance information indicates luminance of white and black of the display unit.

(18)

An encoding method performed by an encoding device, including:

an encoding step of encoding an image and generating encoded data;

a setting step of setting identification information identifying a certain color gamut and a cover ratio of a color gamut of the image to the certain color gamut; and a transmitting step of transmitting an encoded stream including the encoded data generated in the encoding step and the identification information and the cover ratio generated in the setting step.

(19)

A decoding device, including:

circuitry configured to receive an encoded stream including encoded data of an image and color primary information indicating a coordinate of at least one color primary of the image;

extract the encoded data and the color primary information from the received encoded stream;

decode the extracted encoded data to generate the image; and adjust a color space of the generated image based on the extracted color primary information.

(20)

The decoding device according to (19), wherein the circuitry is further configured to receive white information indicating a coordinate of a white point in a predetermined color space.

(21)

The decoding device according to (19) or (20), wherein the color primary information includes a plurality of coordinates color primaries.

(22)

The decoding device according to (21), wherein the plurality of color primaries includes red, green, and blue.

(23)

The decoding device according to any one of (19) to (22), wherein the encoded stream includes luminance information indicating luminance of a display unit that displays the image at a time of authoring of the image, and the circuitry is further configured to extract the luminance information from the encoded stream, and adjust a luminance dynamic range of the generated image based on the extracted luminance information.

(24)

The decoding device according to (23), wherein the luminance information indicates a plurality of luminance values of the display unit.

(25)

A decoding method performed by a decoding device, including:

receiving an encoded stream including encoded data of an image and color primary information indicating a coordinate of at least one color primary of the image;

extracting, by circuitry of the decoding device, the encoded data and the color primary information from the received encoded stream;

decoding the extracted encoded data to generate the image; and adjusting, by the circuitry, a color space of the generated image based on the extracted color primary information.

(26)

The decoding method according to (25), further comprising:

receiving white information indicating a coordinate of a white point in a predetermined color space.

(27)

The decoding method according to (25) or (26), wherein the color primary information includes a plurality of coordinates of color primaries.

(28)

The decoding method according to (27), wherein the plurality of color primaries includes red, green, and blue.

(29)

The decoding method according to any one of (25) to (28), wherein the encoded stream includes luminance information indicating luminance of a display unit that displays the image at a time of authoring of the image, and the method further comprises:

extracting the luminance information from the encoded stream, and adjusting a luminance dynamic range of the generated image based on the extracted luminance information.

(30)

The decoding method according to (29), wherein the luminance information indicates a plurality of luminance values of the display unit.

(31)

A non-transitory computer-readable medium having stored thereon:

an encoded stream including encoded data of an image and color primary information indicating a coordinate of at least one color primary of the image, wherein a decoding device decodes the encoded data to generate the image, and adjusts a color space of the generated image based on the color primary information.

(32)

The non-transitory computer-readable medium according to (31), wherein the encoded stream includes white information indicating a coordinate of a white point in a predetermined color space.

(33)

The non-transitory computer-readable medium according to (31) or (32), wherein the color primary information includes a plurality of coordinates color primaries.

(34)

The non-transitory computer-readable medium according to (33), wherein the plurality of color primaries includes red, green, and blue.

(35)

The non-transitory computer-readable medium according to any one of (31) to (34), wherein the encoded stream includes luminance information indicating luminance of a display unit that displays the image at a time of authoring of the image, and the decoding device adjusts a luminance dynamic range of the generated image based on the extracted luminance information.

(36)

The non-transitory computer-readable medium according to (35), wherein the luminance information indicates a plurality of luminance values of the display unit.

(37)

An encoding device, comprising:

circuitry configured to encode an image;

generate encoded data;

set color primary information indicating a coordinate of at least one color primary of the image; and transmit an encoded stream including the generated encoded data and the generated color primary information.

(38)

The encoding device according to (37), wherein the circuitry is further configured to set white information indicating a coordinate of a white point in a predetermined color space.

(39)

The encoding device according to (37) or (38), wherein the color primary information includes a plurality of coordinates of color primaries.

(40)

The encoding device according to (39), wherein the plurality of color primaries includes red, green, and blue.

(41)

The encoding device according to any one of (37) to (39), wherein the circuitry is further configured to set luminance information indicating luminance of a display unit that displays the image at a time of authoring of the image, and transmit the encoded stream including the encoded data, the color primary information, and the luminance information.

(42)
The encoding device according to claim (41),
wherein the luminance information indicates a plurality of luminance values of the display unit.

REFERENCE SIGNS LIST

10 Encoding device
11 Setting unit
12 Encoding unit
13 Transmitting unit
50 Decoding device
51 Receiving unit
52 Extracting unit
53 Decoding unit
54 Adjusting unit
70 Encoding device
72 Setting unit
90 Decoding device
91 Extracting unit
92 Adjusting unit

The invention claimed is:

1. A decoding device, comprising:
processing circuitry configured to
receive encoded image data, color primary information indicating coordinates of three color primaries, and luminance information indicating a first luminance of a master display and a second luminance of the master display;
decode the encoded image data to generate an image; and
adjust a luminance of the generated image based on the luminance information.

2. The decoding device according to claim 1, wherein the processing, circuitry is further configured to
adjust a dynamic range of the generated image based on the luminance information.

3. The decoding device according to claim 1, wherein the first luminance is higher than the second luminance.

4. The decoding device according to claim 3, wherein the first luminance is a white luminance of the master display and the second luminance is a black luminance of the master display.

5. The decoding device according to claim 1, wherein the processing circuitry is configured to adjust the luminance of the generated image based on the first luminance and the second luminance.

6. The decoding device according to claim 1, wherein the luminance information indicates a third luminance of the master display.

7. The decoding device according to claim 6, wherein the third luminance is lower than the first luminance and higher than the second luminance.

8. A decoding method performed by a decoding device, comprising:
receiving encoded image data, color primary information indicating coordinates of three color primaries, and luminance information indicating a first luminance of a master display and a second luminance of the master display;
decoding, by processing circuitry of the decoding device, the encoded image data to generate an image; and
adjusting, by the processing circuitry, a luminance of the generated image based on the luminance information.

9. The decoding method according to claim 8, further comprising:
adjusting a dynamic range of the generated image based on the luminance information.

10. The decoding method according to claim 8, wherein the first luminance is higher than the second luminance.

11. The decoding method according to claim 10, wherein the first luminance is a white luminance of the master display and the second luminance is a black luminance of the master display.

12. The decoding method according to claim 8, wherein the step of adjusting comprises:
adjusting the luminance of the generated image based on the first luminance and the second luminance.

13. The decoding method according to claim 8, wherein the luminance information indicates a third luminance of the master display.

14. The decoding method according to claim 13, wherein the third luminance is lower than the first luminance and higher than the second luminance.

15. A display apparatus, comprising:
a display configured to display an image; and
circuitry configured to
receive encoded image data, color primary information indicating coordinates of three color primaries, and luminance information indicating a first luminance of another display apparatus and a second luminance of the other display apparatus;
decode the encoded image data to generate the image;
adjust a luminance of the generated image based on the received luminance information; and
output the adjusted image to the display.

16. The display apparatus according to claim 15, wherein the other display apparatus is a reference display.

17. The display apparatus according to claim 15, wherein the other display apparatus is a master display.

18. The display apparatus according to claim 15, rein the other display apparatus displayed the image while the image was being edited.

19. The display apparatus according to claim 15, wherein the processing circuitry is further configured to adjust a dynamic range of the generated image based on the luminance information.

20. The display apparatus according to claim 15, wherein the first luminance is higher than the second luminance.

21. The display apparatus according to claim 20, wherein the first luminance is a white luminance of the other display apparatus and the second luminance is a black luminance of the other display apparatus.

22. The display apparatus according to claim 15, wherein the processing circuitry is configured to adjust the luminance of the generated image based on the first luminance and the second luminance.

23. The display apparatus according to claim 15, wherein the first luminance and the second luminance of the other display apparatus are represented in candelas per square meter.

24. The display apparatus according to claim 15, wherein the processing circuitry is further configured to receive white point information indicating a coordinate of a white point.

25. The display apparatus according to claim 15, wherein the luminance information indicates a third luminance of the other display apparatus.

26. The display apparatus according to claim 25, wherein the third luminance is lower than the first luminance and higher than the second luminance.

27. A decoding method performed by a display apparatus, comprising:

receiving encoded image data, color primary information indicating coordinates of three color primaries, and luminance information indicating a first luminance of another display apparatus and a second luminance of the other display apparatus;

decoding, by processing circuitry of the display apparatus, the encoded image data to generate an image;

adjusting, by the processing circuitry, luminance of the generated image based on the received luminance information; and outputting the adjusted image to a display of the display apparatus for display.

28. The decoding method according to claim 27, wherein the other display apparatus is a reference display.

29. The decoding method according to claim 27, wherein the other display apparatus is a master display.

30. The decoding method according to claim 27, wherein the other display apparatus displayed the image while the image was being edited.

31. The decoding method according to claim 27, further comprising:

adjusting a dynamic range of the generated image based on the luminance information.

32. The decoding method according to claim 27, wherein the first luminance is higher than the second luminance.

33. The decoding method according to claim 28, wherein the first luminance is a white luminance of the other display apparatus and the second luminance is a black luminance of the other display apparatus.

34. The decoding method according to claim 27, wherein the step of adjusting comprises:

adjusting the luminance of the generated image based on the first luminance and the second luminance.

35. The decoding method according to claim 27, wherein the first luminance and the second luminance of the other display apparatus are represented in candelas per square meter.

36. The decoding method according to claim 27, further comprising:

receiving white point information indicating a coordinate of a white point.

37. The decoding method according to claim 27, wherein the luminance information indicates a third luminance of the other display apparatus.

38. The decoding method according to claim 37, wherein the third luminance is lower than the first luminance and higher than the second luminance.

* * * * *